(12) United States Patent
Sato

(10) Patent No.: US 9,164,260 B2
(45) Date of Patent: Oct. 20, 2015

(54) WIDE-ANGLE LENS, IMAGING APPARATUS, AND METHOD FOR MANUFACTURING WIDE-ANGLE LENS

(71) Applicant: NIKON CORPORATION, Chiyoda-ku, Tokyo (JP)

(72) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/205,570

(22) Filed: Mar. 12, 2014

(65) Prior Publication Data

US 2014/0192421 A1 Jul. 10, 2014

Related U.S. Application Data

(62) Division of application No. 12/917,753, filed on Nov. 2, 2010, now Pat. No. 8,699,143.

(30) Foreign Application Priority Data

Nov. 10, 2009 (JP) ................................. 2009-257359
Nov. 10, 2009 (JP) ................................. 2009-257367
Nov. 10, 2009 (JP) ................................. 2009-257385

(51) Int. Cl.
*G02B 9/12* (2006.01)
*G02B 3/02* (2006.01)
*G02B 13/18* (2006.01)
*G02B 13/04* (2006.01)
*G02B 13/00* (2006.01)
*G02B 9/62* (2006.01)

(52) U.S. Cl.
CPC *G02B 13/04* (2013.01); *G02B 9/62* (2013.01); *G02B 13/0035* (2013.01); *G02B 13/18* (2013.01)

(58) Field of Classification Search
CPC ........................................................ G02B 9/12
USPC ................................................. 359/716, 784
See application file for complete search history.

(56) References Cited

U.S. PATENT DOCUMENTS

| 5,159,493 | A | 10/1992 | Tsutsumi |
| 5,668,668 | A | 9/1997 | Shibayama et al. |
| 5,721,642 | A | 2/1998 | Shibayama et al. |
| 5,798,871 | A | 8/1998 | Shibayama et al. |
| 5,805,349 | A | 9/1998 | Sato |
| 6,545,824 | B2 | 4/2003 | Sensui |

(Continued)

FOREIGN PATENT DOCUMENTS

| JP | 51-026535 A | 3/1976 |
| JP | 04-118612 A | 4/1992 |

(Continued)

*Primary Examiner* — William Choi
(74) *Attorney, Agent, or Firm* — Miles & Stockbridge P.C.

(57) ABSTRACT

Including: a front lens group Gf disposed to an object side of an aperture stop; and a rear lens group Gr disposed to an image side of the aperture stop; the front lens group including a sub-lens group Ga having negative refractive power, the sub-lens group Ga including, in order from the most object side, at least three negative lenses, at least one of the three negative lens being an aspherical negative meniscus lens, the aspherical negative meniscus lens having a shape that negative refractive power is getting smaller from the center to the periphery, a cemented lens constructed by a positive lens, a negative lens, and a positive lens being disposed to the image side of the sub-lens group Ga, and given conditional expressions being satisfied, thereby providing a wide-angle lens having high optical performance with a wide angle of view.

18 Claims, 24 Drawing Sheets

(56) References Cited

U.S. PATENT DOCUMENTS

| | | |
|---|---|---|
| 6,606,204 B2 | 8/2003 | Toyama |
| 6,621,645 B2 | 9/2003 | Sato |
| 6,687,061 B2 | 2/2004 | Sensui |
| 6,912,095 B2 | 6/2005 | Yamada |
| 7,016,120 B2 | 3/2006 | Achtner et al. |
| 7,215,481 B2 | 5/2007 | Ogata |
| 7,227,695 B2 | 6/2007 | Enomoto |
| 7,239,456 B2 | 7/2007 | Kimura et al. |
| 7,365,916 B2 | 4/2008 | Sato et al. |
| 7,663,816 B2 | 2/2010 | Sato |
| 2001/0028511 A1 | 10/2001 | Sensui |
| 2002/0057505 A1 | 5/2002 | Sato |
| 2002/0191306 A1 | 12/2002 | Toyama |
| 2003/0067692 A1 | 4/2003 | Sensui |
| 2003/0189767 A1 | 10/2003 | Achtner et al. |
| 2004/0066562 A1 | 4/2004 | Yamada |
| 2005/0134968 A1 | 6/2005 | Ogata |
| 2005/0219715 A1 | 10/2005 | Kimura et al. |
| 2006/0066961 A1 | 3/2006 | Sato et al. |
| 2006/0221463 A1 | 10/2006 | Enomoto |
| 2009/0086340 A1 | 4/2009 | Sato |

FOREIGN PATENT DOCUMENTS

| | | |
|---|---|---|
| JP | 05-034592 A | 2/1993 |
| JP | 08-248312 A | 9/1996 |
| JP | 09-113798 A | 5/1997 |
| JP | 2001-159732 A | 6/2001 |
| JP | 2001-188171 A | 7/2001 |
| JP | 2001-228391 A | 8/2001 |
| JP | 2002-277739 A | 9/2002 |
| JP | 2003-043350 A | 2/2003 |
| JP | 2003-307672 A | 10/2003 |
| JP | 2004-126280 A | 4/2004 |
| JP | 2004-226740 A | 8/2004 |
| JP | 2005-181851 A | 7/2005 |
| JP | 2005-181852 A | 7/2005 |
| JP | 2005-292344 A | 10/2005 |
| JP | 2005-316398 A | 11/2005 |
| JP | 2006-106109 A | 4/2006 |
| JP | 2006-276445 A | 10/2006 |
| JP | 2007-094174 A | 4/2007 |
| JP | 2007-256712 A | 10/2007 |
| JP | 2008-170720 A | 7/2008 |
| JP | 2009-086221 A | 4/2009 |

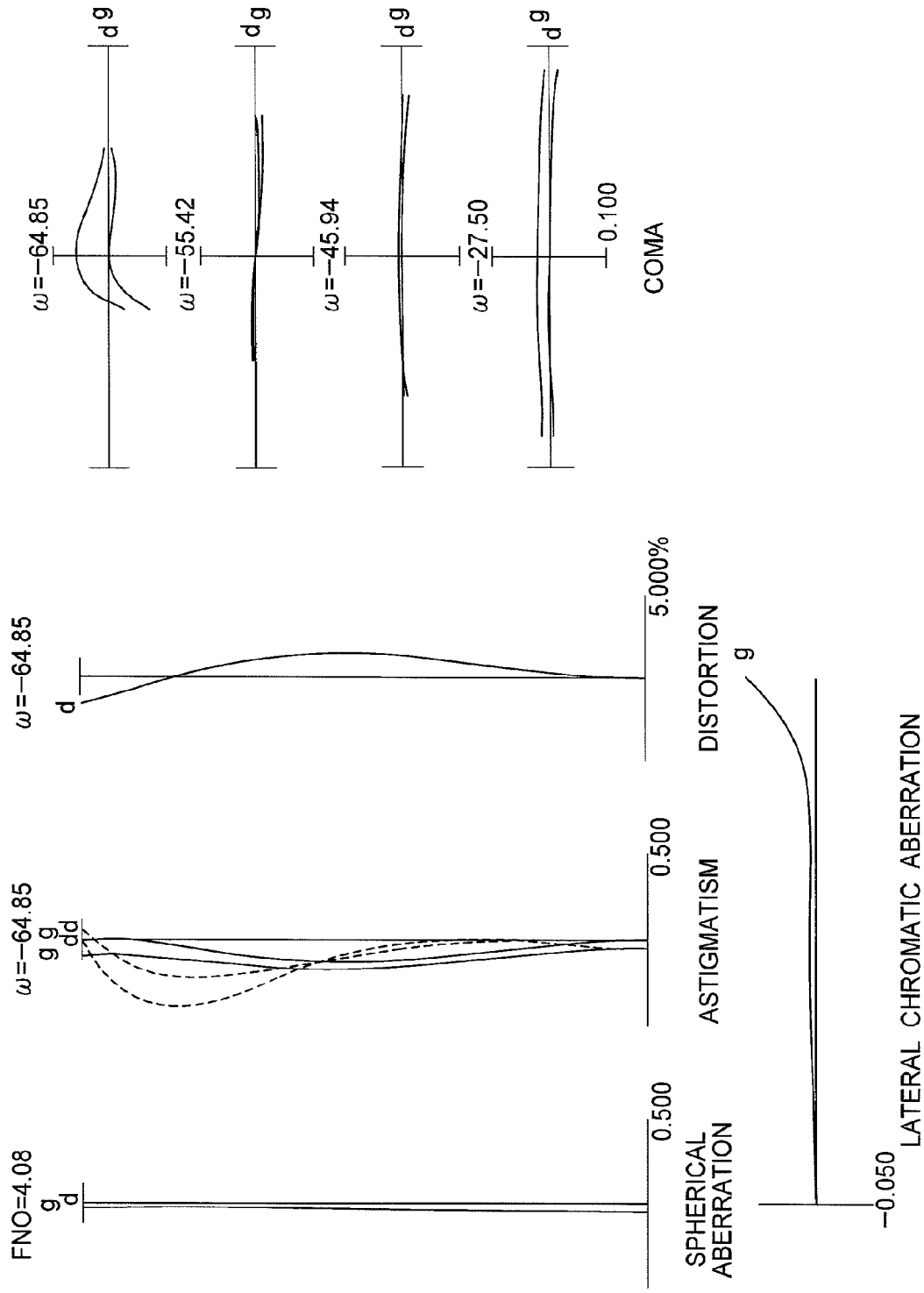

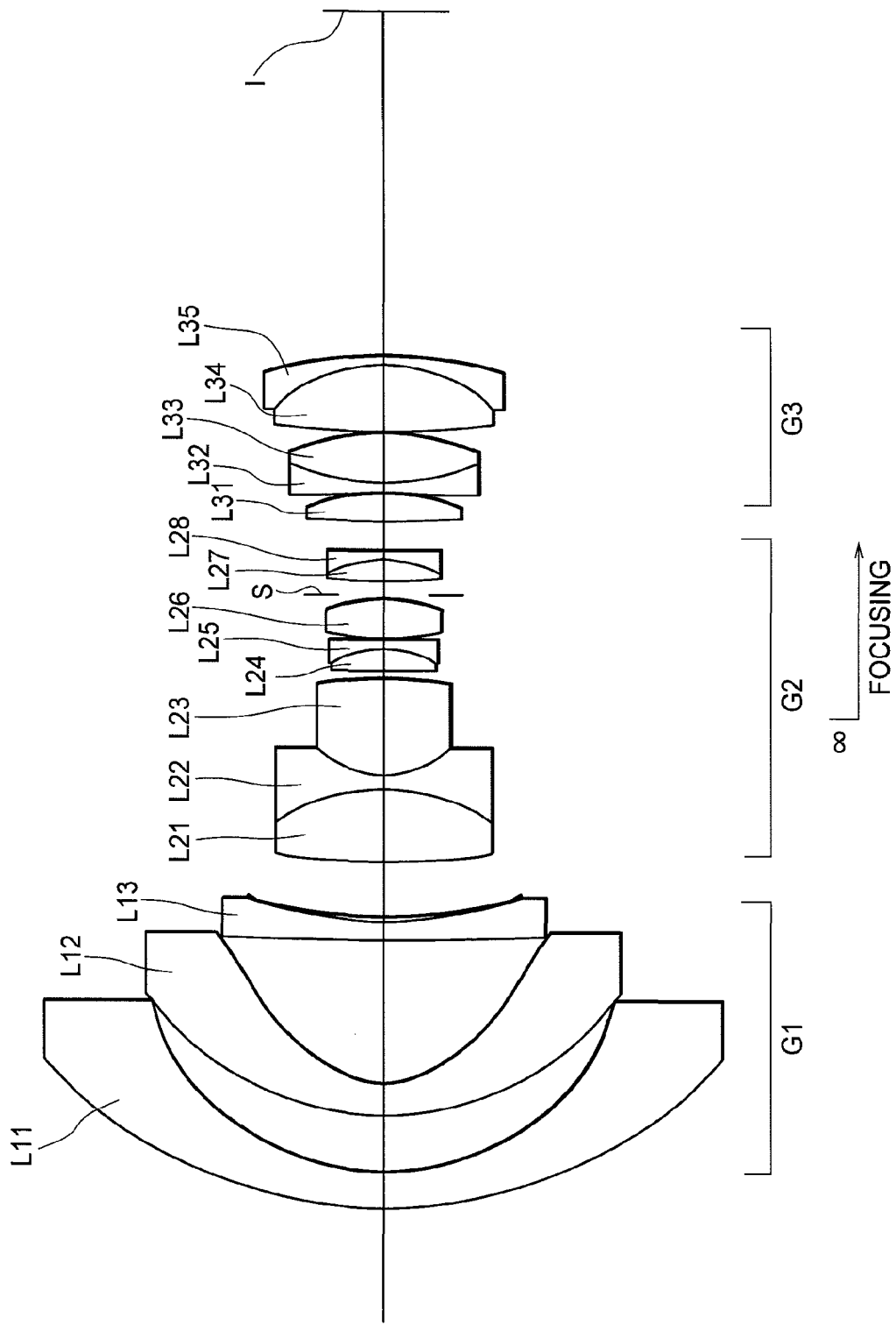

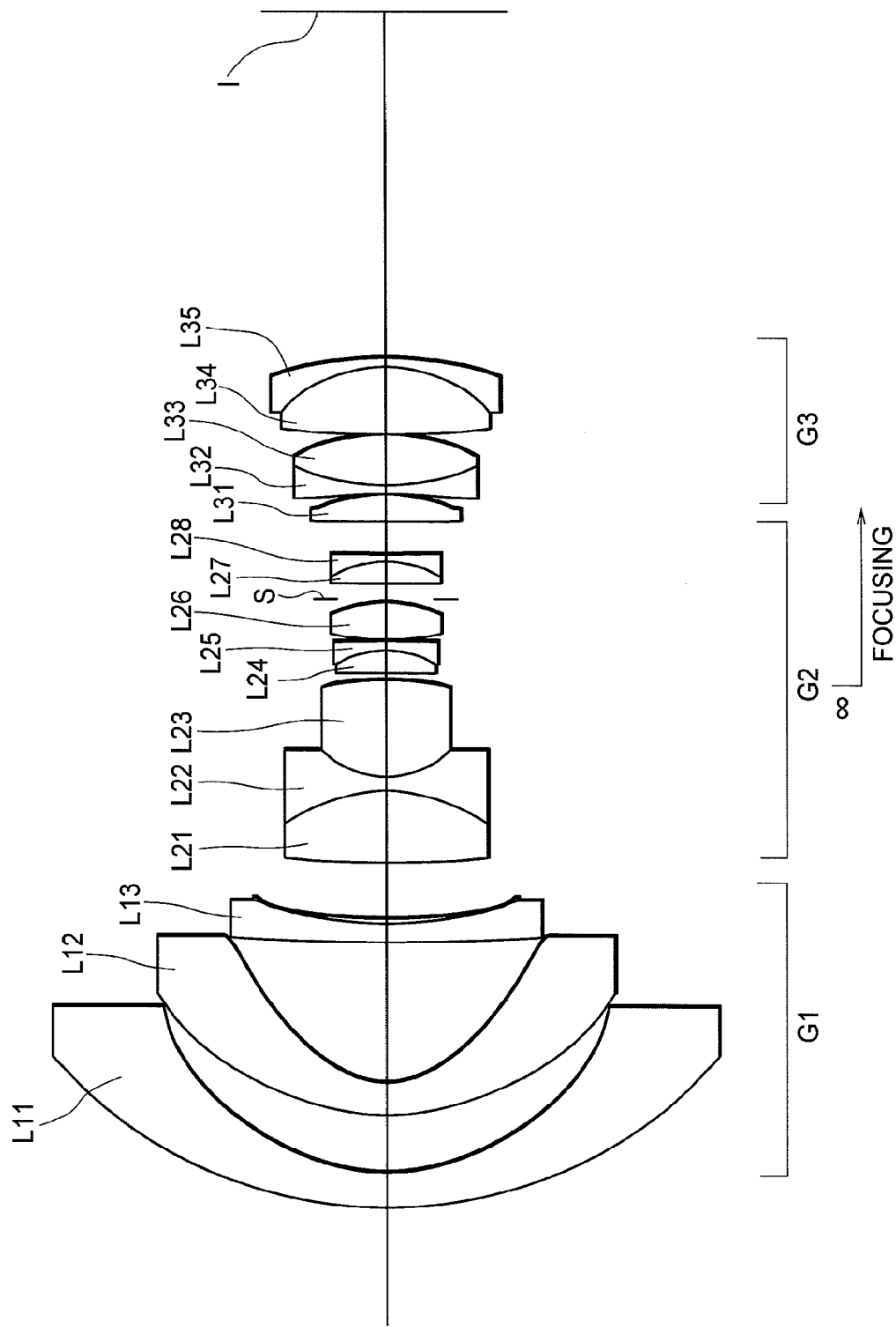

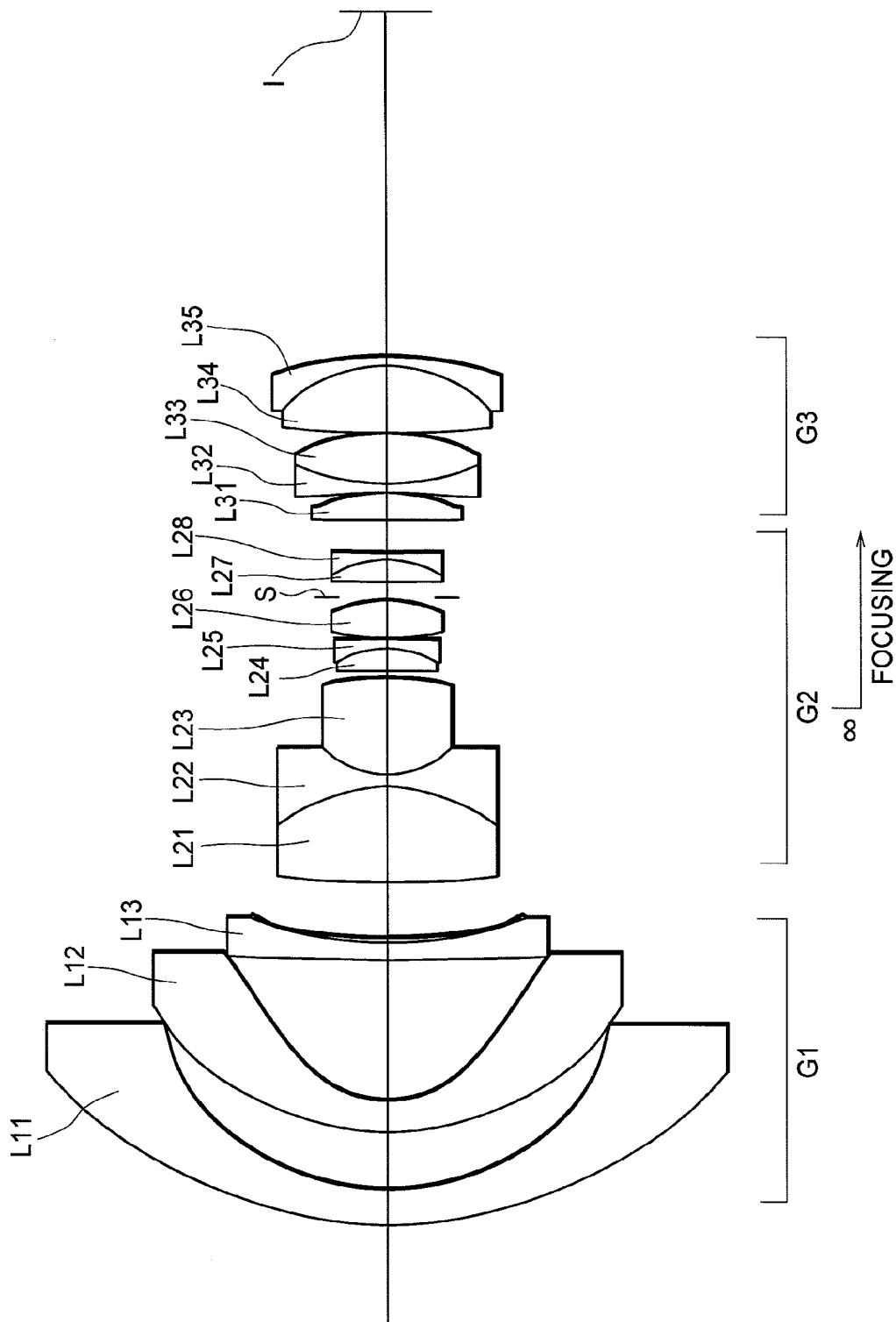

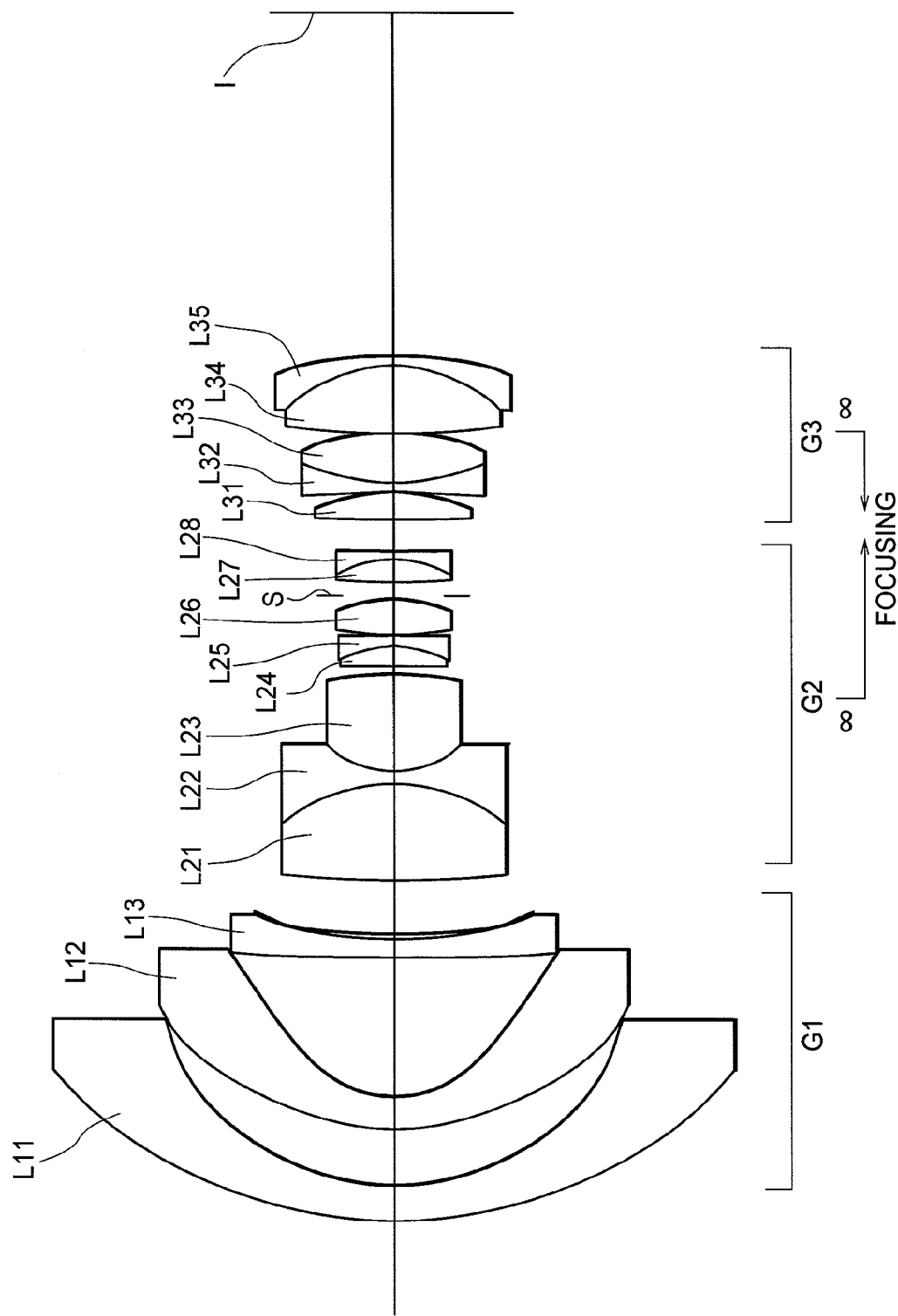

WIDE-ANGLE LENS, IMAGING APPARATUS, AND METHOD FOR MANUFACTURING WIDE-ANGLE LENS

The disclosure of the following priority applications are herein incorporated by reference:

Japanese Patent Application No. 2009-257359 filed on Nov. 10, 2009;

Japanese Patent Application No. 2009-257367 filed on Nov. 10, 2009; and Japanese Patent Application No. 2009-257385 filed on Nov. 10, 2009.

BACKGROUND OF THE INVENTION

1. Field of the Invention

The present invention relates to a wide-angle lens suitable for an image-taking lens, an imaging apparatus, and a method for manufacturing the wide-angle lens.

2. Related Background Art

There has been proposed a retrofocus-type wide-angle lens (hereinafter simply called as a wide-angle lens in the present specification) used for a camera in such as Japanese Patent Application Laid-Open No. 2001-159732.

However, the conventional wide-angle lens has had a problem that when an angle of view is to be realized, it becomes difficult to keep high optical performance.

SUMMARY OF THE INVENTION

The present invention is made in view of the above-described problem.

According to a first aspect of the present invention, there is provided a wide-angle lens comprising: a front lens group disposed to an object side of an aperture stop; and a rear lens group disposed to an image side of the aperture stop; the front lens group including a sub-lens group having negative refractive power, the sub-lens group including, in order from the most object side, at least three negative lenses, at least one of the three negative lenses being an aspherical negative meniscus lens, the aspherical negative meniscus lens having a shape that negative refractive power is getting smaller from the center to the periphery, a cemented lens constructed by a positive lens cemented with a negative lens cemented with a positive lens being disposed to the image side of the sub-lens group, and the following conditional expressions (1) and (2) being satisfied:

$$0.30 < |Rasp|/hasp < 0.90 \quad (1)$$

$$-1.00 < (Rr+Rf)/(Rr-Rf) < 0.00 \quad (2)$$

where Rasp denotes a paraxial radius of curvature of an aspherical surface of the aspherical negative meniscus lens having the shape that negative refractive power is getting smaller from the center to the periphery, hasp denotes a half of an effective diameter (maximum effective radius) of the aspherical negative meniscus lens having the shape that negative refractive power is getting smaller from the center to the periphery, Rr denotes a radius of curvature of the image side surface of the negative lens in the cemented lens, and Rf denotes a radius of curvature of the object side surface of the negative lens in the cemented lens.

According to a second aspect of the present invention, there is provided an imaging apparatus equipped with the wide-angle lens according to the first aspect.

According to a third aspect of the present invention, there is provided a wide-angle lens comprising, in order from an object side: a first lens group having negative refractive power; a second lens group having positive refractive power; and a third lens group having positive refractive power; the second lens group being movable to an image side, thereby carrying out focusing from an infinity object to a close object.

According to a fourth aspect of the present invention, there is provided an imaging apparatus equipped with the wide-angle lens according to the third aspect.

According to a fifth aspect of the present invention, there is provided a wide-angle lens comprising, in order from an object side: a first lens group having negative refractive power; a second lens group having positive refractive power; and a third lens group having positive refractive power; the second lens group being moved to an image side and the third lens group being moved to the object side thereby carrying out focusing from an infinity object to a close object, and the following conditional expression (12) being satisfied:

$$0.01 < (-X3)/X2 < 0.90 \quad (12)$$

where X3 denotes a moving amount of the third lens group upon focusing from an infinity object to a close object, and X2 denotes a moving amount of the second lens group upon focusing from an infinity object to a close object, in which the moving amount is positive upon moving to the image side.

According to a sixth aspect of the present invention, there is provided an imaging apparatus equipped with the wide-angle lens according to the fifth aspect.

According to a seventh aspect of the present invention, there is provided a method for manufacturing a wide-angle lens including a front lens group disposed to an object side of an aperture stop, and a rear lens group disposed to an image side of the aperture stop comprising steps of: disposing optical members including at least three negative lenses including an aspherical negative meniscus lens having a shape that negative refractive power is getting weaker from the center to the periphery in the object side sub-lens group in the front lens group; disposing optical members including a cemented lens constructed by a positive lens, a negative lens, and a positive lens to the image side of the sub-lens group; satisfying the following conditional expressions (1) and (2):

$$0.30 < |Rasp|/hasp < 0.90 \quad (1)$$

$$-1.00 < (Rr+Rf)/(Rr-Rf) < 0.00 \quad (2)$$

where Rasp denotes a paraxial radius of curvature of an aspherical surface of the aspherical negative meniscus lens having the said shape, hasp denotes a half of an effective diameter (maximum effective radius) of the aspherical negative meniscus lens having the said shape, Rr denotes a radius of curvature of the image side surface of the negative lens in the cemented lens, and Rf denotes a radius of curvature of the object side surface of the negative lens in the cemented lens.

According to an eighth aspect of the present invention, there is provided a method for manufacturing a wide-angle lens comprising steps of: disposing optical members including, in order from an object side, a first lens group having negative refractive power, a second lens group having positive refractive power, and a third lens group having positive refractive power into a lens barrel; and disposing a mechanism for moving the second lens group to the image plane side upon focusing from an infinity object to a close object is disposed.

According to a ninth aspect of the present invention, there is provided a method for manufacturing a wide-angle lens comprising steps of: disposing optical members including, in order from an object side, a first lens group having negative refractive power, a second lens group having positive refractive power, and a third lens group having positive refractive power in a lens barrel, thereby satisfying the following conditional expression (12):

$$0.01<(-X3)/X2<0.90 \qquad (12)$$

where X3 denotes a moving amount of the third lens group upon focusing from an infinity object to a close object, and X2 denotes a moving amount of the second lens group upon focusing from an infinity object to a close object, in which the moving amount is positive upon moving to the image side; and disposing a mechanism for moving the second lens group to an image side and moving the third lens group to the object side upon focusing from an infinity object to a close object.

The present invention makes it possible to provide a wide-angle lens having high optical performance with having a wide angle of view, an imaging apparatus, and a method for manufacturing the wide-angle lens.

BRIEF DESCRIPTION OF THE DRAWINGS

FIG. 6 shows graphs of various aberrations of the wide-angle lens according to Example 3 upon focusing on infinity.

FIG. 7 is a sectional view showing a lens configuration of a wide-angle lens focusing on infinity according to Example 4 of a second embodiment of the present application.

FIGS. 8A and 8B show graphs of various aberrations of the wide-angle lens according to Example 4, in which FIG. 8A is a state upon focusing on infinity, and FIG. 8B is a state upon focusing on a close object.

FIGS. 10A and 10B show graphs of various aberrations of the wide-angle lens according to Example 5, in which FIG. 10A is a state upon focusing on infinity, and FIG. 10B is a state upon focusing on a close object.

FIG. 11 is a sectional view showing a lens configuration of a wide-angle lens focusing on infinity according to Example 6 of the second embodiment of the present application.

FIGS. 12A and 12B show graphs of various aberrations of the wide-angle lens according to Example 6, in which FIG. 12A is a state upon focusing on infinity, and FIG. 12B is a state upon focusing on a close object.

FIG. 13 is a sectional view showing a lens configuration of a wide-angle lens focusing on infinity according to Example 7 of the second embodiment of the present application.

FIGS. 14A and 14B show graphs of various aberrations of the wide-angle lens according to Example 7, in which FIG. 14A is a state upon focusing on infinity, and FIG. 14B is a state upon focusing on a close object.

FIGS. 16A and 16B show graphs of various aberrations of the wide-angle lens according to Example 8, in which FIG. 16A is a state upon focusing on infinity, and FIG. 16B is a state upon focusing on a close object.

FIGS. 18A and 18B show graphs of various aberrations of the wide-angle lens according to Example 9, in which FIG. 18A is a state upon focusing on infinity, and FIG. 18B is a state upon focusing on a close object.

FIG. 19 is a sectional view showing a lens configuration of a wide-angle lens focusing on infinity according to Example 10 of the third embodiment of the present application.

FIGS. 20A and 20B show graphs of various aberrations of the wide-angle lens according to Example 10, in which FIG. 20A is a state upon focusing on infinity, and FIG. 20B is a state upon focusing on a close object.

DESCRIPTION OF THE MOST PREFERRED EMBODIMENT

First Embodiment

Figure 1:
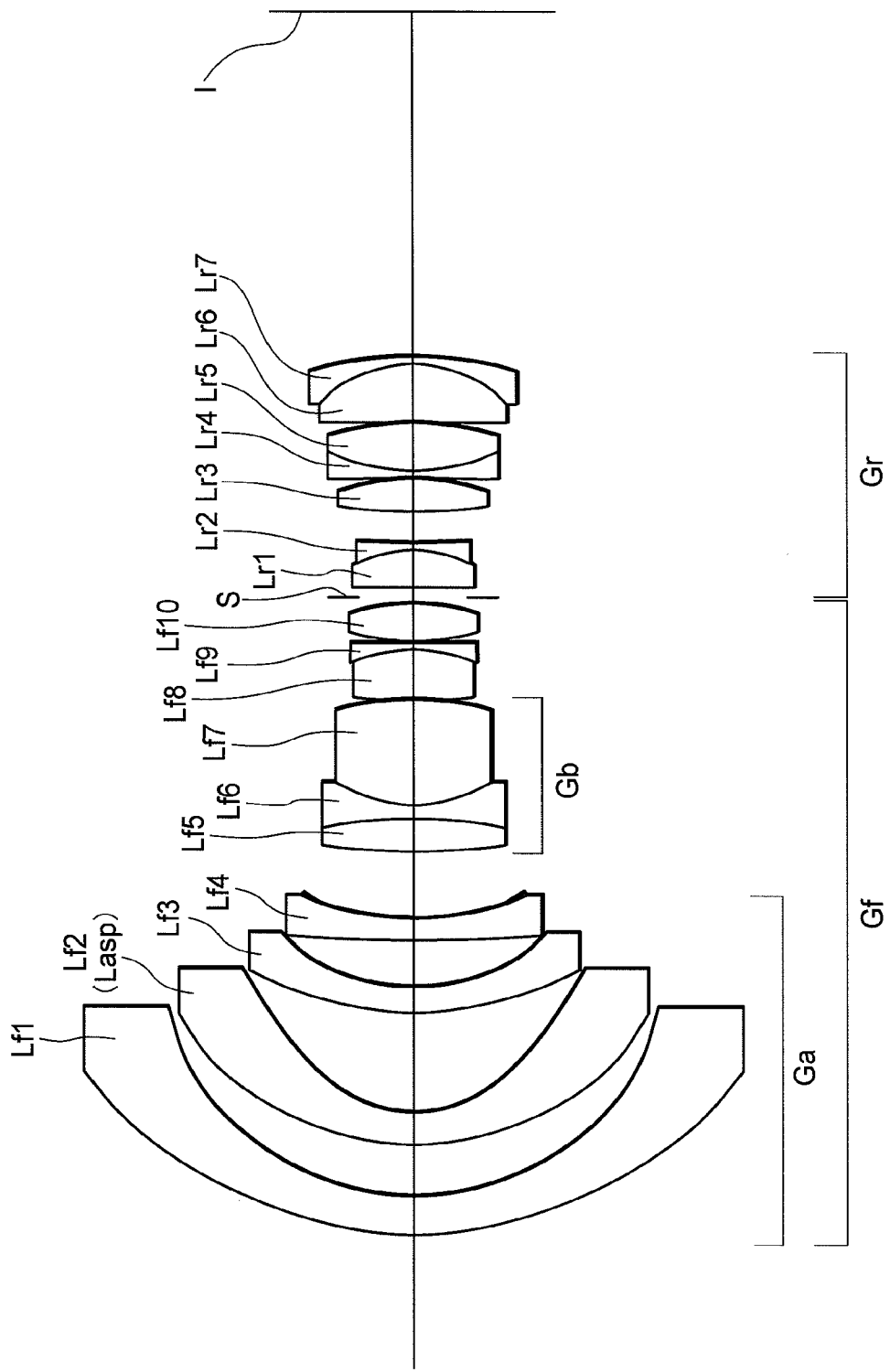
FIG. 1 is a sectional view showing a lens configuration of a wide-angle lens focusing on infinity according to Example 1 of a first embodiment of the present application.

A wide-angle lens according to a first embodiment of the present application is explained below. The following embodiment only shows for better understandings of the present invention. Accordingly, any operable addition or conversion capable of being carried out by a person having ordinary skill in the art is not intended to be excluded within a scope of the present invention.

A wide-angle lens according to the first embodiment includes, a front lens group disposed to an object side of an aperture stop, and a rear lens group disposed to an image side of the aperture stop. The front lens group includes a sub-lens group having negative refractive power. The sub-lens group includes, in order from the most object side, at least three negative lenses. At least one lens among the at least three negative lenses is constructed by an aspherical negative meniscus lens. The aspherical negative meniscus lens has a shape whose negative refractive power is getting smaller from the center to the periphery. A cemented lens constructed by a positive lens, a negative lens, and a positive lens is disposed to the image side of the sub-lens group. The following conditional expressions (1) and (2) are satisfied:

$$0.30<|Rasp|/hasp<0.90 \qquad (1)$$

$$-1.00<(Rr+Rf)/(Rr-Rf)<0.00 \qquad (2)$$

where Rasp denotes a paraxial radius of curvature of an aspherical surface of the aspherical negative meniscus lens having the shape, hasp denotes a half of an effective diameter (maximum effective radius) of the aspherical negative meniscus lens having the shape, Rr denotes a radius of curvature of the image side surface of the negative lens in the cemented lens, and Rf denotes a radius of curvature of the object side surface of the negative lens in the cemented lens.

With this construction, a wide-angle lens according to the first embodiment makes it possible to accomplish a wide angle of view and compactness, and to obtain high optical performance.

In a wide-angle lens according to the first embodiment, the sub-lens group in the front lens group includes at least one aspherical negative meniscus lens having a large aspherical amount. Accordingly, with correcting various aberrations by the aspherical negative meniscus lens, it becomes possible to excellently correct various aberrations, in particular, astigmatism, curvature of field, coma, and distortion, as well as to accomplish a wide angle of view and compactness. Incidentally, the sag amount denotes an amount of displacement of an aspherical surface from a spherical surface.

Conditional expression (1) relates to an aspherical amount of the aspherical negative meniscus lens having a shape whose negative refractive power is getting smaller from the center to the periphery. With satisfying conditional expression (1), it becomes possible to realize a wide-angle lens having high optical performance and a wide-angle of view with being compact. When a value which is a paraxial radius of curvature of an aspherical surface of the aspherical negative meniscus lens having the shape whose negative refractive power is getting smaller from the center to the periphery (|Raspl|) is divided by a half of an effective diameter of the aspherical negative meniscus lens (hasp) is equal to or falls below 1.00, it means exceeding a half sphere in a spherical surface. In the case of an aspherical surface, it means the aspherical amount becomes larger. Accordingly, it is important to define the value for realizing a wide-angle lens having a wide angle of view and compactness.

When the value |Raspl|/hasp is equal to or exceeds the upper limit of conditional expression (1), the aspherical amount becomes small, and the shape does not exceed a half sphere, so that the aspherical amount of the aspherical surface becomes further smaller. As a result, in a wide-angle lens according to the first embodiment, the aspherical amount does not become sufficient to correct aberrations, so that it becomes difficult to correct various aberrations, in particular, curvature of field, astigmatism, and coma.

In order to excellently correct various aberrations, it is preferable to set the upper limit of conditional expression (1) to 0.80. In order to further excellently correct various aberrations, it is preferable to set the upper limit of conditional expression (1) to 0.73. In order to still further excellently correct various aberrations, it is preferable to set the upper limit of conditional expression (1) to 0.70, so that the effect of the present invention can fully be exhibited.

On the other hand, when the value |Raspl|/hasp is equal to or falls below the lower limit of conditional expression (1), the aspherical amount of the aspherical negative meniscus lens becomes excessively large, so that it becomes difficult to manufacture the aspherical surface. Moreover, a curve of distortion becomes excessively large. Incidentally, the curve denotes difference in the aberration amount with respect to the height of the image.

With setting the lower limit of conditional expression (1) to 0.35, the curvature of distortion can be suppressed, and manufacturing the aspherical surface does not become difficult. Moreover, with setting lower limit of conditional expression (1) to 0.40, the effect of the present invention can be exhibited. Moreover, with setting lower limit of conditional expression (1) to 0.50, the effect of the present invention can fully be exhibited.

Conditional expression (2) defines an appropriate range of a shape factor (q-factor) of the negative lens in the cemented lens of a positive-negative-positive construction in the front lens group. With satisfying conditional expression (2), it becomes possible to accomplish a wide-angle lens having high optical performance with securing a sufficient back focal length.

In a negative lens, when the shape factor is −1.00, the lens is a plano-concave lens having a plane surface facing the object side. When the shape factor is 0.00, the lens is a double concave negative lens, in which the absolute value of the radius of curvature of the object side surface is the same as that of the image side surface. Accordingly, in a wide-angle lens according to the first embodiment, the negative lens in the cemented lens becomes a double concave negative lens whose absolute value of the radius of curvature of the object side lens surface is always larger than that of the image side lens surface. A cemented lens having such a negative lens has an effect to excellently correct various aberrations, in particular, coma, curvature of field, and lateral chromatic aberration. With this negative lens, it becomes possible to locate the principal point to the image side. As a result, with the effect of the cemented lens together with the effect of the negative lens in the sub-lens group in the front lens group, a wide-angle lens according to the first embodiment makes it possible to realize extremely large retrofocus ratio and to secure sufficient back focal length. Incidentally, the retrofocus ratio means a ratio of the focal length F0 of the wide-angle lens to the back focal length BF that is F0/BF.

When the value (Rr+Rf)/(Rr−Rf) is equal to or exceeds the upper limit of conditional expression (2), the negative lens in the cemented lens becomes a double concave negative lens having a shape that the absolute value of the radius of curvature of the image side lens surface is smaller than that of the object side lens surface. However, with the negative lens having such a shape, it becomes impossible to locate the principal point to the image side. Moreover, the curves (difference in the values with respect to the image height) of the coma, curvature of field and lateral chromatic aberration become worse, so that it becomes impossible to accomplish a wide-angle of view.

With setting the upper limit of conditional expression (2) to −0.01, it becomes possible to excellently correct coma, curvature of field, and lateral chromatic aberration. With setting the upper limit of conditional expression (2) to −0.05, it becomes possible to excellently correct these aberrations. With setting the upper limit of conditional expression (2) to −0.11, it becomes possible to further excellently correct these aberrations. With setting the upper limit of conditional expression (2) to −0.15, the effect of the present invention can fully be exhibited.

On the other hand, when the value (Rr+Rf)/(Rr−Rf) is equal to or falls below the lower limit of conditional expression (2), the negative lens in the cemented lens becomes a plano-concave lens having a plane surface facing the object side. When the value (Rr+Rf)/(Rr−Rf) further falls below the lower limit of conditional expression (2), the object side lens surface becomes a meniscus shape having a convex surface facing the object side. When the object side lens surface becomes a convex surface, aberration correction effect of the object side cemented surface of the negative lens in the cemented lens becomes insufficient, so that it becomes insufficient to correct various aberrations, in particular, coma, lateral chromatic aberration, and spherical aberration becomes worse.

With setting the lower limit of conditional expression (2) to −0.90, it becomes possible to excellently correct various aberrations such as coma. With setting the lower limit of conditional expression (2) to −0.80, it becomes possible to excellently correct various aberrations such as coma. With setting the lower limit of conditional expression (2) to −0.70, it becomes possible to further excellently correct various aberrations such as coma, and the effect of the present invention can fully be exhibited.

In a wide-angle lens according to the first embodiment, the following conditional expression (3) is preferably satisfied:

$$0.00 < Ff/F0 < 11.00 \tag{3}$$

where Ff denotes a focal length of the front lens group upon focusing on infinity, and F0 denotes a focal length of the wide-angle lens upon focusing on infinity.

Conditional expression (3) defines an appropriate range of the focal length of the front lens group. With satisfying conditional expression (3), it becomes possible to realize a wide-angle lens having high optical performance with a wide angle of view.

In a wide-angle lens according to the first embodiment, refractive power of the front lens group is positive, and large refractive power is disposed to the front lens group. With disposing large positive refractive power to the front lens group, it becomes possible to construct a retrofocus-type wide-angle lens having considerable refractive power in the front lens group.

When the ratio Ff/F0 is equal to or exceeds the upper limit of conditional expression (3), refractive power of the front lens group becomes small, and refractive power distribution of a retrofocus-type becomes weak, so that the total lens length of a wide-angle lens becomes large. Accordingly, when it is forcibly shortened, spherical aberration and coma become worse.

With setting the upper limit of conditional expression (3) to 9.00, it becomes possible to excellently correct various aberrations with accomplishing compactness. With setting the upper limit of conditional expression (3) to 7.00, it becomes possible to further excellently correct various aberrations. With setting the upper limit of conditional expression (3) to 5.00, it becomes possible to further excellently correct various aberrations, and the effect of the present invention can fully be exhibited.

On the other hand, when the ratio Ff/F0 is equal to or falls below the lower limit of conditional expression (3), the focal length of the front lens group upon focusing on infinity becomes negative value, so that optimum refractive power distribution is lost, and the front lens group disposed up to right before the aperture stop comes to have negative refractive power. As a result, spherical aberration, coma, in particular, upper coma become worse.

With setting the lower limit of conditional expression (3) to 0.10, it becomes possible to excellently correct various aberrations. With setting the lower limit of conditional expression (3) to 0.20, it becomes possible to further excellently correct various aberrations. With setting the lower limit of conditional expression (3) to 0.50, it becomes possible to further excellently correct various aberrations, and the effect of the present invention can fully be exhibited.

In a wide-angle lens according to the first embodiment, the following conditional expression (4) is preferably satisfied:

$$0.30 < F0/Fb < 0.50 \tag{4}$$

where F0 denotes a focal length of the wide-angle lens upon focusing on infinity, and Fb denotes a focal length of the cemented lens.

Conditional expression (4) defines an appropriate range of refractive power of the cemented lens in the front lens group. With satisfying conditional expression (4), it becomes possible to realize a wide-angle lens having high optical performance and a wide angle of view with being compact.

In a wide-angle lens according to the first embodiment, with giving large refractive power to the negative lens in the cemented lens, positive refractive power of the cemented lens becomes small, or negative refractive power is given to the cemented lens, so that it becomes possible to realize a wide angle of view and compactness.

When the ratio F0/Fb is equal to or exceeds the upper limit of conditional expression (4), refractive power of the negative lens in the cemented lens becomes small, and positive refractive power of the cemented lens becomes large. As a result, the retrofocus ratio becomes small, so that it becomes difficult to secure the back focal length. Moreover, lateral chromatic aberration becomes worse.

With setting the upper limit of conditional expression (4) to 0.40, it becomes possible to excellently correct lateral chromatic aberration.

With setting the upper limit of conditional expression (4) to 0.30, it becomes possible to further excellently correct lateral chromatic aberration. With setting the upper limit of conditional expression (4) to 0.25, it becomes possible to further excellently correct lateral chromatic aberration, and the effect of the present invention can fully be exhibited.

On the other hand, when the ratio F0/Fb is equal to or falls below the lower limit of conditional expression (4), refractive power of the negative lens in the cemented lens becomes excessively large, and negative refractive power of the cemented lens becomes large, so that curvatures of curvature of field, distortion, and lateral chromatic aberration become worse.

With setting the lower limit of conditional expression (4) to −0.20, it becomes possible to excellently correct various aberrations, in particular, curvature of field, distortion and lateral chromatic aberration. With setting the lower limit of conditional expression (4) to −0.10, it becomes possible to further excellently correct various aberrations, in particular, curvature of field, distortion and lateral chromatic aberration. With setting the lower limit of conditional expression (4) to −0.15, it becomes possible to further excellently correct various aberrations, in particular, curvature of field, distortion and lateral chromatic aberration, and the effect of the present invention can fully be exhibited.

In a wide-angle lens according to the first embodiment, the sub-lens group preferably includes an aspherical lens other than the aspherical negative meniscus lens. With this construction, it becomes possible to excellently correct off-axis aberrations, in particular, distortion, curvature of field, and coma.

In a wide-angle lens according to the first embodiment, the aspherical lens preferably has larger negative refractive power on the periphery than at the center of the lens. Since such an aspherical surface and the above-described aspherical negative meniscus lens (in which negative refractive power is getting smaller from the center to the periphery) have opposite aspherical effect with each other, with combining them, a wide-angle lens according to the first embodiment makes it possible to excellently correct curvature of field, astigmatism and coma with accomplishing a wide angle of view. Incidentally, a portion where negative refractive power becomes lager than the central portion is preferably the most peripheral portion.

In a wide-angle lens according to the first embodiment, the following conditional expression (5) is preferably satisfied:

$$0.01 < (-Fa)/BF < 0.80 \tag{5}$$

where Fa denotes a focal length of the sub-lens group, and BF denotes a distance from a vertex of the most image side lens surface to a paraxial image plane (a back focal length).

Conditional expression (5) defines an appropriate range of the focal length (refractive power) of the sub-lens group of a wide-angle lens according to the first embodiment. With satisfying conditional expression (5), it becomes possible to realize a wide-angle lens having high optical performance and compactness with securing a back focal length.

When the ratio (−Fa)/BF is equal to or exceeds the upper limit of conditional expression (5), the focal length of the sub-lens group becomes large, and refractive power of the sub-lens group becomes small. In this case, the retrofocus ratio becomes small, so that it becomes difficult to secure the back focal length. Moreover, the front lens group becomes large, so that the wide-angle lens becomes large. On this occasion, when the lens is forcibly made compact or the back focal length is forcibly secured, off-axis aberrations such as coma become worse.

With setting the upper limit of conditional expression (5) to 0.70, the effect of the present invention can be secured. With setting the upper limit of conditional expression (5) to 0.50, the effect of the present invention can further be secured. With setting the upper limit of conditional expression (5) to 0.40, the effect of the present invention can fully be exhibited.

On the other hand, when the ratio (−Fa)/BF is equal to or falls below the lower limit of conditional expression (5), the focal length of the sub-lens group becomes small, and refractive power of the sub-lens group becomes large. When refractive power of the sub-lens group becomes excessively large, distortion, curvature of field and coma become worse.

With setting the lower limit of conditional expression (5) to 0.10, it becomes possible to excellently correct various aberrations. With setting the lower limit of conditional expression (5) to 0.15, it becomes possible to further excellently correct various aberrations. With setting the lower limit of conditional expression (5) to 0.20, it becomes possible to further excellently correct various aberrations, and the effect of the present invention can fully be exhibited.

In a wide-angle lens according to the first embodiment, the following conditional expression (6) is preferably satisfied:

$$4.00 < Fr/F0 < 50.00 \qquad (6)$$

where Fr denotes a focal length of the rear lens group upon focusing on infinity, and F0 denotes a focal length of the wide-angle lens upon focusing on infinity.

Conditional expression (6) defines an appropriate range of the focal length (refractive power) of the rear lens group. With satisfying conditional expression (6), it becomes possible to realize a wide-angle lens having high optical performance.

When the ratio Fr/F0 is equal to or exceeds the upper limit of conditional expression (6), refractive power of the rear lens group becomes small, and distortion and coma become worse.

With setting the upper limit of conditional expression (6) to 40.00, it becomes possible to excellently correct various aberrations. With setting the upper limit of conditional expression (6) to 35.00, it becomes possible to further excellently correct various aberrations. With setting the upper limit of conditional expression (6) to 30.00, it becomes possible to further excellently correct various aberrations, and the effect of the present invention can fully be exhibited.

On the other hand, when the ratio Fr/F0 is equal to or falls below the lower limit of conditional expression (6), refractive power of the rear lens group becomes excessively large, so that spherical aberration and coma become worse.

With setting the lower limit of conditional expression (6) to 4.50, it becomes possible to excellently correct various aberrations. With setting the lower limit of conditional expression (6) to 5.10, it becomes possible to further excellently correct various aberrations. With setting the lower limit of conditional expression (6) to 6.00, it becomes possible to further excellently correct various aberrations, and the effect of the present invention can fully be exhibited.

In a wide-angle lens according to the first embodiment, the following conditional expression (7) is preferably satisfied:

$$0.05 < Nn - ((Np1 + Np2)/2) < 0.30 \qquad (7)$$

where Nn denotes a refractive index at d-line (wavelength λ=587.6 nm) of the negative lens in the cemented lens, Np1 denotes a refractive index at d-line of the positive lens disposed to the object side in the cemented lens, and Np2 denotes a refractive index at d-line of the positive lens disposed to the image side in the cemented lens.

Conditional expression (7) defines an appropriate range of a difference between the refractive index of the negative lens in the cemented lens and an average value of refractive indices of the two positive lenses in the cemented lens. With satisfying conditional expression (7), it becomes possible to realize a wide-angle lens having high optical performance.

When the value $Nn-((Np1+Np2)/2)$ is equal to or exceeds the upper limit of conditional expression (7), the difference between the refractive index of the negative lens in the cemented lens and the average value of refractive indices of the two positive lenses in the cemented lens becomes large, and Petzval sum does not become optimum value, so that curvature of field and astigmatism become worse.

With setting the upper limit of conditional expression (7) to 0.25, it becomes possible to excellently correct various aberrations. With setting the upper limit of conditional expression (7) to 0.20, it becomes possible to further excellently correct various aberrations. With setting the upper limit of conditional expression (7) to 0.19, it becomes possible to further excellently correct various aberrations, and the effect of the present invention can fully be exhibited.

On the other hand, when the value $Nn-((Np1+Np2)/2)$ is equal to or falls below the lower limit of conditional expression (7), the difference between the refractive index of the negative lens in the cemented lens and the average value of refractive indices of the two positive lenses in the cemented lens becomes small, so that curvature of field, coma and spherical aberration become worse.

With setting the lower limit of conditional expression (7) to 0.08, it becomes possible to excellently correct various aberrations. With setting the lower limit of conditional expression (7) to 0.10, it becomes possible to further excellently correct various aberrations. With setting the lower limit of conditional expression (7) to 0.12, it becomes possible to further excellently correct various aberrations, and the effect of the present invention can fully be exhibited.

In a wide-angle lens according to the first embodiment, the sub-lens group is preferably composed of negative lenses only. With this construction, it becomes possible to make the diameter of the front lens small. Moreover, curve of distortion can be suppressed.

Figure 22:
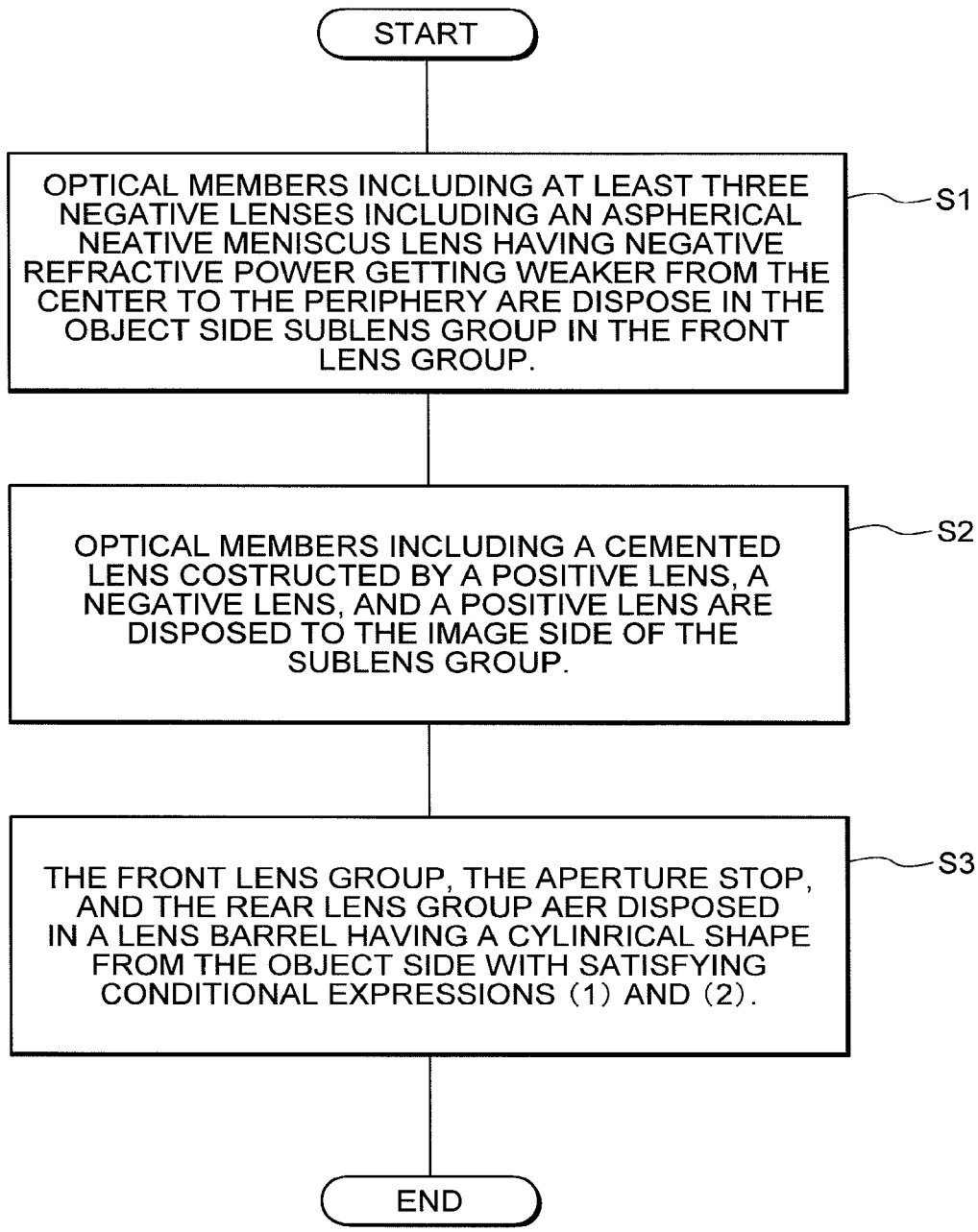
FIG. 22 is a flowchart showing a method for manufacturing a wide-angle lens according to the first embodiment of the present application.

Then, an outline of a method for manufacturing a wide-angle lens according to the first embodiment is explained below with reference to FIG. 22. FIG. 22 is a flowchart showing a method for manufacturing a wide-angle lens according to the first embodiment of the present application.

The method for manufacturing a wide-angle lens according to the first embodiment of the present application is a method for manufacturing a wide-angle lens including a front lens group disposed to an object side of an aperture stop, and a rear lens group disposed to an image side of the aperture stop, and includes the following steps S1 through S3 shown in FIG. 22.

Step S1: optical members including at least three negative lenses including an aspherical negative meniscus lens having a shape that negative refractive power is getting weaker from the center to the periphery are disposed in the object side sub-lens group in the front lens group.

Step S2: optical members including a cemented lens constructed by a positive lens, a negative lens, and a positive lens are disposed to the image side of the sub-lens group.

Step S3: the front lens group, the aperture stop, and the rear lens group are disposed in a lens barrel having a cylindrical shape from the object side with satisfying conditional expressions (1) and (2):

$$0.30 < |Rasp|/hasp < 0.90 \quad (1)$$

$$-1.00 < (Rr+Rf)/(Rr-Rf) < 0.00 \quad (2)$$

where Rasp denotes a paraxial radius of curvature of an aspherical surface of the aspherical negative meniscus lens having the shape, hasp denotes a half of an effective diameter (maximum effective radius) of the aspherical negative meniscus lens having the shape, Rr denotes a radius of curvature of the image side surface of the negative lens in the cemented lens, and Rf denotes a radius of curvature of the object side surface of the negative lens in the cemented lens.

A method for manufacturing a wide-angle lens according to the first embodiment of the present application makes it possible to manufacture a wide-angle lens having excellent optical performance with a wide angle of view.

Each example of a wide-angle lens according to the first embodiment is explained below with reference to accompanying drawings.

Example 1

FIG. 1 is a sectional view showing a lens configuration of a wide-angle lens according to Example 1 of a first embodiment of the present application.

The wide-angle lens according to Example 1 is composed of, in order from an object side, a front lens group Gf having positive refractive power, an aperture stop S, and a rear lens group Gr having positive refractive power.

The front lens group Gf includes a sub-lens group Ga having negative refractive power. The sub-lens group Ga is composed of, in order from the most object side, a negative meniscus lens Lf1 having a convex surface facing the object side, a negative meniscus lens Lf2 (Lasp) having a convex surface facing the object side and an aspherical surface having a large aspherical amount formed on the image side surface, a negative meniscus lens Lf3 having a convex surface facing the object side, and a negative meniscus lens Lf4 having a convex surface facing the object side and an aspherical surface formed on the image side surface. The negative meniscus lens Lf4 is a compound type aspherical lens composed of a glass lens and a resin material.

The front lens group Gf further includes, to the image side of the sub-lens group Ga in order from the object side, a cemented positive lens Gb constructed by a double convex positive lens Lf5 cemented with a double concave negative lens Lf6 cemented with a double convex positive lens Lf7, a cemented negative lens constructed by double convex positive lens Lf8 cemented with a double concave negative lens Lf9, and a double convex positive lens Lf10.

The rear lens group Gr is composed of, in order from the object side, a cemented negative lens constructed by a double convex positive lens Lr1 cemented with a double concave negative lens Lr2, a double convex positive lens Lr3, a cemented negative lens constructed by a double concave negative lens Lr4 cemented with a double convex positive lens Lf5, and a cemented negative lens constructed by a double convex positive lens Lr6 cemented with a negative meniscus lens Lr7 having a convex surface facing the image side.

Various values associated with the wide-angle lens according to Example 1 are listed in Table 1.

In [Specifications], F0 denotes a focal length of the wide-angle lens, FNO denotes an f-number, ω denotes a half angle of view, Y denotes an image height, TL denotes a total lens length, BF denotes a back focal length, and hasp denotes a half of an effective diameter (maximum effective radius) of the aspherical negative meniscus lens having a shape whose negative refractive power is getting smaller from the center to the periphery.

In [Lens Data], the left most column "i" shows the lens surface number counted in order from the object side, the second column "r" shows a radius of curvature of the lens surface, the third column "d" shows a distance to the next surface, the fourth column "nd" shows refractive index at d-line (wavelength λ=587.6 nm), and the fifth column "vd" shows an Abbe number at d-line (wavelength λ=587.6 nm). In the fifth column "nd" refractive index of the air nd=1.000000 is omitted. In the second column "r", r=∞ denotes a plane surface. An aspherical surface is expressed by attaching "*" to the left side of the lens surface number.

In [Aspherical Surface Data], when "y" denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order, the aspherical surface is exhibited by the following expression:

$$X(y)=(y^2/r)/[1+\{1-\kappa \times (y^2/r)^2\}^{1/2}]+A3 \times |y|^3+A4 \times y^4+A6 \times y^6+A8 \times y^8+A10 \times y^{10}+A12 \times y^{12}+A14 \times y^{14}+A16 \times y^{16}+A18 \times y^{18}$$

In [Aspherical Surface Data], "E-n" denotes "×10$^{-n}$", in which "n" is an integer, and for example "1.234E−05" denotes "1.234×10$^{-5}$".

In [Lens Group Data], a starting surface number "I" and a focal length of each lens group are shown.

In [Values for Conditional Expressions], values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

[Specifications]

F0 = 17.11
FNO = 4.08
ω = 63.03°
Y = 33.00
TL = 188.30

TABLE 1-continued

[Specifications]

BF = 53.036
hasp = 23.45

[Lens Data]

| i | r | d | nd | νd |
|---|---|---|---|---|
| 1) | 55.7193 | 6.0000 | 1.816000 | 46.63 |
| 2) | 35.5890 | 8.0000 | | |
| 3) | 38.4103 | 5.0000 | 1.744429 | 49.52 |
| 4)* | 16.3041 | 15.2654 | | |
| 5) | 46.4851 | 4.0000 | 1.497820 | 82.56 |
| 6) | 26.2269 | 7.1871 | | |
| 7) | 243.1206 | 3.2000 | 1.816000 | 46.63 |
| 8) | 38.0000 | 0.3000 | 1.553890 | 38.09 |
| 9)* | 47.2922 | 10.2085 | | |
| 10) | 89.3594 | 5.0000 | 1.620040 | 36.24 |
| 11) | −56.6985 | 2.0000 | 1.772500 | 49.61 |
| 12) | 20.1399 | 16.2376 | 1.620040 | 36.30 |
| 13) | −44.0814 | 0.1000 | | |
| 14) | 182.3038 | 7.7000 | 1.516800 | 64.12 |
| 15) | −18.4419 | 1.0000 | 1.755000 | 52.29 |
| 16) | 850.8298 | 0.1000 | | |
| 17) | 31.8462 | 6.0000 | 1.517420 | 52.32 |
| 18) | −28.2936 | 1.0000 | | |
| 19> | ∞ | 1.5000 | Aperture Stop S | |
| 20) | 747.4754 | 5.8000 | 1.516800 | 64.12 |
| 21) | −16.2847 | 1.0000 | 1.772500 | 49.61 |
| 22) | 133.1446 | 4.9671 | | |
| 23) | 79.0725 | 5.0000 | 1.516800 | 64.12 |
| 24) | −31.8944 | 0.1000 | | |
| 25) | −375.6194 | 1.0000 | 1.834810 | 42.72 |
| 26) | 26.0116 | 7.5000 | 1.497820 | 82.52 |
| 27) | −36.6478 | 0.1000 | | |
| 28) | 4349.6200 | 9.0000 | 1.497820 | 82.52 |
| 29) | −17.5712 | 1.0000 | 1.772500 | 49.61 |
| 30) | −54.0317 | 53.0362 | | |

[Aspherical Surface Data]

Surface Number: 4

κ = 0.2107
A3 = 0.00
A4 = 5.35500E−07
A6 = 2.01830E−08
A8 = −5.31700E−11
A10 = 6.83930E−14
A12 = 0.000
A14 = −0.47143E−19
A16 = −0.22240E−22
A18 = −0.55629E−25

Surface Number: 9

κ = −13.9080
A3 = 0.81216E−05
A4 = 2.85450E−05
A6 = −2.74190E−08
A8 = −1.66860E−11
A10 = 2.75060E−13
A12 = 0.14148E−14
A14 = −0.93816E−17
A16 = 0.16488E−19
A18 = 0.00

[Lens Group Data]

| Group | I | focal length |
|---|---|---|
| Gf | 1 | 16.350 |
| Gr | 20 | 355.951 |

[Values for Conditional Expressions]

(1): |Rasp|/hasp = 0.695
(2): (Rr + Rf)/(Rr − Rf) = −0.475
(3): Ff/F0 = 0.956
(4): F0/Fb = 0.189

TABLE 1-continued

[Specifications]

(5): (−Fa)/BF = 0.254
(6): Fr/F0 = 20.816
(7): Nn − ((Np1 + Np2)/2) = 0.153

Figure 2:
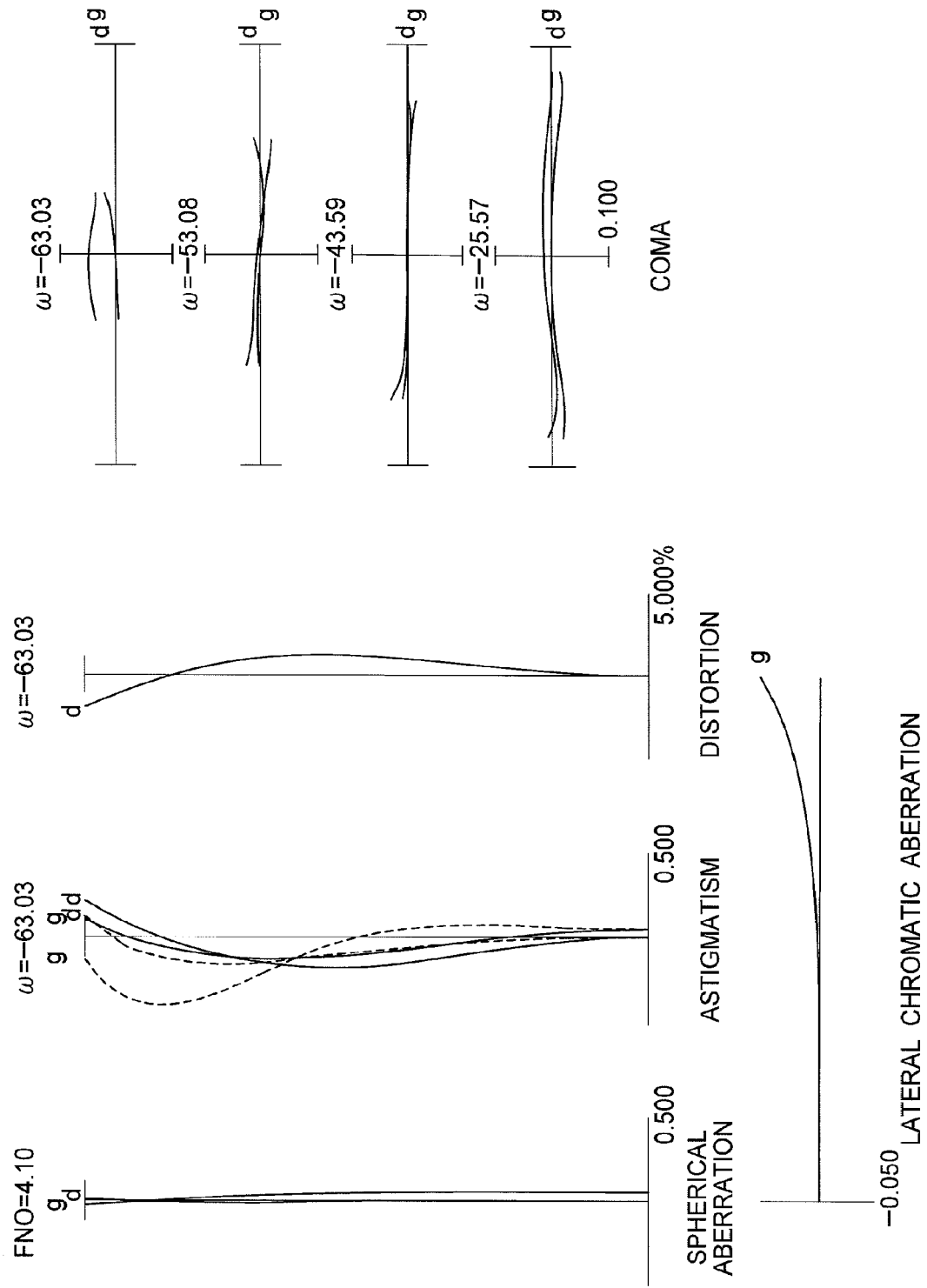
FIG. 2 shows graphs of various aberrations of the wide-angle lens according to Example 1 upon focusing on infinity.

FIG. 2 shows graphs of various aberrations of the wide-angle lens according to Example 1 upon focusing on infinity.

In respective graphs, FNO denotes an f-number, and ω denotes a half angle of view (unit: degrees). In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In graphs showing coma, a solid line shows meridional coma. The above-described explanation regarding various aberration graphs is the same as the other Examples.

As is apparent from FIG. 2, the wide-angle lens according to Example 1 shows superb optical performance as a result of good corrections to various aberrations.

Example 2

Figure 3:
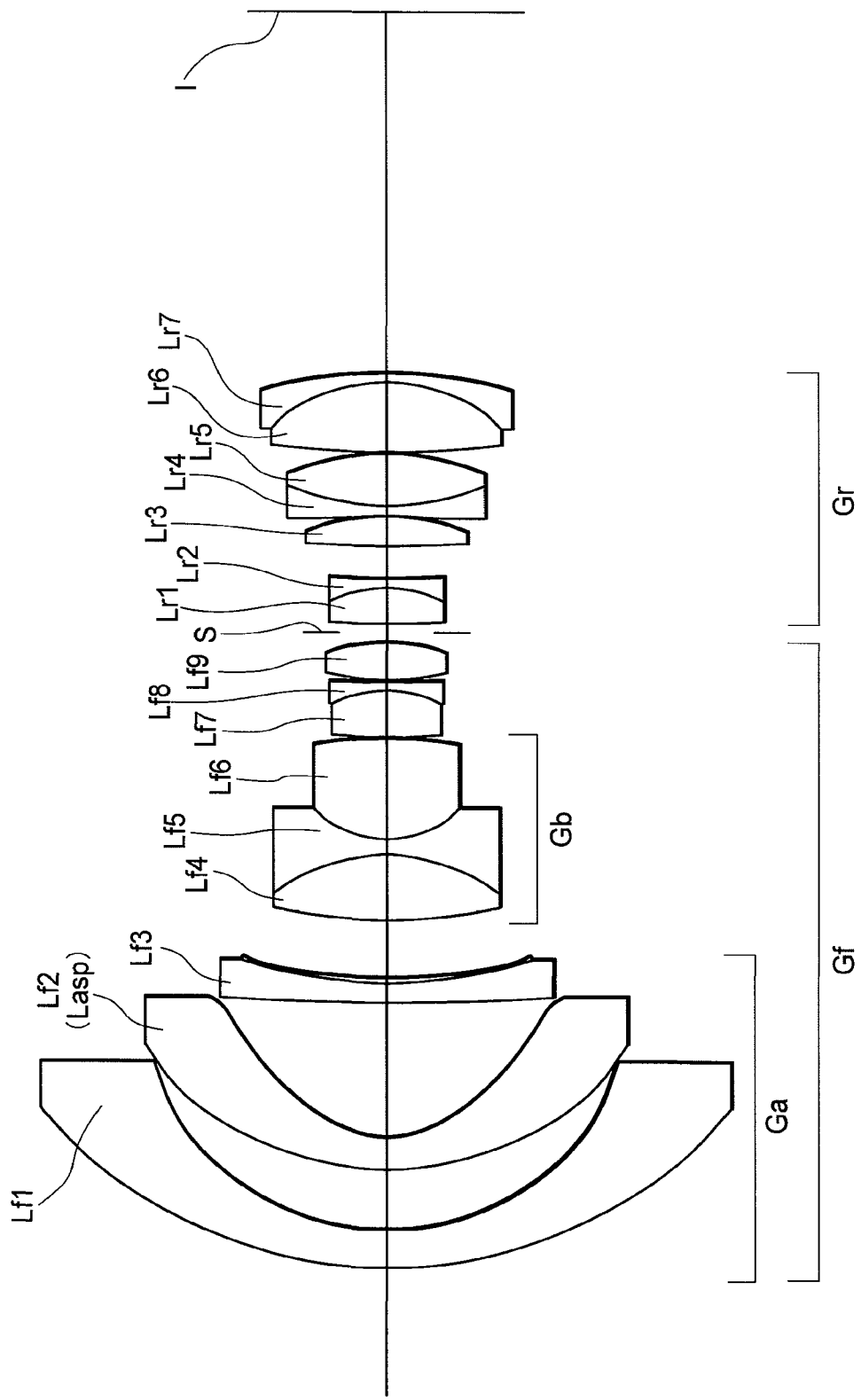
FIG. 3 is a sectional view showing a lens configuration of a wide-angle lens focusing on infinity according to Example 2 of the first embodiment of the present application.

FIG. 3 is a sectional view showing a lens configuration of a wide-angle lens according to Example 2 of the first embodiment of the present application.

The wide-angle lens according to Example 2 is composed of, in order from an object side, a front lens group Gf having positive refractive power, an aperture stop S, and a rear lens group Gr having positive refractive power.

The front lens group Gf includes a sub-lens group Ga having negative refractive power. The sub-lens group Ga is composed of, in order from the most object side, a negative meniscus lens Lf1 having a convex surface facing the object side, a negative meniscus lens Lf2 (Lasp) having a convex surface facing the object side and an aspherical surface having a large aspherical amount formed on the image side surface, and a negative meniscus lens Lf3 having a convex surface facing the object side and an aspherical surface formed on the image side surface. The negative meniscus lens Lf3 is a compound type aspherical lens composed of a glass lens and a resin material.

The front lens group Gf further includes, to the image side of the sub-lens group Ga in order from the object side, a cemented positive lens Gb constructed by a double convex positive lens Lf4 cemented with a double concave negative lens Lf5 cemented with a double convex positive lens Lf6, a cemented negative lens constructed by double convex positive lens Lf7 cemented with a double concave negative lens Lf8, and a double convex positive lens Lf9.

The rear lens group Gr is composed of, in order from the object side, a cemented negative lens constructed by a double convex positive lens Lr1 cemented with a double concave negative lens Lr2, a double convex positive lens Lr3, a cemented negative lens constructed by a double concave negative lens Lr4 cemented with a double convex positive lens Lr5, and a cemented positive lens constructed by a double convex positive lens Lr6 cemented with a negative meniscus lens Lr7 having a convex surface facing the image side.

Various values associated with the wide-angle lens according to Example 2 are listed in Table 2.

TABLE 2

[Specifications]

F0 = 10.3
FNO = 4.17
ω = 64.84°
Y = 21.6
TL = 132.78
BF = 38.10
hasp = 16.06

[Lens Data]

| i | r | d | nd | vd |
|---|---|---|---|---|
| 1) | 42.3831 | 4.0000 | 1.816000 | 46.63 |
| 2) | 23.2938 | 6.3000 | | |
| 3) | 27.5491 | 3.5000 | 1.729030 | 54.04 |
| 4)* | 9.7702 | 14.2885 | | |
| 5) | 273.4999 | 2.0000 | 1.755000 | 52.29 |
| 6) | 40.0000 | 0.5000 | 1.553890 | 38.09 |
| 7)* | 55.6948 | 6.1625 | | |
| 8) | 49.1830 | 7.0000 | 1.672700 | 32.11 |
| 9) | −16.1713 | 1.5000 | 1.816000 | 46.63 |
| 10) | 9.7963 | 10.7268 | 1.620040 | 36.30 |
| 11) | −36.6819 | 0.1000 | | |
| 12) | 533.9192 | 5.0000 | 1.516800 | 64.12 |
| 13) | −10.9681 | 1.0000 | 1.755000 | 52.29 |
| 14) | 233.8827 | 0.1000 | | |
| 15) | 26.0608 | 4.0000 | 1.517420 | 52.32 |
| 16) | −15.6077 | 1.0000 | | |
| 17> | ∞ | 1.0000 | Aperture Stop S | |
| 18) | 103.7491 | 3.8000 | 1.516800 | 64.12 |
| 19) | −11.1953 | 1.0000 | 1.772500 | 49.61 |
| 20) | 171.1107 | 3.5000 | | |
| 21) | 204.9527 | 3.0000 | 1.516800 | 64.12 |
| 22) | −20.2930 | 0.1000 | | |
| 23) | −82.6214 | 1.0000 | 1.834810 | 42.72 |
| 24) | 22.2173 | 5.5000 | 1.497820 | 82.52 |
| 25) | −24.2790 | 0.1000 | | |
| 26) | 84.6349 | 7.5000 | 1.497820 | 82.52 |
| 27) | −15.1083 | 1.0000 | 1.772500 | 49.61 |
| 28) | −38.2138 | 38.0998 | | |

[Aspherical Surface Data]

Surface Number: 4

κ = 0.1747
A3 = 0.00
A4 = −5.40210E−06
A6 = 3.09140E−08
A8 = −1.36590E−10
A10 = −3.34770E−13
A12 = −0.37424E−15
A14 = −0.19508E−18
A16 = −0.17694E−19
A18 = −0.21704E−22

Surface Number: 7

κ = −13.1668
A3 = 0.00
A4 = 2.72000E−05
A6 = −5.96150E−08
A8 = −2.51320E−11
A10 = 4.73940E−13
A12 = 0.20073E−14
A14 = −0.18435E−16
A16 = 0.60550E−20
A18 = 0.37962E−21

[Lens Group Data]

| Group | I | focal length |
|---|---|---|
| Gf | 1 | 17.872 |
| Gr | 18 | 69.147 |

TABLE 2-continued

[Specifications]

[Values for Conditional Expressions]

(1): |Raspl|/hasp = 0.608
(2): (Rr + Rf)/(Rr − Rf) = −0.246
(3): Ff/F0 = 1.735
(4): F0/Fb = 0.0404
(5): (−Fa)/BF = 0.301
(6): Fr/F0 = 6.714
(7): Nn − ((Np1 + Np2)/2) = 0.168

Figure 4:
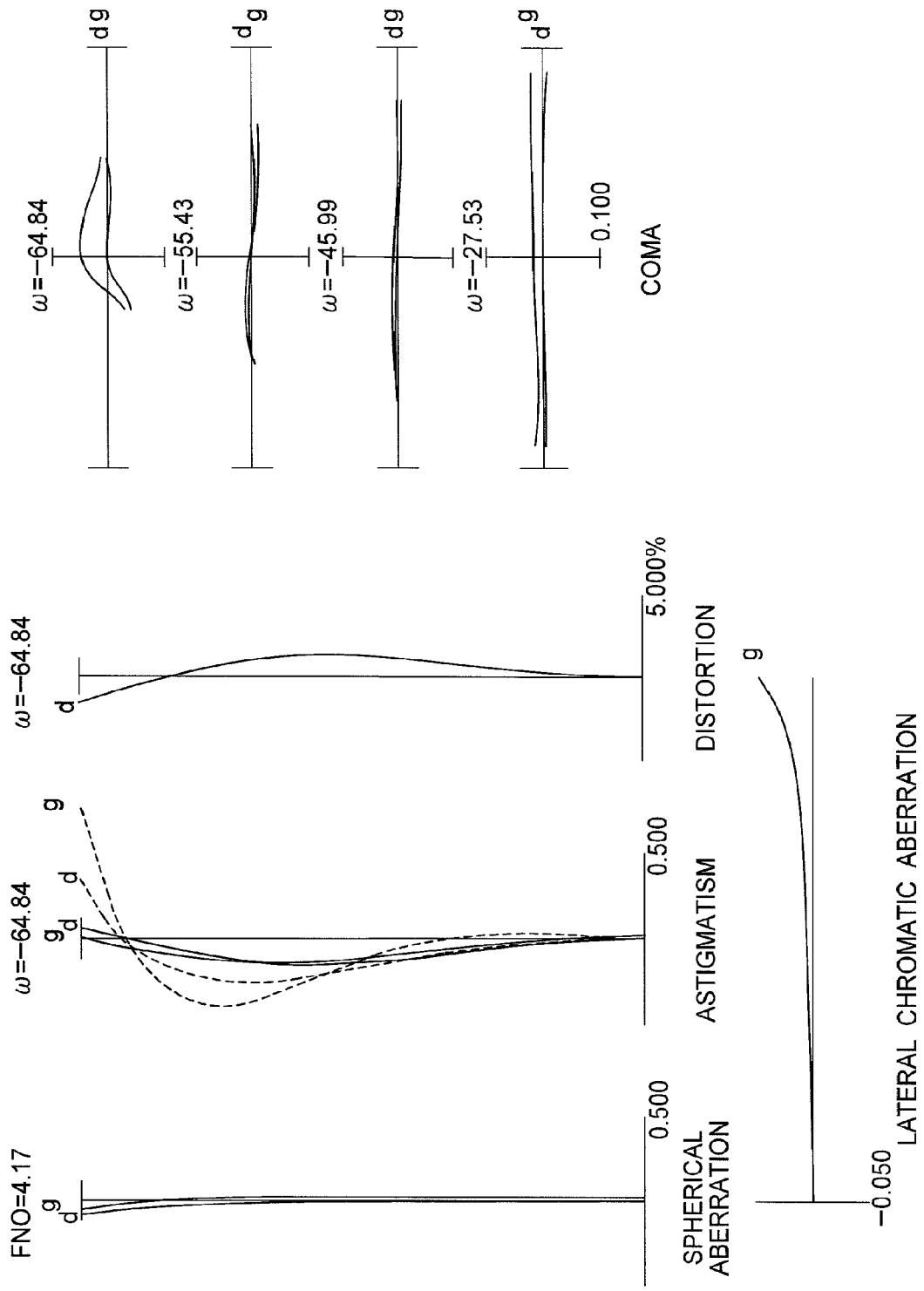
FIG. 4 shows graphs of various aberrations of the wide-angle lens according to Example 2 upon focusing on infinity.

FIG. 4 shows graphs of various aberrations of the wide-angle lens according to Example 2 upon focusing on infinity.

As is apparent from FIG. 4, the wide-angle lens according to Example 2 shows superb optical performance as a result of good corrections to various aberrations.

Example 3

Figure 5:
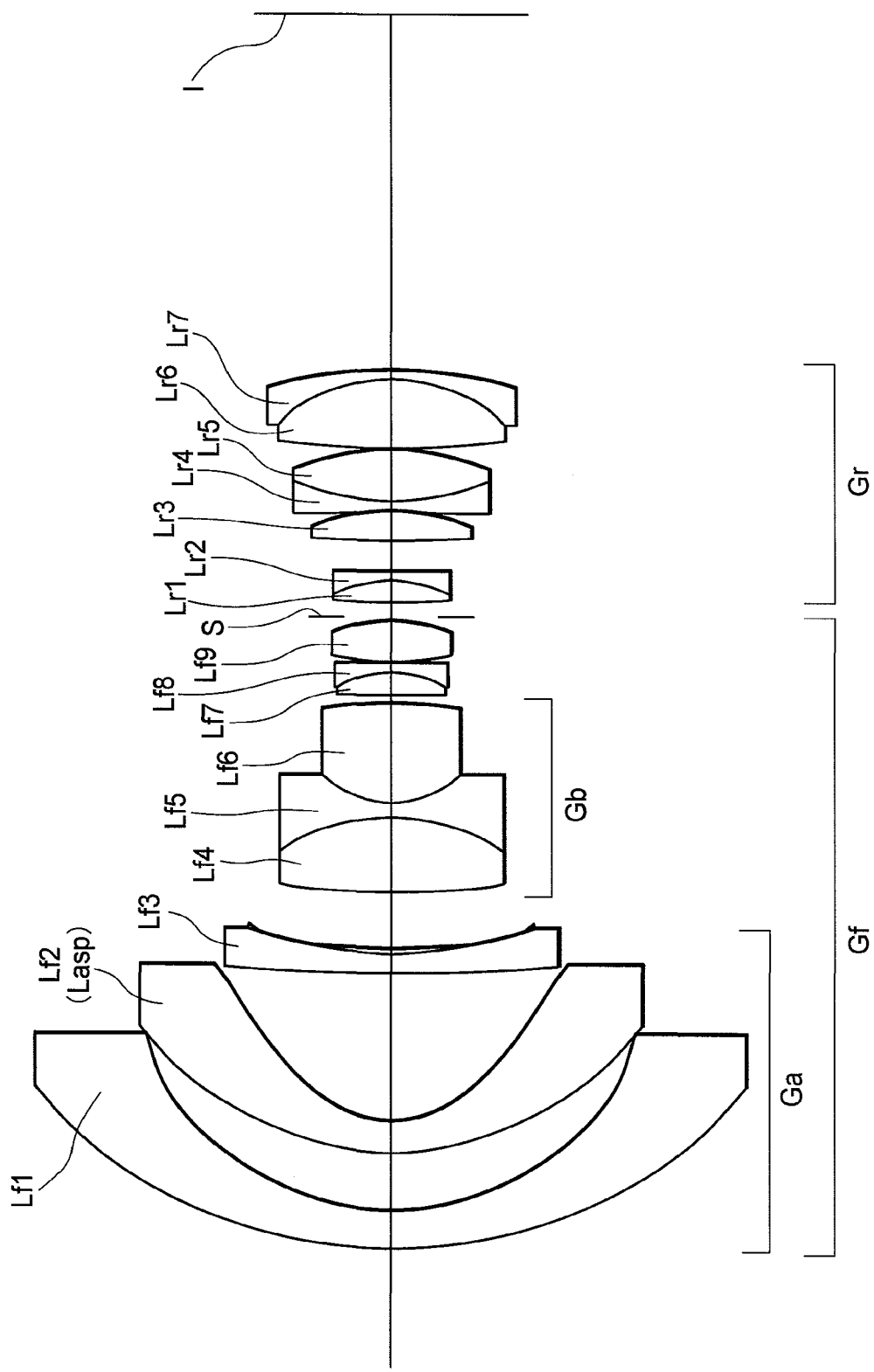
FIG. 5 is a sectional view showing a lens configuration of a wide-angle lens focusing on infinity according to Example 3 of the first embodiment of the present application.

FIG. 5 is a sectional view showing a lens configuration of a wide-angle lens according to Example 3 of the first embodiment of the present application.

The wide-angle lens according to Example 3 is composed of, in order from an object side, a front lens group Gf having positive refractive power, an aperture stop S, and a rear lens group Gr having positive refractive power.

The front lens group Gf includes a sub-lens group Ga having negative refractive power. The sub-lens group Ga is composed of, in order from the most object side, a negative meniscus lens Lf1 having a convex surface facing the object side, a negative meniscus lens Lf2 (Lasp) having a convex surface facing the object side and an aspherical surface having a large aspherical amount formed on the image side surface, and a negative meniscus lens Lf3 having a convex surface facing the object side and an aspherical surface formed on the image side surface. The negative meniscus lens Lf3 is a compound type aspherical lens composed of a glass lens and a resin material.

The front lens group Gf further includes, to the image side of the sub-lens group Ga in order from the object side, a cemented negative lens Gb constructed by a double convex positive lens Lf4 cemented with a double concave negative lens Lf5 cemented with a double convex positive lens Lf6, a cemented negative lens constructed by double convex positive lens Lf7 cemented with a double concave negative lens Lf8, and a double convex positive lens Lf9.

The rear lens group Gr is composed of, in order from the object side, a cemented negative lens constructed by a double convex positive lens Lr1 cemented with a double concave negative lens Lr2, a double convex positive lens Lr3, a cemented negative lens constructed by a double concave negative lens Lr4 cemented with a double convex positive lens Lr5, and a cemented positive lens constructed by a double convex positive lens Lr6 cemented with a negative meniscus lens Lr7 having a convex surface facing the image side.

Various values associated with the wide-angle lens according to Example 3 are listed in Table 3.

TABLE 3

[Specifications]

F0 = 10.3
FNO = 4.08
ω = 64.85°

TABLE 3-continued

[Specifications]

Y = 21.6
TL = 132.47
BF = 38.10
hasp = 16.57

[Lens Data]

| i | r | d | nd | vd |
|---|---|---|---|---|
| 1) | 45.0887 | 4.0000 | 1.816000 | 46.63 |
| 2) | 25.2008 | 6.3000 | | |
| 3) | 29.6192 | 3.5000 | 1.729030 | 54.04 |
| 4)* | 9.8560 | 15.8448 | | |
| 5) | 236.1722 | 2.0000 | 1.497820 | 82.56 |
| 6) | 40.0000 | 0.5000 | 1.553890 | 38.09 |
| 7)* | 60.5981 | 6.1625 | | |
| 8) | 86.9847 | 8.0000 | 1.717360 | 29.52 |
| 9) | −19.2982 | 1.5000 | 1.816000 | 46.63 |
| 10) | 9.6120 | 10.7268 | 1.620040 | 36.30 |
| 11) | −41.2930 | 0.8000 | | |
| 12) | 283.9959 | 2.5000 | 1.516800 | 64.12 |
| 13) | −10.5331 | 1.0000 | 1.755000 | 52.29 |
| 14) | 256.1395 | 0.1000 | | |
| 15) | 26.8460 | 4.4394 | 1.517420 | 52.32 |
| 16) | −14.9478 | 0.5000 | | |
| 17> | ∞ | 1.5000 | Aperture Stop S | |
| 18) | 102.3075 | 2.5000 | 1.516800 | 64.12 |
| 19) | −11.1953 | 0.8000 | 1.772500 | 49.61 |
| 20) | 155.7889 | 3.5000 | | |
| 21) | 324.2212 | 3.0000 | 1.516800 | 64.12 |
| 22) | −19.9279 | 0.1000 | | |
| 23) | −80.8508 | 1.0000 | 1.834810 | 42.72 |
| 24) | 22.9204 | 5.5000 | 1.497820 | 82.52 |
| 25) | −23.3970 | 0.1000 | | |
| 26) | 103.6067 | 7.5000 | 1.497820 | 82.52 |
| 27) | −15.1862 | 1.0000 | 1.772500 | 49.61 |
| 28) | −38.2138 | 38.0981 | | |

[Aspherical Surface Data]

Surface Number: 4

κ = 0.1762
A3 = 0.00
A4 = −6.35770E−06
A6 = 4.44690E−08
A8 = −7.73560E−11
A10 = −1.74660E−13
A12 = −0.21396E−17
A14 = 0.62903E−18
A16 = −0.15122E−19
A18 = −0.21704E−22

Surface Number: 7

κ = −10.5548
A3 = 0.00
A4 = 2.43610E−05
A6 = −4.61180E−08
A8 = 3.69100E−11
A10 = 6.01950E−13
A12 = 0.19444E−14
A14 = −0.23879E−16
A16 = −0.22081E−19
A18 = 0.48172E−21

[Lens Group Data]

| Group | I | focal length |
|---|---|---|
| Gf | 1 | 16.756 |
| Gr | 18 | 72.338 |

[Values for Conditional Expressions]

(1): |Raspl|/hasp = 0.595
(2): (Rr + Rf)/(Rr − Rf) = −0.335
(3): Ff/F0 = 1.627
(4): F0/Fb = −0.00212

TABLE 3-continued

[Specifications]

(5): (−Fa)/BF = 0.352
(6): Fr/F0 = 7.023
(7): Nn − ((Np1 + Np2)/2) = 0.147

FIG. 6 shows graphs of various aberrations of the wide-angle lens according to Example 3 upon focusing on infinity.

As is apparent from FIG. 6, the wide-angle lens according to Example 3 shows superb optical performance as a result of good corrections to various aberrations.

Second Embodiment

A wide-angle lens according to a second embodiment of the present application is explained below. The following embodiment only shows for better understandings of the present invention. Accordingly, any operable addition or conversion capable of being carried out by a person having ordinary skill in the art is not intended to be excluded within a scope of the present invention.

A wide-angle lens according to a second embodiment includes, in order from an object side, a first lens group having negative refractive power, a second lens group having positive refractive power, and a third lens group having positive refractive power. The second lens group is moved to an image side, thereby carrying out focusing from an infinity object to a close object.

In a conventional focusing system for a wide-angle lens, a whole-lens-thrust system and a rear-focusing system have been the mainstream of the focusing system, and an internal focusing system has been unusual. In a wide-angle lens according to the second embodiment, with carrying out focusing from an infinity object to a close object by moving the second lens group to the image side, it becomes possible to suppress variation in aberrations, in particular, curvature of field and coma upon focusing from an infinity object to a close object.

In a wide-angle lens according to the second embodiment, the following conditional expression (8) is preferably satisfied:

$$4.50 < F2/F0 < 15.00 \tag{8}$$

where F2 denotes a focal length of the second lens group upon focusing on infinity, and F0 denotes a focal length of the wide-angle lens upon focusing on infinity.

Conditional expression (8) defines an appropriate range of the focal length (refractive power) of the second lens group. With satisfying conditional expression (8), it becomes possible to realize a compact wide-angle lens having high optical performance.

When the ratio F2/F0 is equal to or exceeds the upper limit of conditional expression (8), refractive power of the second lens group becomes small, so that a moving amount of the second lens group upon focusing becomes large. As a result, a large space for moving the second lens group has to be secured, so that the wide-angle lens becomes large. Moreover, variation in aberrations, in particular, curvature of field, spherical aberration and coma becomes large.

With setting the upper limit of conditional expression (8) to 14.00, it becomes possible to excellently correct various aberrations. With setting the upper limit of conditional expression (8) to 12.00, it becomes possible to further excellently correct various aberrations. With setting the upper limit of conditional expression (8) to 10.00, it becomes possible to further excellently correct various aberrations, and the effect of the present invention can fully exhibited.

On the other hand, when the ratio F2/F0 is equal to or falls below the lower limit of conditional expression (8), refractive power of the second lens group becomes excessively large. When refractive power of the second lens group becomes excessively large, although the moving amount of the second lens group upon focusing becomes small, variation in aberrations, in particular, curvature of field, astigmatism and coma becomes large.

With setting the lower limit of conditional expression (8) to 5.00, it becomes possible to excellently correct various aberrations. With setting the lower limit of conditional expression (8) to 5.50, it becomes possible to further excellently correct various aberrations. With setting the lower limit of conditional expression (8) to 6.00, it becomes possible to further excellently correct various aberrations, and the effect of the present invention can be fully exhibited In a wide-angle lens according to the second embodiment, the following conditional expression (9) is preferably satisfied:

$$1.05 < M2 < 5.00 \tag{9}$$

where M2 denotes lateral magnification of the second lens group upon focusing on infinity.

Conditional expression (9) defines an appropriate range of lateral magnification of the second lens group, which is the focusing lens group. With satisfying conditional expression (9), it becomes possible to realize a wide-angle lens having high optical performance with being compact. In order to make the moving amount of the second lens group appropriate and suppress variation in aberrations, it is important that lateral magnification of the second lens group, which is the focusing lens group, is set to be within an appropriate range.

When the value M2 is equal to or exceeds the upper limit of conditional expression (9), lateral magnification of the second lens group becomes large. As a result, refractive power of the second lens group has to be made large, so that variation in aberrations, in particular, curvature of field, astigmatism and coma becomes large.

With setting the upper limit of conditional expression (9) to 4.50, it becomes possible to excellently correct curvature of field, astigmatism and coma. With setting the upper limit of conditional expression (9) to 4.00, it becomes possible to further excellently correct such aberrations. With setting the upper limit of conditional expression (9) to 3.80, it becomes possible to further excellently correct such aberrations. With setting the upper limit of conditional expression (9) to 3.50, it becomes possible to further excellently correct such aberrations, and the effect of the present invention can fully be exhibited.

On the other hand, when the value M2 is equal to or falls below the lower limit of conditional expression (9), lateral magnification of the second lens group becomes small, and refractive power of the second lens group becomes small. As a result, the moving amount of the second lens group upon focusing becomes large, so that a large space for moving the second lens group has to be secured. As a result, the wide-angle lens becomes large. Moreover, variation in aberrations, in particular, curvature of field, spherical aberration and coma becomes large.

With setting the lower limit of conditional expression (9) to 1.20, it becomes possible to excellently correct aberrations such as coma. With setting the lower limit of conditional expression (9) to 1.50, it becomes possible to further excellently correct aberrations such as coma. With setting the lower limit of conditional expression (9) to 1.60, it becomes possible to further excellently correct aberrations such as coma. With setting the lower limit of conditional expression (9) to 1.80, it becomes possible to further excellently correct aberrations such as coma, and the effect of the present invention can fully be exhibited.

In a wide-angle lens according to the second embodiment, the following conditional expression (10) is preferably satisfied:

$$0.20 < (-F1)/F0 < 3.00 \tag{10}$$

where F1 denotes a focal length of the first lens group upon focusing on infinity, and F0 denotes a focal length of the wide-angle lens upon focusing on infinity.

Conditional expression (10) defines a appropriate range of the focal length (refractive power) of the first lens group. With satisfying conditional expression (10), it becomes possible to accomplish a compact wide-angle lens having high optical performance with securing a back focal length.

When the ratio (−F1)/F0 is equal to or exceeds the upper limit of conditional expression (10), the focal length of the first lens group becomes large, and refractive power of the first lens group becomes small. As a result, a retrofocus ratio becomes small, so that it becomes difficult to secure the back focal length. Incidentally, the retrofocus ratio means a ratio of the focal length F0 of the wide-angle lens to the back focal length BF, which is F0/BF. Moreover, a diameter of the front lens becomes large, so that the wide-angle lens becomes large. On this occasion, when the lens is forcibly made compact or the back focal length is forcibly secured, off-axis aberrations such as coma become worse.

With setting the upper limit of conditional expression (10) to 2.50, it becomes possible to excellently correct various aberrations. With setting the upper limit of conditional expression (10) to 2.00, it becomes possible to further excellently correct various aberrations. With setting the upper limit of conditional expression (10) to 1.80, it becomes possible to further excellently correct various aberrations, and the effect of the present invention can fully be exhibited.

On the other hand, when the ratio (−F1)/F0 is equal to or falls below the lower limit of conditional expression (10), the focal length of the first lens group becomes short, and refractive power of the first lens group becomes large. When the first lens group has excessively large refractive power, distortion, curvature of field and coma become worse.

With setting the lower limit of conditional expression (10) to 0.50, it becomes possible to excellently correct various aberrations. With setting the lower limit of conditional expression (10) to 0.60, it becomes possible to further excellently correct various aberrations. With setting the lower limit of conditional expression (10) to 0.80, it becomes possible to further excellently correct various aberrations, and the effect of the present invention can fully be exhibited.

In a wide-angle lens according to the second embodiment, the following conditional expression (11) is preferably satisfied:

$$1.00 < F3/F0 < 10.00 \tag{11}$$

where F3 denotes a focal length of the third lens group upon focusing on infinity, and F0 denotes a focal length of the wide-angle lens upon focusing on infinity.

Conditional expression (11) defines an appropriate range of the focal length (refractive power) of the third lens group. With satisfying conditional expression (11), it becomes possible to realize a compact wide-angle lens having high optical performance.

When the ratio F3/F0 is equal to or exceeds the upper limit of conditional expression (11), the focal length of the third lens group becomes long, and refractive power of the third lens group becomes small. As a result, spherical aberration and curvature of field become worse.

With setting the upper limit of conditional expression (11) to 8.00, it becomes possible to excellently correct various aberrations with making it compact. With setting the upper limit of conditional expression (11) to 7.00, it becomes possible to further excellently correct various aberrations with making it compact. With setting the upper limit of conditional expression (11) to 5.00, it becomes possible to further excellently correct various aberrations with making it compact, and the effect of the present invention can fully be exhibited.

On the other hand, when the ratio F3/F0 is equal to or falls below the lower limit of conditional expression (11), the focal length of the third lens group becomes short, and refractive power of the third lens group becomes large. As a result, curvature of field, astigmatism and distortion become worse.

With setting the lower limit of conditional expression (11) to 1.50, it becomes possible to excellently correct various aberrations. With setting the lower limit of conditional expression (11) to 2.00, it becomes possible to further excellently correct various aberrations. With setting the lower limit of conditional expression (11) to 2.50, it becomes possible to further excellently correct various aberrations, and the effect of the present invention can fully be exhibited.

In a wide-angle lens according to the second embodiment, the third lens group is preferably fixed upon focusing from an infinity object to a close object. With this construction, it becomes possible to simplify a moving mechanism of the lens groups in comparison with a case that whole lens groups are moved upon focusing. Moreover, the focusing lens group can be lightened in comparison with a case that the first lens group, which has a large diameter and a heavy weight, carries out focusing, so that focusing can be carried out fast.

In a wide-angle lens according to the second embodiment, the first lens group is preferably fixed upon focusing from an infinity object to a close object. With this construction, it becomes possible to simplify the moving mechanism of the lens groups in comparison with a case that whole lens groups are to be moved upon focusing. Moreover, the focusing lens group can be lightened in comparison with a case that the first lens group, which has a large diameter and a heavy weight, carries out focusing, so that focusing can be carried out fast.

In a wide-angle lens according to the second embodiment, the first lens group includes at least one aspherical negative meniscus lens. The aspherical negative meniscus lens preferably has a shape that negative refractive power is getting smaller from the center to the periphery.

When the first lens group includes at least one aspherical negative meniscus lens, and the aspherical negative meniscus lens has a shape that negative refractive power is getting smaller from the center to the periphery, it becomes possible to accomplish a wide angle of view and to excellently correct curvature of field, distortion and coma.

In a wide-angle lens according to the second embodiment, the following conditional expression (1) is preferably satisfied:

$$0.30 < |Rasp|/hasp < 0.90 \quad (1)$$

Rasp denotes a paraxial radius of curvature of an aspherical surface of the aspherical negative meniscus lens having the shape that negative refractive power is getting smaller from the center to the periphery, and hasp denotes a half of an effective diameter (maximum effective radius) of the aspherical negative meniscus lens having the shape that negative refractive power is getting smaller from the center to the periphery. However, conditional expression (1) has already been explained above, so that duplicated explanations are omitted.

In a wide-angle lens according to the second embodiment, the second lens group preferably includes a cemented lens constructed by a positive lens cemented with a negative lens cemented with a positive lens. With this construction it becomes possible to excellently correct lateral chromatic aberration, curvature of field and coma.

In a wide-angle lens according to the second embodiment, the following conditional expression (2) is preferably satisfied:

$$-1.00 < (Rr+Rf)/(Rr-Rf) < 0.00 \quad (2)$$

where Rr denotes a radius of curvature of the image side surface of the negative lens in the cemented lens, and Rf denotes a radius of curvature of the object side surface of the negative lens in the cemented lens. However, conditional expression (2) has already been explained, so that duplicated explanations are omitted.

In a wide-angle lens according to the second embodiment, the first lens group preferably includes an aspherical lens other than the above-described aspherical negative meniscus lens. With this construction, it becomes possible to excellently correct off-axis aberrations, in particular, distortion, curvature of field and coma.

In a wide-angle lens according to the second embodiment, the aspherical lens preferably has larger negative refractive power on the periphery than at the center of the lens. Such an aspherical surface and the above-described aspherical negative meniscus lens (in which negative refractive power is getting smaller from the center to the periphery) have opposite aspherical effect with each other. With combining them, a wide-angle lens according to the second embodiment makes it possible to excellently correct curvature of field, astigmatism and coma with accomplishing a wide angle of view. Incidentally, a portion where negative refractive power becomes lager than the central portion is preferably the most peripheral portion.

In a wide-angle lens according to the second embodiment, the first lens group is preferably composed of only negative lenses. With this construction, the diameter of the front lens can be small. Moreover, curvature of distortion can be suppressed.

Figure 23:
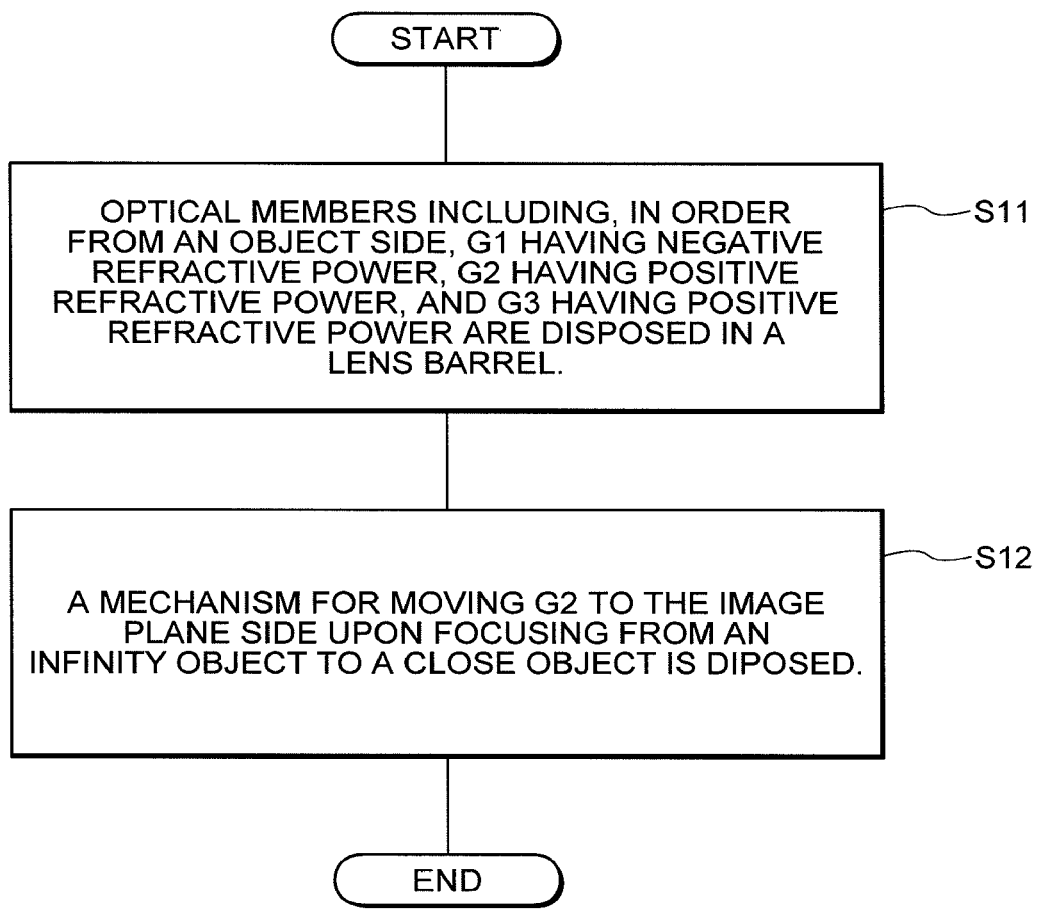
FIG. 23 is a flowchart showing a method for manufacturing a wide-angle lens according to the second embodiment of the present application.

Then, an outline of a method for manufacturing a wide-angle lens according to the second embodiment is explained below with reference to FIG. 23. FIG. 23 is a flowchart showing a method for manufacturing a wide-angle lens according to the second embodiment of the present application.

The method for manufacturing a wide-angle lens according to the second embodiment of the present application is a method for manufacturing a wide-angle lens including, in order from an object side, a first lens group having negative refractive power, a second lens group having positive refractive power, and a third lens group having positive refractive power, and includes the following steps S11 and S12 shown in FIG. 23.

Step S11: optical members including, in order from an object side, a first lens group having negative refractive power, a second lens group having positive refractive power, and a third lens group having positive refractive power are disposed in a lens barrel.

Step S12: a mechanism for moving the second lens group to the image plane side upon focusing from an infinity object to a close object is disposed.

A method for manufacturing a wide-angle lens according to the second embodiment of the present application makes it possible to manufacture a wide-angle lens having excellent optical performance with a wide angle of view.

Each example of a wide-angle lens according to the second embodiment is explained below with reference to accompanying drawings.

Example 4

FIG. 7 is a sectional view showing a lens configuration of a wide-angle lens focusing on infinity according to Example 4 of a second embodiment of the present application.

The wide-angle lens according to Example 4 is composed of, in order from an object side, a first lens group G1 having negative refractive power, a second lens group G2 having positive refractive power, and a third lens group G3 having positive refractive power. The second lens group G2 is moved to an image plane I side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented positive lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 4 are listed in Table 4.

In [Variable Distances], variable distances with respect to shooting distances INF, CD1 and CD2 are shown, INF denotes infinity, CD1 denotes a close distance 1, CD2 denotes a close distance 2, Mag denotes a shooting magnification, d0 denotes a distance from an object to the most object side lens surface. The explanation of reference symbols is the same in the following Examples.

TABLE 4

[Specifications]

$F0 = 10.30$
$FNO = 4.05$
$\omega = 64.82°$
$Y = 21.60$

TABLE 4-continued $TL = 132.46$
$BF = 38.10$
$hasp = 16.65$

[Lens Data]

| i | r | d | nd | vd |
|---|---|---|---|---|
| 1) | 45.7401 | 4.0000 | 1.816000 | 46.63 |
| 2) | 25.2008 | 6.3000 | | |
| 3) | 29.6192 | 3.5000 | 1.729030 | 54.04 |
| 4)* | 9.8609 | 15.8500 | | |
| 5) | 268.5786 | 2.0000 | 1.497820 | 82.56 |
| 6) | 40.0000 | 0.5000 | 1.553890 | 38.09 |
| 7)* | 60.1438 | (d7) | | |
| 8) | 68.2903 | 8.0000 | 1.717360 | 29.52 |
| 9) | −19.2174 | 1.5000 | 1.816000 | 46.63 |
| 10) | 9.3868 | 10.7000 | 1.620040 | 36.30 |
| 11) | −41.7857 | 0.8000 | | |
| 12) | 544.7219 | 2.5000 | 1.516800 | 64.12 |
| 13) | −10.6804 | 1.0000 | 1.755000 | 52.29 |
| 14) | 222.2112 | 0.1000 | | |
| 15) | 27.5945 | 4.4500 | 1.518230 | 58.89 |
| 16) | −14.8195 | 0.5000 | | |
| 17> | ∞ | 1.5000 | Aperture Stop S | |
| 18) | 103.3517 | 2.5000 | 1.518230 | 58.89 |
| 19) | −11.1953 | 0.8000 | 1.772500 | 49.61 |
| 20) | 158.8896 | (d20) | | |
| 21) | 294.6507 | 3.000 | 1.516800 | 64.12 |
| 22) | −19.8308 | 0.1000 | | |
| 23) | −77.6423 | 1.0000 | 1.834810 | 42.72 |
| 24) | 23.3310 | 5.5000 | 1.497820 | 82.52 |
| 25) | −23.1555 | 0.1000 | | |
| 26) | 105.9939 | 7.5000 | 1.497820 | 82.52 |
| 27) | −15.3452 | 1.0000 | 1.772500 | 49.61 |
| 28) | −38.2138 | (BF) | | |

[Aspherical Surface Data]

Surface Number: 4

$\kappa = 0.1702$
$A4 = -6.10260E-06$
$A6 = 4.11540E-08$
$A8 = -7.60980E-11$
$A10 = -1.60030E-13$
$A12 = 0.38466E-16$
$A14 = 0.70126E-18$
$A16 = -0.14581E-19$
$A18 = -0.21704E-22$ Surface Number: 7

$\kappa = -8.2417$
$A4 = 2.30890E-05$
$A6 = -5.01740E-08$
$A8 = 4.68910E-11$
$A10 = 6.36740E-13$
$A12 = 0.19663E-14$
$A14 = -0.23616E-16$
$A16 = -0.27489E-19$
$A18 = 0.47622E-21$

[Variable Distances]

| | INF | CD1 | CD2 |
|---|---|---|---|
| Mag: | 0.00000 | −0.02500 | −0.1000 |
| d0: | ∞ | 388.3787 | 79.2347 |
| d7: | 6.16247 | 6.67277 | 8.18564 |
| d20: | 3.50000 | 2.98970 | 1.47683 |

[Lens Group Data]

| Group | I | focal length |
|---|---|---|
| G1 | 1 | −13.21051 |
| G2 | 8 | 85.16054 |
| G3 | 21 | 33.22951 |

TABLE 4-continued

[Values for Conditional Expressions]

(1): |Rasp|/hasp = 0.592
(2): (Rr + Rf)/(Rr − Rf) = −0.344
(8): F2/F0 = 8.268
(9): M2 = 2.406
(10): (−F1)/F0 = 1.283
(11): F3/F0 = 3.226

Figure 8A:
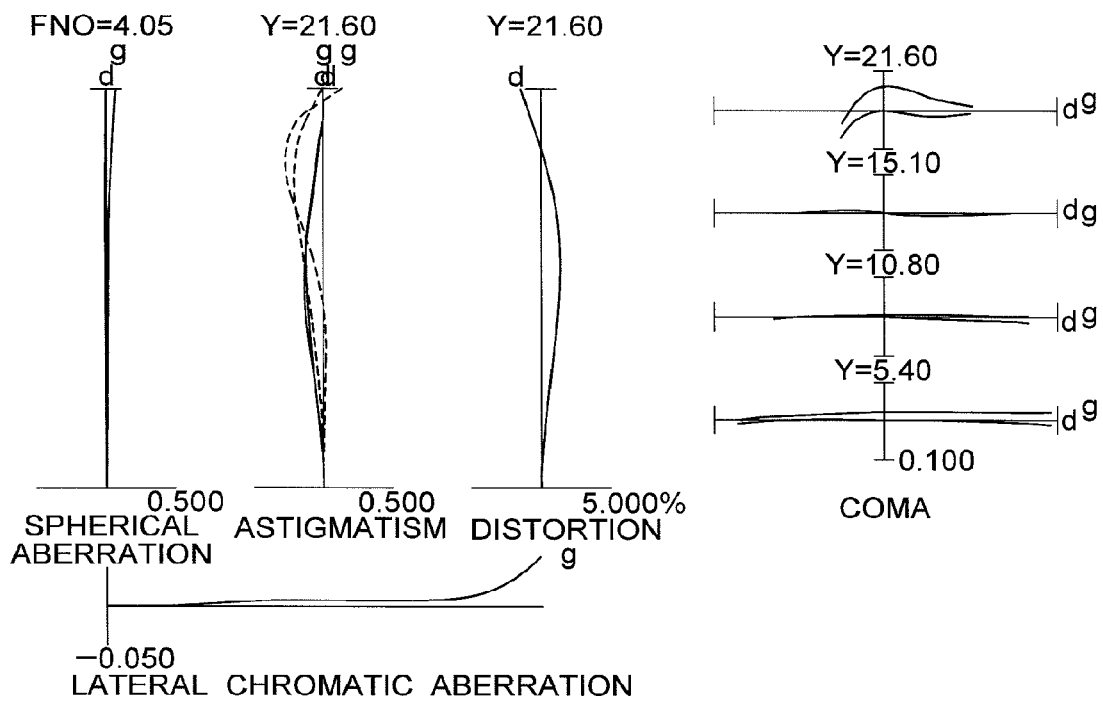
Figure 8B:
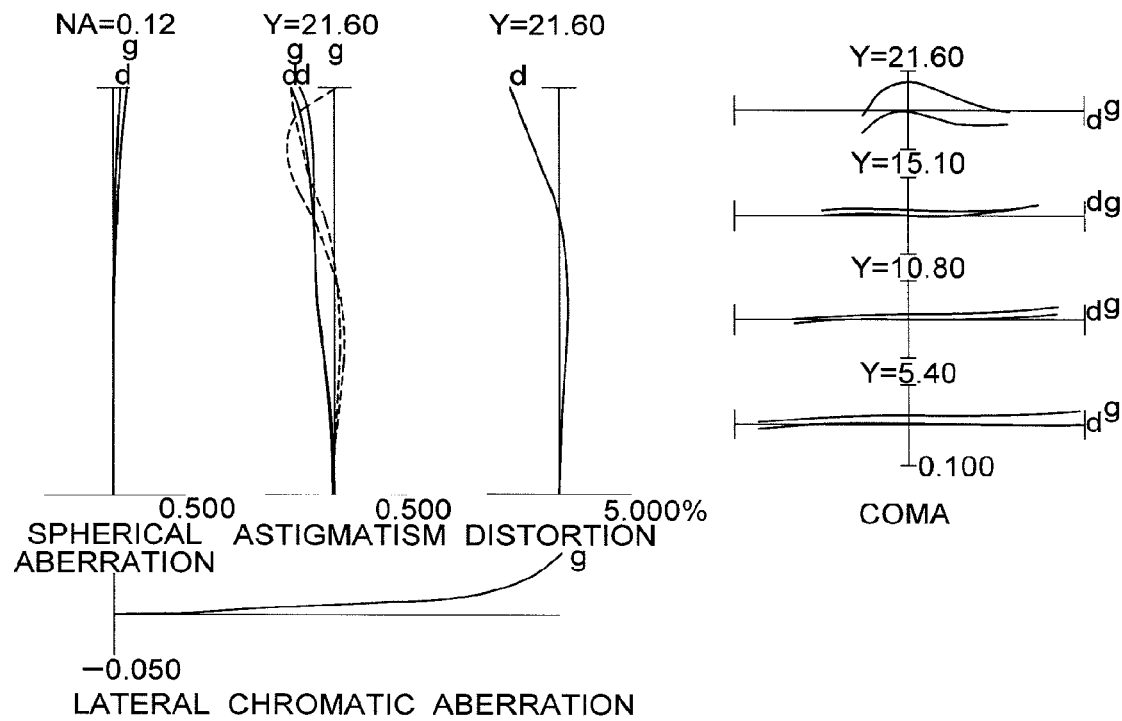

FIGS. 8A and 8B show graphs of various aberrations of the wide-angle lens according to Example 4, in which FIG. 8A is a state upon focusing on infinity, and FIG. 8B is a state upon focusing on a close object ($\beta$=−0.025).

As is apparent from FIGS. 8A and 8B, the wide-angle lens according to Example 4 shows superb optical performance as a result of good corrections to various aberrations.

Example 5

Figure 9:
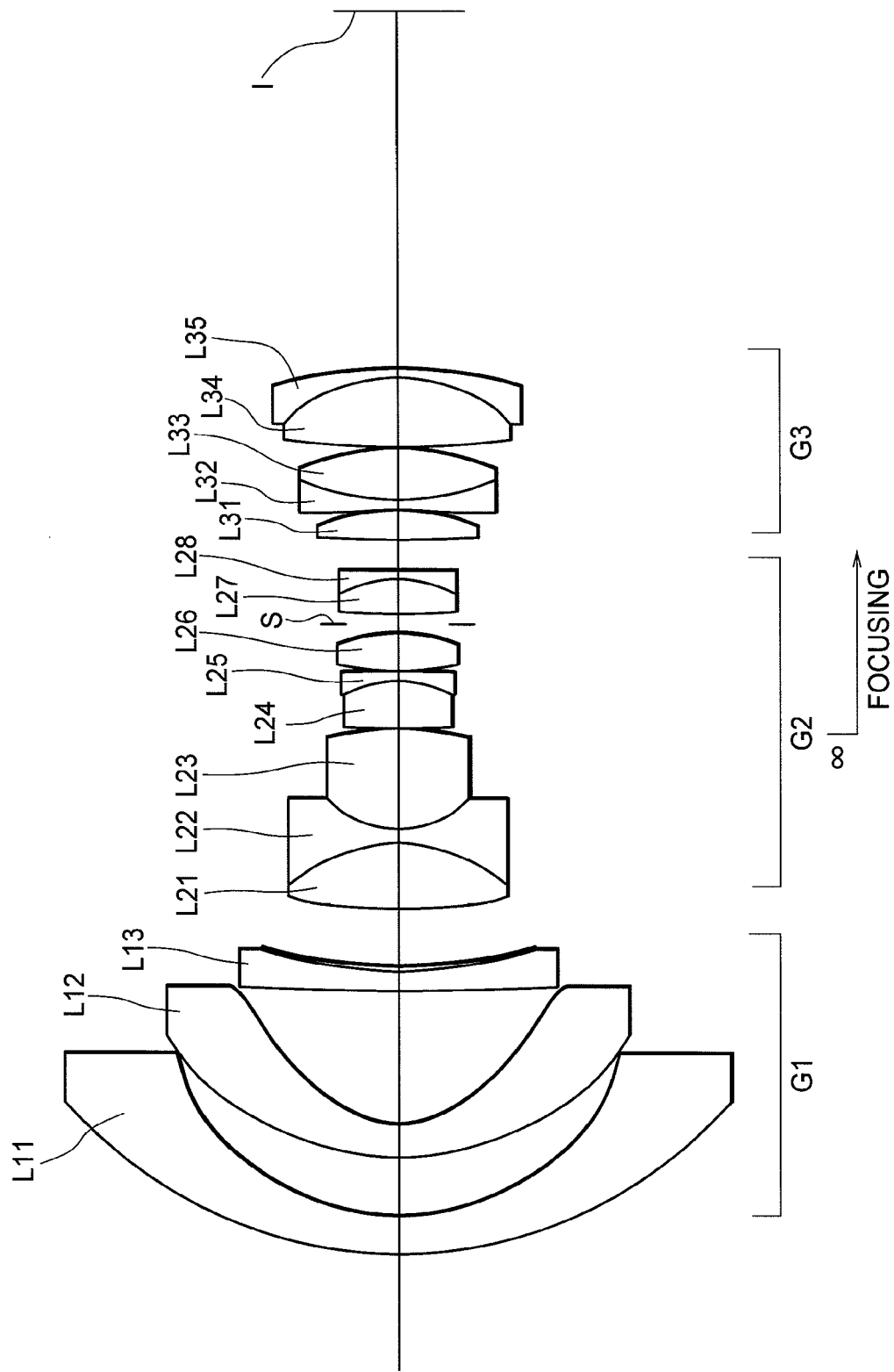
FIG. 9 is a sectional view showing a lens configuration of a wide-angle lens focusing on infinity according to Example 5 of the second embodiment of the present application.

FIG. 9 is a sectional view showing a lens configuration of a wide-angle lens focusing on infinity according to Example 5 of the second embodiment of the present application.

The wide-angle lens according to Example 5 is composed of, in order from an object side, a first lens group G1 having negative refractive power, a second lens group G2 having positive refractive power, and a third lens group G3 having positive refractive power. The second lens group G2 is moved to an image plane I side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented positive lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 5 are listed in Table 5.

TABLE 5

[Specifications]

F0 = 10.30
FNO = 4.17
$\omega$ = 64.84°
Y = 21.60
TL = 132.78
BF = 38.10
hasp = 16.06

[Lens Data]

| i | r | d | nd | vd |
|---|---|---|---|---|
| 1) | 42.3831 | 4.0000 | 1.816000 | 46.63 |
| 2) | 23.2938 | 6.3000 | | |
| 3) | 27.5491 | 3.5000 | 1.729030 | 54.04 |
| 4)* | 9.7702 | 14.2885 | | |
| 5) | 273.4999 | 2.0000 | 1.755000 | 52.29 |
| 6) | 40.0000 | 0.5000 | 1.553890 | 38.09 |
| 7)* | 55.6948 | (d7) | | |
| 8) | 49.1830 | 7.0000 | 1.672700 | 32.11 |
| 9) | −16.1713 | 1.5000 | 1.816000 | 46.63 |
| 10) | 9.7963 | 10.7268 | 1.620040 | 36.30 |
| 11) | −36.6819 | 0.1000 | | |
| 12) | 533.9192 | 5.0000 | 1.516800 | 64.12 |
| 13) | −10.9681 | 1.0000 | 1.755000 | 52.29 |
| 14) | 233.8827 | 0.1000 | | |
| 15) | 26.0608 | 4.0000 | 1.517420 | 52.32 |
| 16) | −15.6077 | 1.0000 | | |
| 17> | ∞ | 1.0000 | Aperture Stop S | |
| 18) | 103.7491 | 3.8000 | 1.516800 | 64.12 |
| 19) | −11.1953 | 1.0000 | 1.772500 | 49.61 |
| 20) | 171.1107 | (d20) | | |
| 21) | 204.9527 | 3.0000 | 1.516800 | 64.12 |
| 22) | −20.2930 | 0.1000 | | |
| 23) | −82.6214 | 1.0000 | 1.834810 | 42.72 |
| 24) | 22.2173 | 5.5000 | 1.497820 | 82.52 |
| 25) | −24.2790 | 0.1000 | | |
| 26) | 84.6349 | 7.5000 | 1.497820 | 82.52 |
| 27) | −15.1083 | 1.0000 | 1.772500 | 49.61 |
| 28) | −38.2138 | (BF) | | |

[Aspherical Surface Data]

Surface Number: 4

$\kappa$ = 0.1747
A4 = −5.40210E−06
A6 = 3.09140E−08
A8 = −1.36590E−10
A10 = −3.34770E−13
A12 = −0.37424E−15
A14 = −0.19508E−18
A16 = −0.17694E−19
A18 = −0.21704E−22

Surface Number: 7

$\kappa$ = −13.1668
A4 = 2.72000E−05
A6 = −5.96150E−08
A8 = −2.51320E−11
A10 = 4.73940E−13
A12 = 0.20073E−14
A14 = −0.18435E−16
A16 = 0.60550E−20
A18 = 0.37962E−21

[Variable Distances]

| | INF | CD1 | CD2 |
|---|---|---|---|
| Mag: | 0.00000 | −0.02500 | −0.1000 |
| d0: | ∞ | 388.9734 | 79.9564 |
| d7: | 6.16247 | 6.52867 | 7.61717 |
| d20: | 3.50000 | 3.13381 | 2.04531 |

[Lens Group Data]

| Group | I | focal length |
|---|---|---|
| G1 | 1 | −11.45313 |
| G2 | 8 | 65.78006 |
| G3 | 21 | 33.23661 |

TABLE 5-continued

[Values for Conditional Expressions]

(1): |Rasp|/has = 0.608
(2): (Rr + Rf)/(Rr − Rf) = −0.246
(8): F2/F0 = 6.386
(9): M2 = 2.746
(10): (−F1)/F0 = 1.112
(11): F3/F0 = 3.227

Figure 10A:
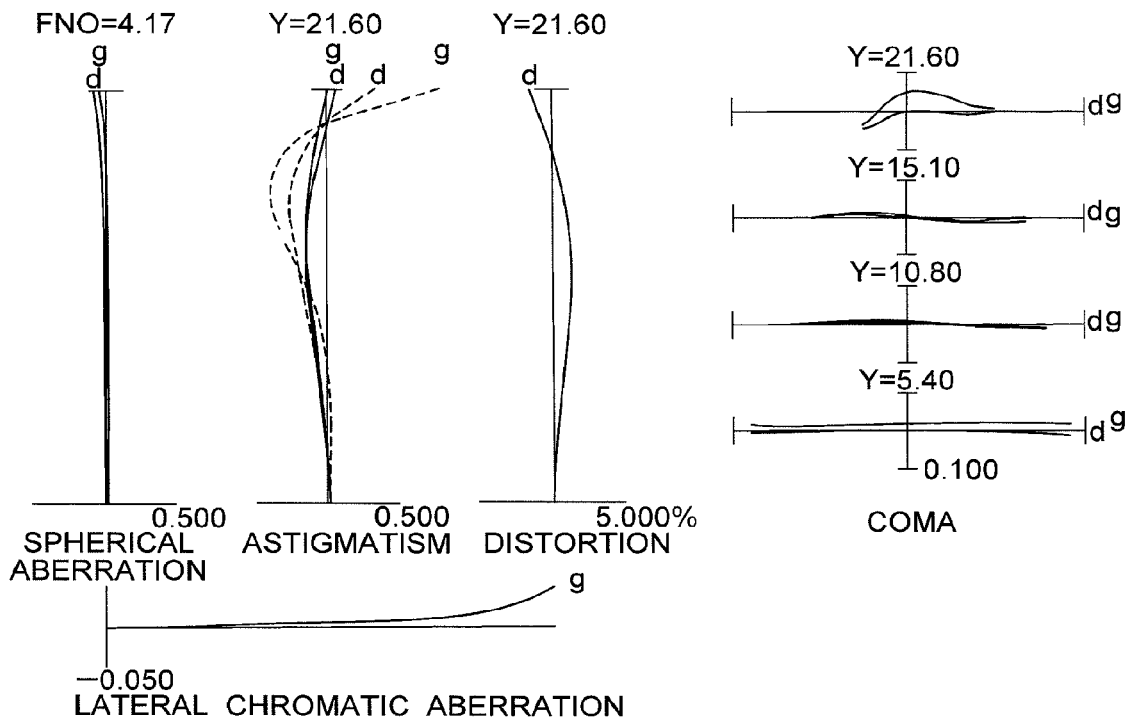
Figure 10B:
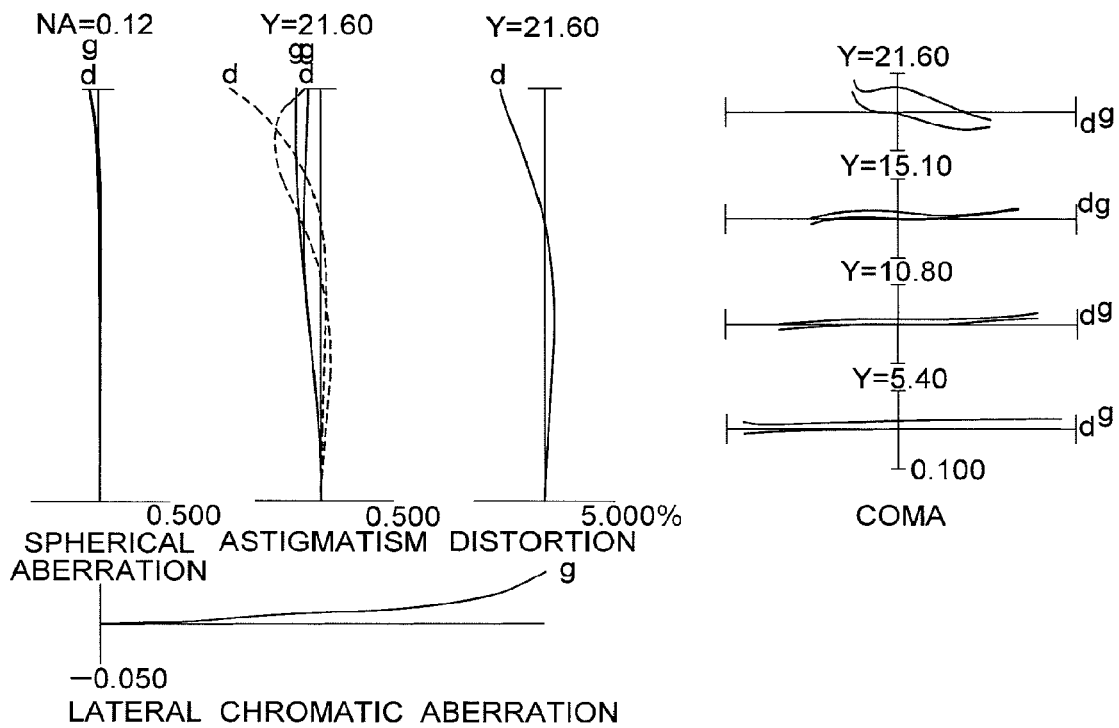

FIGS. 10A and 10B show graphs of various aberrations of the wide-angle lens according to Example 5, in which FIG. 10A is a state upon focusing on infinity, and FIG. 10B is a state upon focusing on a close object (β=−0.025).

As is apparent from FIGS. 10A and 10B, the wide-angle lens according to Example 5 shows superb optical performance as a result of good corrections to various aberrations.

Example 6

FIG. 11 is a sectional view showing a lens configuration of a wide-angle lens focusing on infinity according to Example 6 of the second embodiment of the present application.

The wide-angle lens according to Example 6 is composed of, in order from an object side, a first lens group G1 having negative refractive power, a second lens group G2 having positive refractive power, and a third lens group G3 having positive refractive power. The second lens group G2 is moved to an image plane I side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented negative lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 6 are listed in Table 6.

TABLE 6

[Specifications]

F0 = 10.31
FNO = 4.08
ω = 64.81°
Y = 21.60
TL = 131.96
BF = 38.10
hasp = 16.53

[Lens Data]

| i | r | d | nd | vd |
|---|---|---|---|---|
| 1) | 44.6436 | 4.0000 | 1.816000 | 46.63 |
| 2) | 24.5842 | 6.3000 | | |
| 3) | 28.6538 | 3.5000 | 1.729030 | 54.04 |
| 4)* | 9.8573 | 15.5214 | | |
| 5) | 217.7922 | 2.0000 | 1.497820 | 82.56 |
| 6) | 40.0000 | 0.5000 | 1.553890 | 38.09 |
| 7)* | 59.3823 | (d7) | | |
| 8) | 102.2117 | 8.0000 | 1.717360 | 29.52 |
| 9) | −18.6489 | 1.5000 | 1.816000 | 46.63 |
| 10) | 9.7037 | 10.7268 | 1.620040 | 36.30 |
| 11) | −41.1871 | 0.8000 | | |
| 12) | 219.6123 | 2.5000 | 1.516800 | 64.12 |
| 13) | −10.3986 | 1.0000 | 1.755000 | 52.29 |
| 14) | 287.5191 | 0.1000 | | |
| 15) | 26.0643 | 4.2519 | 1.517420 | 52.32 |
| 16) | −15.0566 | 0.5000 | | |
| 17> | ∞ | 1.5000 | Aperture Stop S | |
| 18) | 104.6963 | 2.5000 | 1.516800 | 64.12 |
| 19) | −11.1953 | 0.8000 | 1.772500 | 49.61 |
| 20) | 151.7174 | (d20) | | |
| 21) | 363.5607 | 3.0000 | 1.516800 | 64.12 |
| 22) | −19.9340 | 0.1000 | | |
| 23) | −83.9202 | 1.0000 | 1.834810 | 42.72 |
| 24) | 22.4295 | 5.5000 | 1.497820 | 82.52 |
| 25) | −23.3833 | 0.1000 | | |
| 26) | 97.1263 | 7.5000 | 1.497820 | 82.52 |
| 27) | −14.9813 | 1.0000 | 1.772500 | 49.61 |
| 28) | −38.2138 | (BF) | | |

[Aspherical Surface Data]

Surface Number: 4

κ = 0.1793
A4 = −6.80270E−06
A6 = 4.54490E−08
A8 = −8.50830E−11
A10 = −2.08110E−13
A12 = −0.99790E−16
A14 = 0.38069E−18
A16 = −0.16124E−19
A18 = −0.21704E−22

Surface Number: 7

κ = −11.5408
A4 = 2.52930E−05
A6 = −4.65020E−08
A8 = 2.28590E−11
A10 = 5.76360E−13
A12 = 0.22293E−14
A14 = −0.22264E−16
A16 = −0.13358E−19
A18 = 0.44629E−21

[Variable Distances]

| | INF | CD1 | CD2 |
|---|---|---|---|
| Mag: | 0.00000 | −0.02500 | −0.1000 |
| d0: | ∞ | 388.4553 | 79.0918 |
| d7: | 6.16247 | 6.68545 | 8.23679 |
| d20: | 3.49999 | 2.97701 | 1.42568 |

[Lens Group Data]

| Group | I | focal length |
|---|---|---|
| G1 | 1 | −13.45495 |
| G2 | 8 | 87.98081 |
| G3 | 21 | 33.61072 |

TABLE 6-continued

[Values for Conditional Expressions]

(1): |Rasp|/hasp = 0.596
(2): (Rr + Rf)/(Rr − Rf) = −0.316
(8): F2/F0 = 8.542
(9): M2 = 2.476
(10): (−F1)/F0 = 1.306
(11): F3/F0 = 3.263

Figure 12A:
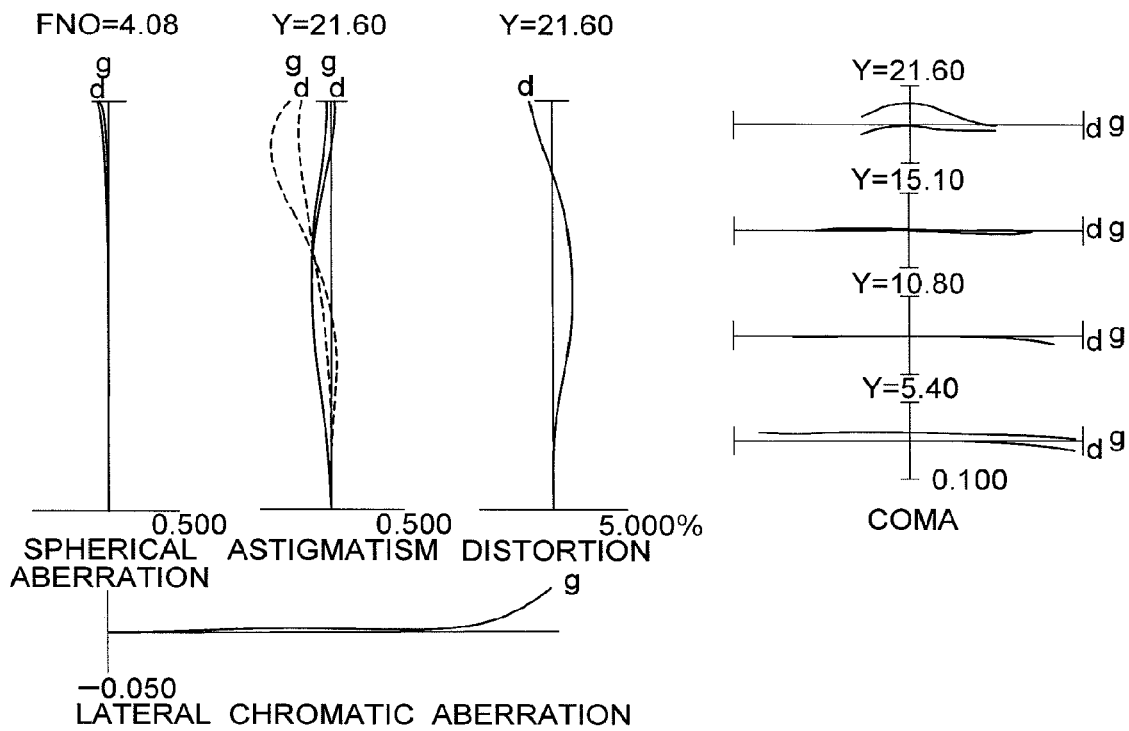
Figure 12B:
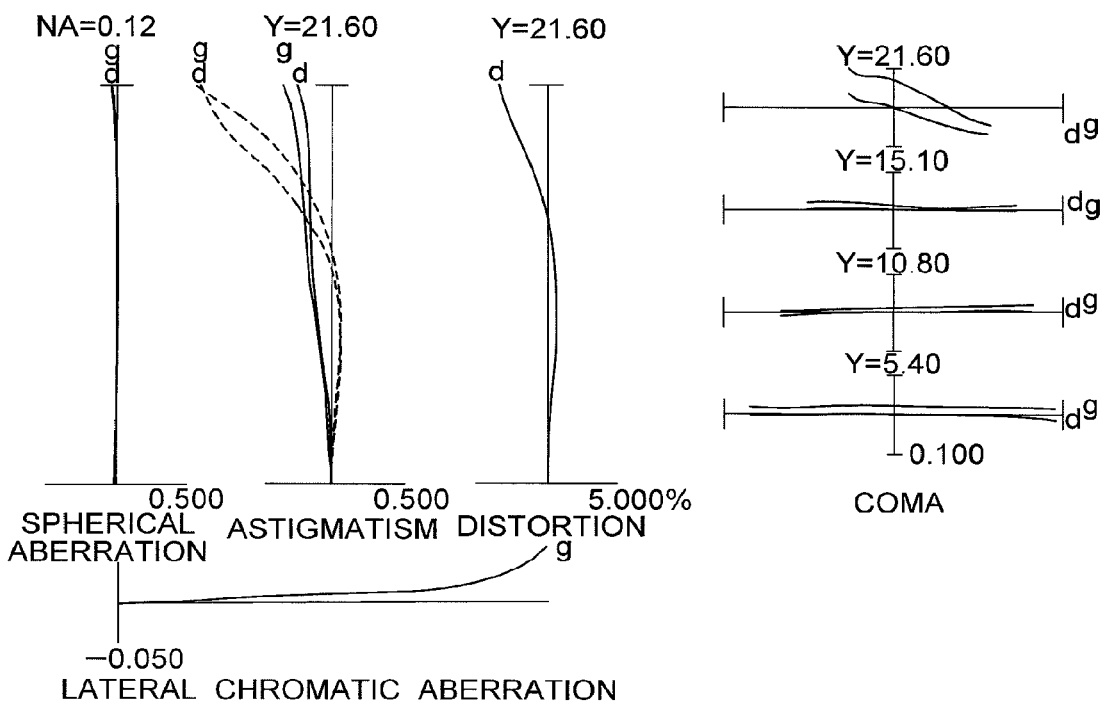

FIGS. 12A and 12B show graphs of various aberrations of the wide-angle lens according to Example 6, in which FIG. 12A is a state upon focusing on infinity, and FIG. 12B is a state upon focusing on a close object (β=−0.025).

As is apparent from FIGS. 12A and 12B, the wide-angle lens according to Example 6 shows superb optical performance as a result of good corrections to various aberrations.

Example 7

FIG. 13 is a sectional view showing a lens configuration of a wide-angle lens focusing on infinity according to Example 7 of the second embodiment of the present application.

The wide-angle lens according to Example 7 is composed of, in order from an object side, a first lens group G1 having negative refractive power, a second lens group G2 having positive refractive power, and a third lens group G3 having positive refractive power. The second lens group G2 is moved to an image plane I side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented negative lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 7 are listed in Table 7.

TABLE 7

[Specifications]

F0 = 10.30
FNO = 4.13
ω = 64.85°
Y = 21.60
TL = 134.09312
BF = 38.10
hasp = 16.59

[Lens Data]

| i | r | d | nd | vd |
|---|---|---|---|---|
| 1) | 44.9445 | 4.0000 | 1.816000 | 46.63 |
| 2) | 24.5235 | 6.3000 | | |
| 3) | 28.7434 | 3.5000 | 1.729030 | 54.04 |
| 4)* | 9.8714 | 15.4114 | | |
| 5) | 231.4069 | 2.0000 | 1.497820 | 82.56 |
| 6) | 40.0000 | 0.5000 | 1.553890 | 38.09 |
| 7)* | 60.0665 | (d7) | | |
| 8) | 98.2686 | 10.5352 | 1.717360 | 29.52 |
| 9) | −18.6711 | 1.5000 | 1.816000 | 46.63 |
| 10) | 9.8585 | 10.7268 | 1.620040 | 36.30 |
| 11) | −40.7347 | 0.8000 | | |
| 12) | 207.9082 | 2.5000 | 1.516800 | 64.12 |
| 13) | −10.4484 | 1.0000 | 1.755000 | 52.29 |
| 14) | 295.6918 | 0.1000 | | |
| 15) | 26.0410 | 3.9573 | 1.517420 | 52.32 |
| 16) | −15.0155 | 0.5000 | | |
| 17> | ∞ | 1.5000 | Aperture Stop S | |
| 18) | 103.2164 | 2.5000 | 1.516800 | 64.12 |
| 19) | −11.1953 | 0.8000 | 1.772500 | 49.61 |
| 20) | 152.2248 | (d20) | | |
| 21) | 363.4639 | 3.0000 | 1.516800 | 64.12 |
| 22) | −20.1239 | 0.1000 | | |
| 23) | −82.7356 | 1.0000 | 1.834810 | 42.72 |
| 24) | 22.4195 | 5.5000 | 1.497820 | 82.52 |
| 25) | −23.7837 | 0.1000 | | |
| 26) | 100.4523 | 7.5000 | 1.497820 | 82.52 |
| 27) | −14.8661 | 1.0000 | 1.772500 | 49.61 |
| 28) | −38.2138 | (BF) | | |

[Aspherical Surface Data]

Surface Number: 4

κ = 0.1802
A4 = −6.72460E−06
A6 = 4.64030E−08
A8 = −8.21850E−11
A10 = −2.00230E−13
A12 = −0.78932E−16
A14 = 0.43489E−18
A16 = −0.15997E−19
A18 = −0.21704E−22

Surface Number: 7

κ = −13.6184
A4 = 2.57130E−05
A6 = −4.33760E−08
A8 = 3.07680E−11
A10 = 5.96340E−13
A12 = 0.23702E−14
A14 = −0.22519E−16
A16 = −0.18305E−19
A18 = 0.40304E−21

[Variable Distances]

| | INF | CD1 | CD2 |
|---|---|---|---|
| Mag: | 0.00000 | −0.02500 | −0.1000 |
| d0: | ∞ | 387.9653 | 78.9806 |
| d7: | 6.16247 | 6.65588 | 8.12200 |
| d20: | 3.50000 | 3.00659 | 1.54047 |

[Lens Group Data]

| Group | I | focal length |
|---|---|---|
| G1 | 1 | −13.39135 |
| G2 | 8 | 79.88403 |
| G3 | 21 | 34.73300 |

TABLE 7-continued

[Values for Conditional Expressions]

(1): |Rasp|/hasp = 0.595
(2): (Rr + Rf)/(Rr − Rf) = −0.309
(8): F2/F0 = 7.756
(9): M2 = 2.888
(10): (−F1)/F0 = 1.300
(11): F3/F0 = 3.372

Figure 14A:
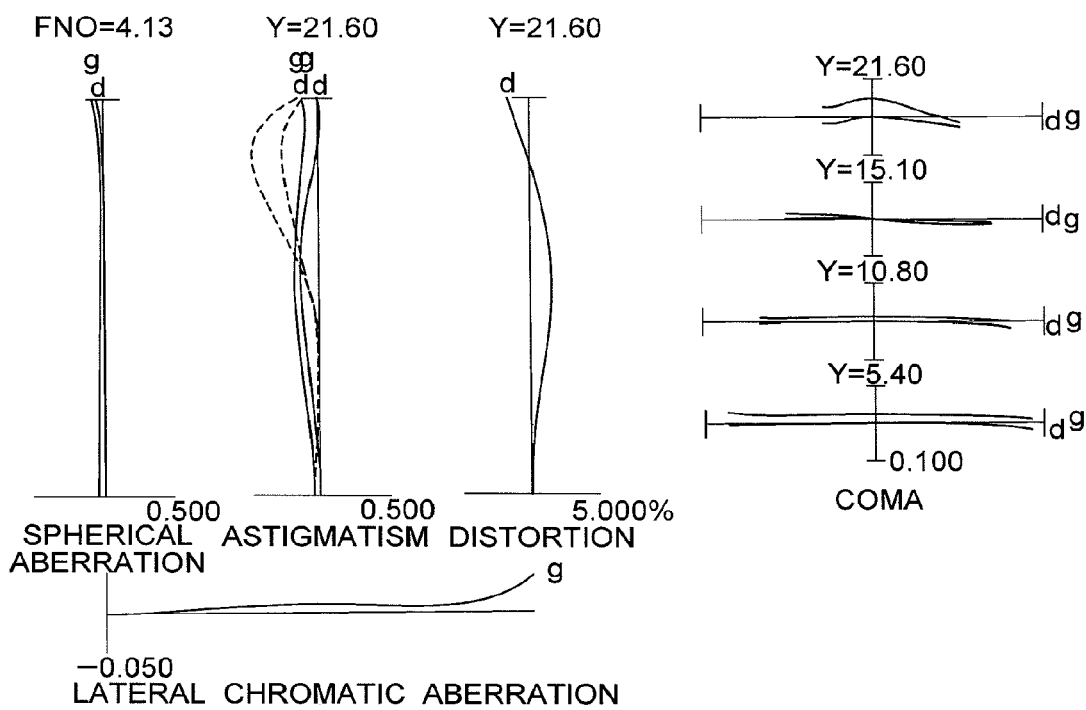
Figure 14B:
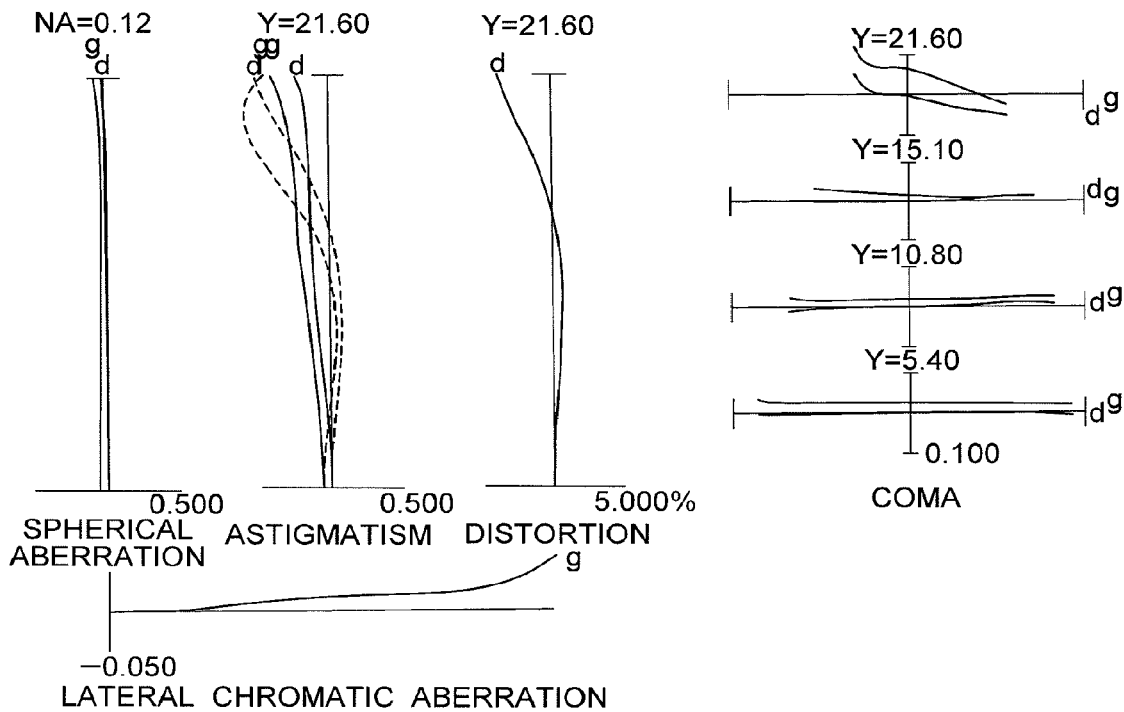

FIGS. 14A and 14B show graphs of various aberrations of the wide-angle lens according to Example 7, in which FIG. 14A is a state upon focusing on infinity, and FIG. 14B is a state upon focusing on a close object (β=−0.025).

As is apparent from FIGS. 14A and 14B, the wide-angle lens according to Example 7 shows superb optical performance as a result of good corrections to various aberrations.

Third Embodiment

A wide-angle lens having a rear-focusing system according to a third embodiment of the present application is explained below. The following embodiment only shows for better understandings of the present invention. Accordingly, any operable addition or conversion capable of being carried out by a person having ordinary skill in the art is not intended to be excluded within a scope of the present invention.

A wide-angle lens according to the third embodiment of the present application includes, in order from an object side, a first lens group having negative refractive power, a second lens group having positive refractive power, and a third lens group having positive refractive power. The second lens group is moved to an image plane side, and the third lens group is moved to the object side, thereby carrying out focusing from an infinity object to a close object, and the following conditional expression (12) is satisfied:

$$0.01<(-X3)/X2<0.90 \qquad (12)$$

where X3 denotes a moving amount of the third lens group upon focusing from an infinity object to a close object, and X2 denotes a moving amount of the second lens group upon focusing from an infinity object to a close object, in which the moving amount is positive upon moving to the image side.

With this construction, a wide-angle lens according to the third embodiment makes it possible to suppress variation in aberrations, in particular, curvature of field and coma upon focusing from an infinity object to a close object with realizing a wide angle of view.

Conditional expression (12) defines an appropriate range of a ratio of the moving amount of the third lens group to that of the second lens group upon focusing from an infinity object to a close object. With satisfying conditional expression (12), it becomes possible to realize a wide-angle lens having high optical performance upon focusing from an infinity object to a close object.

When the ratio (−X3)/X2 is equal to or exceeds the upper limit of conditional expression (12), the absolute value of the moving amount of the second lens group upon focusing from an infinity object to a close object and that of the third lens group become the same value. Since the second lens group and the third lens group move in opposite directions with each other, a distance between the second lens group and the third lens group decreases to come into contact with each other. When the focusing distance comes closer to the close object, curvature of field takes a large positive value, so that optical performance becomes worse.

With setting the upper limit of conditional expression (12) to 0.80, it becomes possible to excellently correct various aberrations. With setting the upper limit of conditional expression (12) to 0.70, it becomes possible to further excellently correct various aberrations. With setting the upper limit of conditional expression (12) to 0.60, it becomes possible to further excellently correct various aberrations, and the effect of the present invention can fully be exhibited.

On the other hand, when the ratio (−X3)/X2 is equal to or falls below the lower limit of conditional expression (12), the moving amount of the third lens group become excessively small in comparison with the moving amount of the second lens group. In this case, an aberration correction effect caused by a so-called floating system becomes small. When the focusing distance comes closer to the close object, curvature of field takes a large negative value, so that optical performance becomes worse.

With setting the lower limit of conditional expression (12) to 0.03, it becomes possible to excellently correct various aberrations. With setting the lower limit of conditional expression (12) to 0.05, it becomes possible to further excellently correct various aberrations. With setting the lower limit of conditional expression (12) to 0.08, it becomes possible to further excellently correct various aberrations, and the effect of the present invention can fully be exhibited.

In a wide-angle lens according to the third embodiment of the present application, the following conditional expression (13) is preferably satisfied:

$$0.10<F3/F2<0.90 \qquad (13)$$

where F3 denotes a focal length of the third lens group upon focusing on infinity, and F2 denotes a focal length of the second lens group upon focusing on infinity.

Conditional expression (13) defines an appropriate range of the ratio of the focal length (refractive power) of the third lens group to that of the second lens group. With satisfying conditional expression (13), it becomes possible to realize a compact wide-angle lens having high optical performance.

When the ratio F3/F2 is equal to or exceeds the upper limit of conditional expression (13), the focal length of the second lens group becomes smaller than that of the third lens group, and refractive power of the second lens group becomes large. As a result, variations in aberrations, in particular, curvature of field, astigmatism and coma become large.

With setting the upper limit of conditional expression (13) to 0.80, it becomes possible to excellently correct curvature of field, astigmatism and coma. With setting the upper limit of conditional expression (13) to 0.70, it becomes possible to further excellently correct such aberrations. With setting the upper limit of conditional expression (13) to 0.60, it becomes possible to further excellently correct such aberrations, and the effect of the present invention can fully be exhibited.

On the other hand, when the ratio F3/F2 is equal to or falls below the lower limit of conditional expression (13), the focal length of the second lens group becomes larger than that of the third lens group, and refractive power of the second lens group becomes small. As a result, moving amounts of the second lens group and the third lens group upon focusing become large, so that a large space has to be secured for moving the second lens group and the third lens group. Accordingly, the wide-angle lens becomes large. Moreover, variations in aberrations, in particular, curvature of field, spherical aberration and coma become large.

With setting the lower limit of conditional expression (13) to 0.20, it becomes possible to excellently correct various aberrations such as coma. With setting the lower limit of conditional expression (13) to 0.25, it becomes possible to further excellently correct various aberrations such as coma. With setting the lower limit of conditional expression (13) to 0.30, it becomes possible to further excellently correct various aberrations such as coma, and the effect of the present invention can fully be exhibited.

In a wide-angle lens according to the third embodiment of the present application, the following conditional expression (9) is preferably satisfied:

$$1.05 < M2 < 5.00 \quad (9)$$

where M2 denotes lateral magnification of the second lens group upon focusing on infinity.

However, conditional expression (9) has already been explained above, so that duplicated explanations are omitted.

In a wide-angle lens according to the third embodiment of the present application, the following conditional expression (10) is preferably satisfied:

$$0.20 < (-F1)/F0 < 3.00 \quad (10)$$

where F1 denotes a focal length of the first lens group upon focusing on infinity, and F0 denotes a focal length of the wide-angle lens upon focusing on infinity.

However, conditional expression (10) has already been explained above, so that duplicated explanations are omitted.

In a wide-angle lens according to the third embodiment of the present application, the first lens group is preferably fixed upon focusing from an infinity object to a close object. With this construction, a moving mechanism can be simplified in comparison with a case that all lens groups are moved. Moreover, the focusing lens group can be lightened in comparison with a case that the first lens group having a large diameter and heavy weight is the focusing lens group, focusing is carried out quickly.

In a wide-angle lens according to the third embodiment of the present application, the first lens group includes at least one aspherical negative meniscus lens, and the aspherical negative meniscus lens preferably has a shape that negative refractive power is getting smaller from the center to the periphery.

When the first lens group includes at least one aspherical negative meniscus lens, and the aspherical negative meniscus lens has a shape that negative refractive power is getting weaker from the center to the periphery, it becomes possible to accomplish a wide angle of view and to excellently correct curvature of field, distortion and coma.

In a wide-angle lens according to the third embodiment of the present application, the following conditional expression (1) is preferably satisfied:

$$0.30 < |Rasp|/hasp < 0.90 \quad (1)$$

Rasp denotes a paraxial radius of curvature of an aspherical surface of the aspherical negative meniscus lens having the shape that negative refractive power is getting weaker from the center to the periphery, hasp denotes a half of an effective diameter (maximum effective radius) of the aspherical negative meniscus lens having the shape that negative refractive power is getting smaller from the center to the periphery. However, conditional expression (1) has already been explained above, so that duplicated explanations are omitted.

In a wide-angle lens according to the third embodiment, the first lens group preferably includes an aspherical lens other than the above-described aspherical negative meniscus lens. With this construction, it becomes possible to excellently correct off-axis aberrations, in particular, distortion, curvature of field and coma.

In a wide-angle lens according to the third embodiment, the aspherical lens preferably has larger negative refractive power on the periphery than at the center of the lens. Such an aspherical surface and the above-described aspherical negative meniscus lens (in which negative refractive power is getting smaller from the center to the periphery) have opposite aspherical effect with each other. With combining them, a wide-angle lens according to the second embodiment makes it possible to excellently correct curvature of field, astigmatism and coma with accomplishing a wide angle of view. Incidentally, a portion where negative refractive power becomes lager than the central portion is preferably the most peripheral portion.

In a wide-angle lens according to the third embodiment, the first lens group is preferably composed of only negative lenses. With this construction, the diameter of the front lens can be small. Moreover, curvature of distortion can be suppressed.

Figure 24:
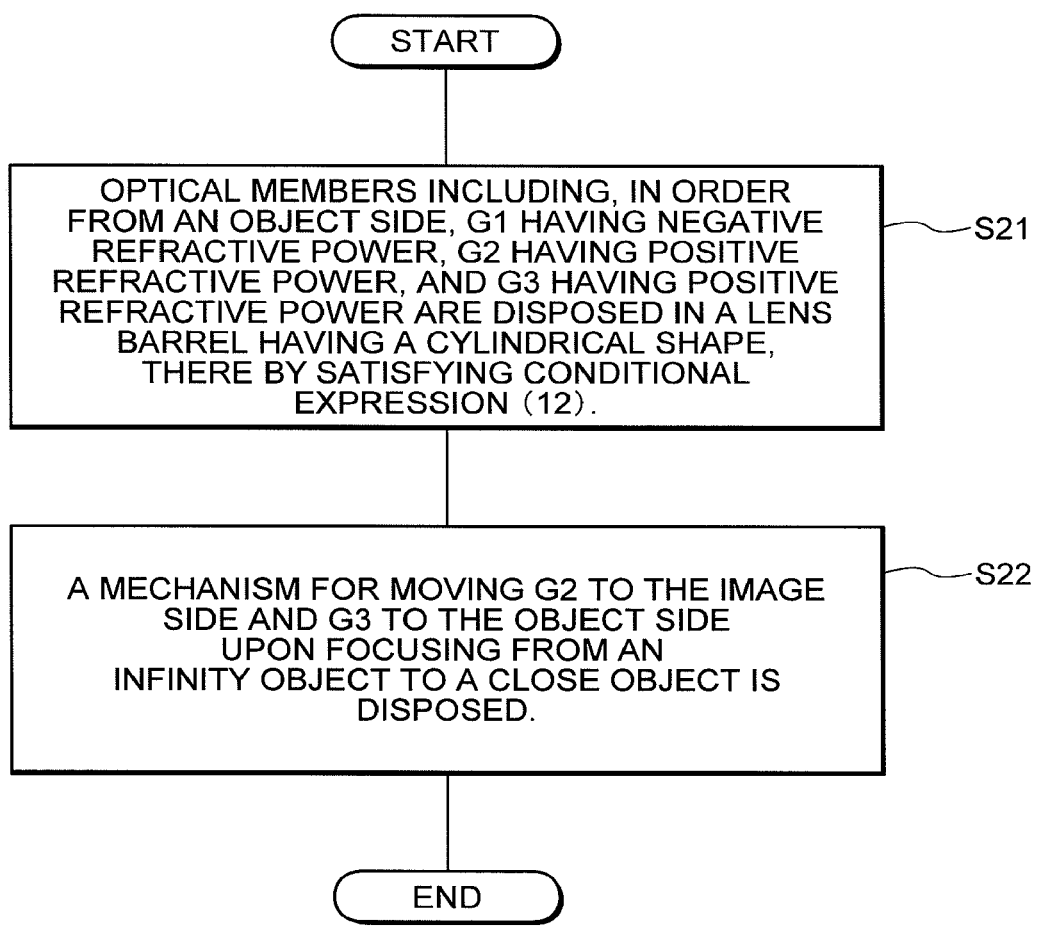
FIG. 24 is a flowchart showing a method for manufacturing a wide-angle lens according to the third embodiment of the present application.

Then, an outline of a method for manufacturing a wide-angle lens according to the third embodiment is explained below with reference to FIG. 24. FIG. 24 is a flowchart showing a method for manufacturing a wide-angle lens according to the third embodiment of the present application.

The method for manufacturing a wide-angle lens according to the third embodiment of the present application is a method for manufacturing a wide-angle lens including, in order from an object side, a first lens group having negative refractive power, a second lens group having positive refractive power, and a third lens group having positive refractive power, and includes the following steps S21 and S22 shown in FIG. 24.

Step S21: optical members including, in order from an object side, a first lens group having negative refractive power, a second lens group having positive refractive power, and a third lens group having positive refractive power are disposed in a lens barrel having a cylindrical shape, thereby satisfying the following conditional expression (12):

$$0.01 < (-X3)/X2 < 0.90 \quad (12)$$

where X3 denotes a moving amount of the third lens group upon focusing from an infinity object to a close object, and X2 denotes a moving amount of the second lens group upon focusing from an infinity object to a close object, in which the moving amount is positive upon moving to the image side.

Step S22: a mechanism for moving the second lens group to the image side and the third lens group to the object side upon focusing from an infinity object to a close object is disposed.

A method for manufacturing a wide-angle lens according to the third embodiment of the present application makes it possible to manufacture a wide-angle lens having excellent optical performance with a wide angle of view.

Each example of a wide-angle lens according to the third embodiment is explained below with reference to accompanying drawings.

Example 8

Figure 15:
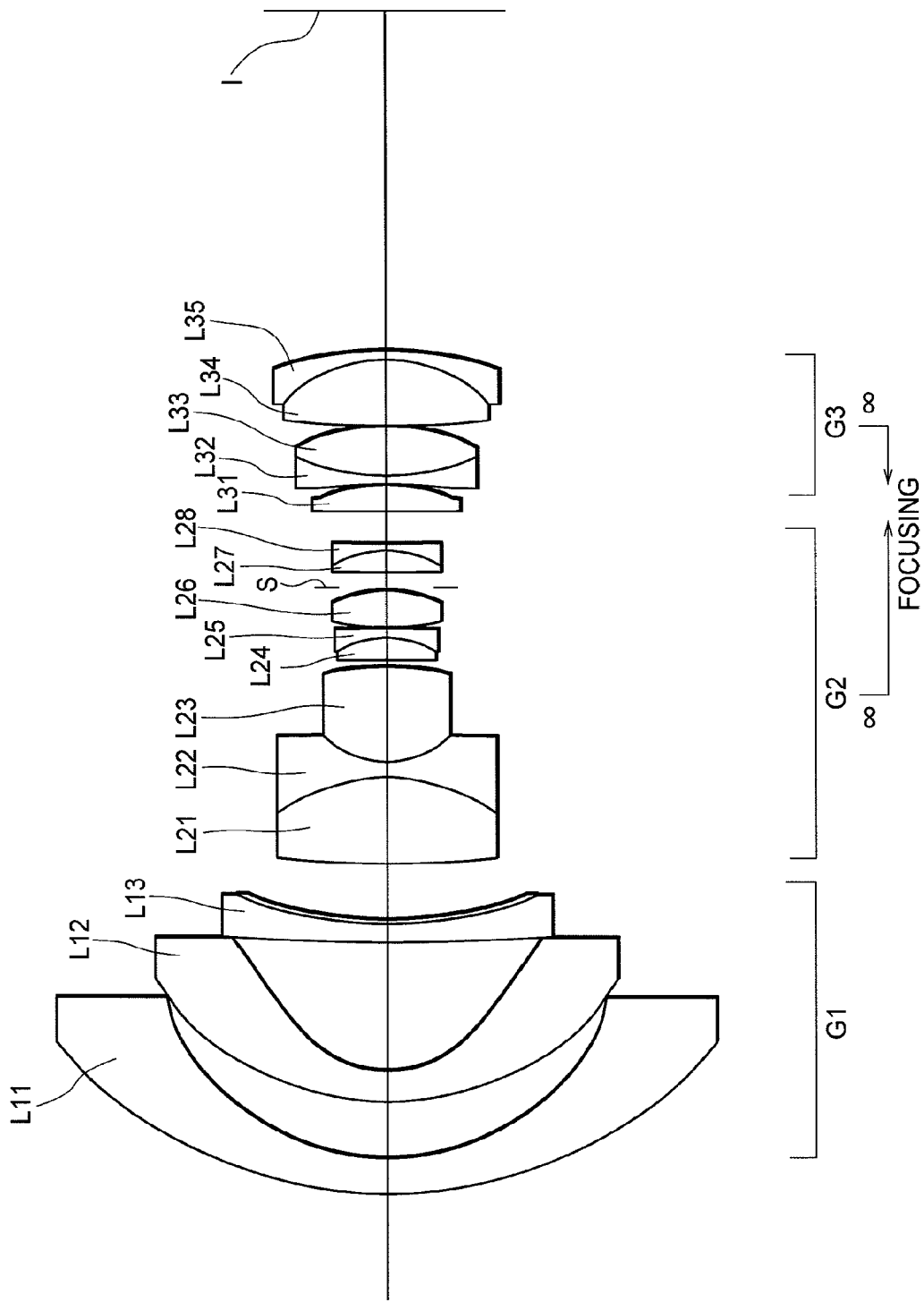
FIG. 15 is a sectional view showing a lens configuration of a wide-angle lens focusing on infinity according to Example 8 of a third embodiment of the present application.

FIG. 15 is a sectional view showing a lens configuration of a wide-angle lens focusing on infinity according to Example 8 of a third embodiment of the present application.

The wide-angle lens according to Example 8 is composed of, in order from an object side, a first lens group G1 having negative refractive power, a second lens group G2 having positive refractive power, and a third lens group G3 having positive refractive power. The second lens group G2 is moved to an image side and, at the same time, the third lens group is moved to the object side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented negative lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 8 are listed in Table 8.

TABLE 8

[Specifications]

F0 = 10.30
FNO = 4.10
ω = 64.87°
Y = 21.60
TL = 132.66
BF = 38.10
hasp = 16.54

[Lens Data]

| i | r | d | nd | νd |
|---|---|---|---|---|
| 1) | 43.3283 | 4.0000 | 1.816000 | 46.63 |
| 2) | 24.0441 | 6.3000 | | |
| 3) | 28.4320 | 3.5000 | 1.729030 | 54.04 |
| 4)* | 9.8843 | 14.3852 | | |
| 5) | 203.7704 | 2.0000 | 1.497820 | 82.56 |
| 6) | 40.0000 | 0.5000 | 1.553890 | 38.09 |
| 7)* | 53.2395 | (d7) | | |
| 8) | 103.6242 | 9.9182 | 1.717360 | 29.52 |
| 9) | −18.7399 | 1.5000 | 1.816000 | 46.63 |
| 10) | 9.5569 | 10.7268 | 1.620040 | 36.30 |
| 11) | −40.5784 | 0.8000 | | |
| 12) | 219.4076 | 2.5000 | 1.516800 | 64.12 |
| 13) | −10.3951 | 1.0000 | 1.755000 | 52.29 |
| 14) | 304.2368 | 0.1000 | | |
| 15) | 25.0985 | 4.1670 | 1.517420 | 52.32 |
| 16) | −15.1651 | 0.5000 | | |
| 17> | ∞ | 1.5000 | Aperture Stop S | |
| 18) | 108.6101 | 2.5000 | 1.516800 | 64.12 |
| 19) | −11.1953 | 0.8000 | 1.772500 | 49.61 |
| 20) | 150.0647 | (d20) | | |
| 21) | 368.0403 | 3.0000 | 1.516800 | 64.12 |
| 22) | −20.0562 | 0.1000 | | |
| 23) | −86.4414 | 1.0000 | 1.834810 | 42.72 |
| 24) | 22.2385 | 5.5000 | 1.497820 | 82.52 |
| 25) | −23.9030 | 0.1000 | | |
| 26) | 86.6834 | 7.5000 | 1.497820 | 82.52 |
| 27) | −14.7423 | 1.0000 | 1.772500 | 49.61 |
| 28) | −38.2138 | (BF) | | |

[Aspherical Surface Data]

Surface Number: 4

κ = 0.1808
A4 = −5.83460E−06
A6 = 4.61020E−08
A8 = −9.21750E−11
A10 = −2.39720E−13
A12 = −0.19598E−15
A14 = 0.12623E−18
A16 = −0.16852E−19
A18 = −0.21704E−22

Surface Number: 7

κ = −12.4060
A4 = 2.63310E−05
A6 = −4.69130E−08
A8 = 1.69210E−11
A10 = 5.79640E−13
A12 = 0.27098E−14
A14 = −0.21332E−16
A16 = −0.19412E−19
A18 = 0.32926E−21

[Variable Distances]

| | INF | CD1 | CD2 |
|---|---|---|---|
| Mag: | 0.00000 | −0.02500 | −0.1000 |
| d0: | ∞ | 389.8539 | 80.8156 |
| d7: | 6.16247 | 6.49070 | 7.46118 |
| d20: | 3.50000 | 3.07330 | 1.81167 |
| BF: | 38.09947 | 38.19794 | 38.48909 |

[Lens Group Data]

| Group | I | focal length |
|---|---|---|
| G1 | 1 | −13.25993 |
| G2 | 8 | 85.07702 |
| G3 | 21 | 33.73429 |

[Values for Conditional Expressions]

(1): |Raspl|/hasp = 0.598
(9): M2 = 2.538
(10): (−F1)/F0 = 1.287
(12): (−X3)/X2 = 0.300
(13): F3/F2 = 0.397

Figure 16A:
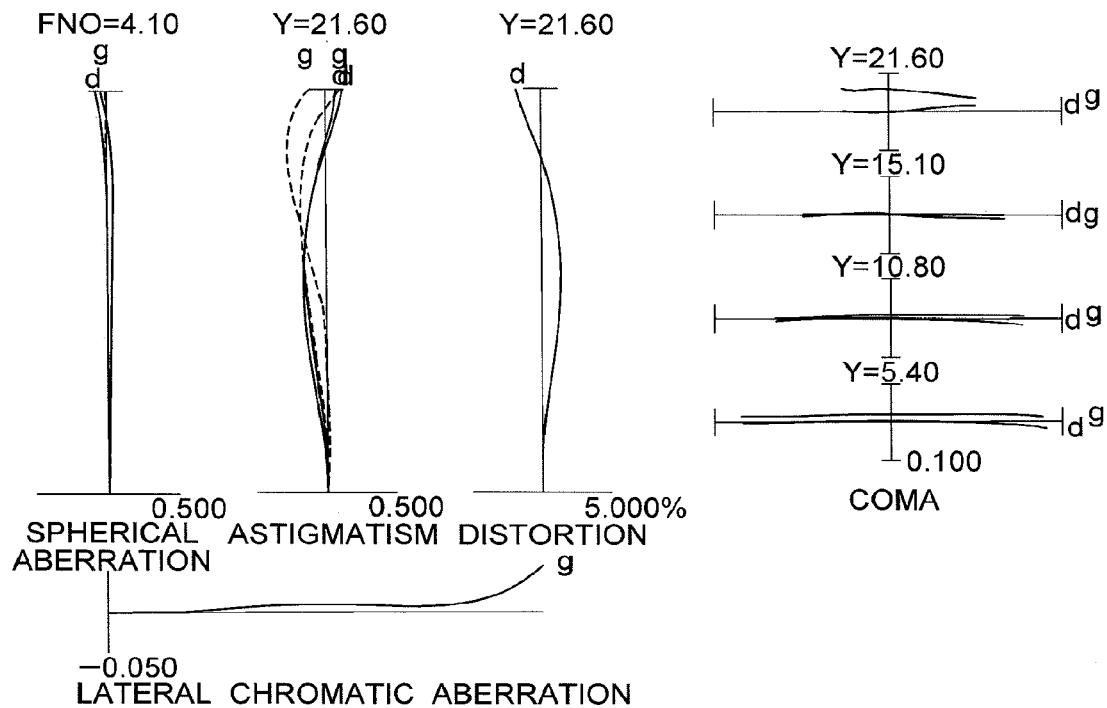
Figure 16B:
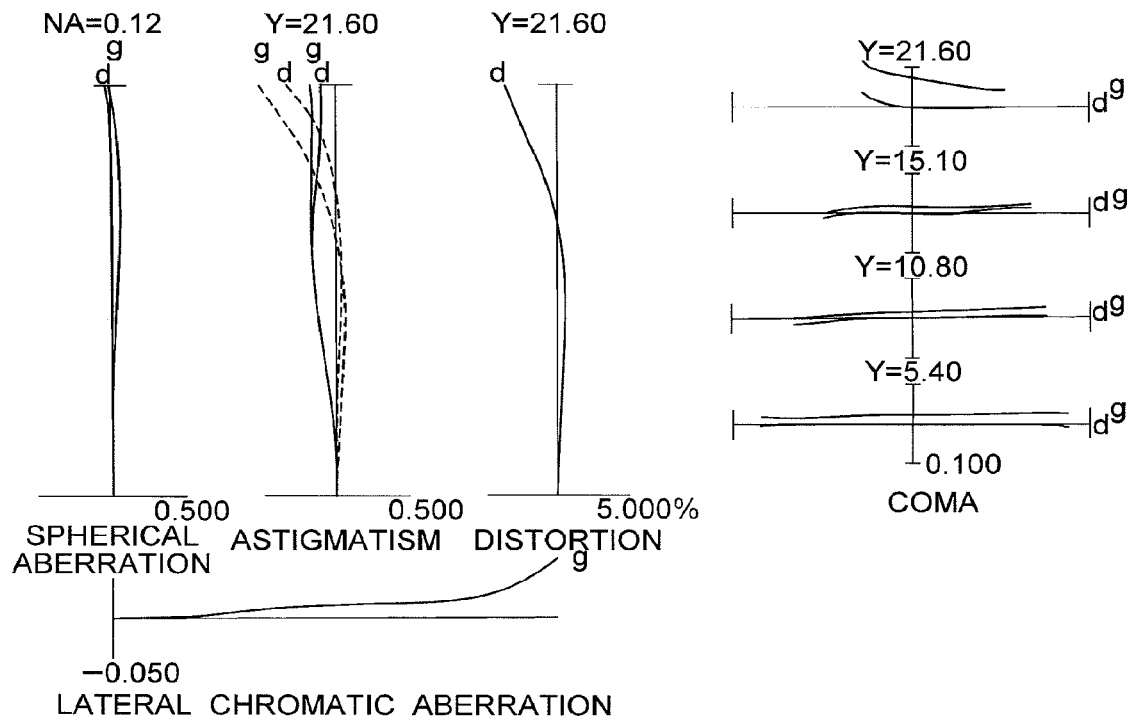

FIGS. 16A and 16B show graphs of various aberrations of the wide-angle lens according to Example 8, in which FIG. 16A is a state upon focusing on infinity, and FIG. 16B is a state upon focusing on a close object (β=−0.025).

As is apparent from FIGS. 16A and 16B, the wide-angle lens according to Example 8 shows superb optical performance as a result of good corrections to various aberrations.

Example 9

Figure 17:
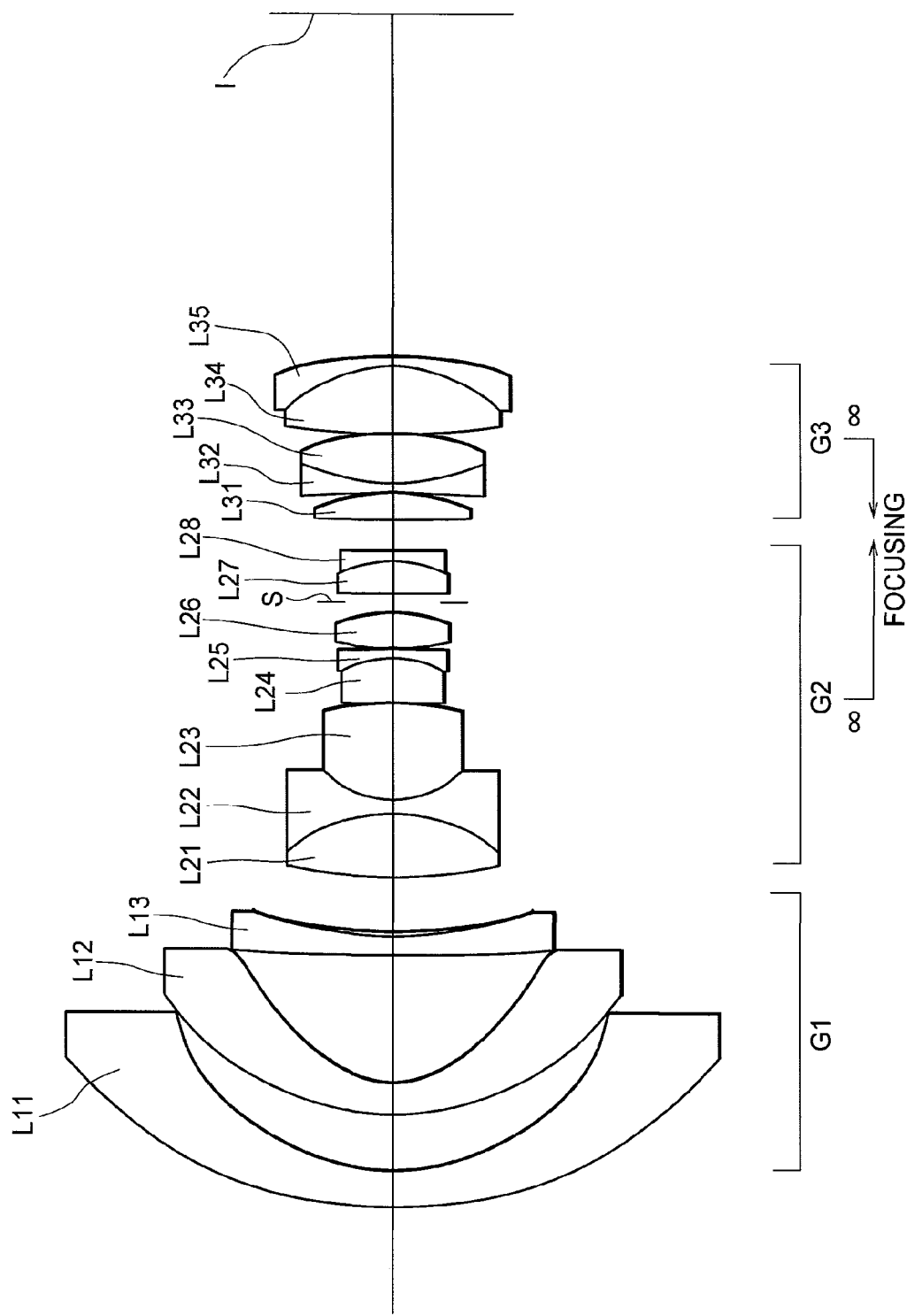
FIG. 17 is a sectional view showing a lens configuration of a wide-angle lens focusing on infinity according to Example 9 of the third embodiment of the present application.

FIG. 17 is a sectional view showing a lens configuration of a wide-angle lens focusing on infinity according to Example 9 of the third embodiment of the present application.

The wide-angle lens according to Example 9 is composed of, in order from an object side, a first lens group G1 having negative refractive power, a second lens group G2 having positive refractive power, and a third lens group G3 having positive refractive power. The second lens group G2 is moved to an image side and, at the same time, the third lens group is moved to the object side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented positive lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 9 are listed in Table 9.

TABLE 9

[Specifications]

F0 = 10.30
FNO = 4.17
ω = 64.84°
Y = 21.60
TL = 132.78
BF = 38.10
hasp = 16.06

[Lens Data]

| i | r | d | nd | νd |
|---|---|---|---|---|
| 1) | 42.3831 | 4.0000 | 1.816000 | 46.63 |
| 2) | 23.2938 | 6.3000 | | |
| 3) | 27.5491 | 3.5000 | 1.729030 | 54.04 |
| 4)* | 9.7702 | 14.2885 | | |
| 5) | 273.4999 | 2.0000 | 1.755000 | 52.29 |
| 6) | 40.0000 | 0.5000 | 1.553890 | 38.09 |
| 7)* | 55.6948 | (d7) | | |
| 8) | 49.1830 | 7.0000 | 1.672700 | 32.11 |
| 9) | −16.1713 | 1.5000 | 1.816000 | 46.63 |
| 10) | 9.7963 | 10.7268 | 1.620040 | 36.30 |
| 11) | −36.6819 | 0.1000 | | |
| 12) | 533.9192 | 5.0000 | 1.516800 | 64.12 |
| 13) | −10.9681 | 1.0000 | 1.755000 | 52.29 |
| 14) | 233.8827 | 0.1000 | | |
| 15) | 26.0608 | 4.0000 | 1.517420 | 52.32 |
| 16) | −15.6077 | 1.0000 | | |
| 17> | ∞ | 1.0000 | Aperture Stop S | |
| 18) | 103.7491 | 3.8000 | 1.516800 | 64.12 |
| 19) | −11.1953 | 1.0000 | 1.772500 | 49.61 |
| 20) | 171.1107 | (d20) | | |
| 21) | 204.9527 | 3.0000 | 1.516800 | 64.12 |
| 22) | −20.2930 | 0.1000 | | |
| 23) | −82.6214 | 1.0000 | 1.834810 | 42.72 |
| 24) | 22.2173 | 5.5000 | 1.497820 | 82.52 |
| 25) | −24.2790 | 0.1000 | | |

TABLE 9-continued

| 26) | 84.6349 | 7.5000 | 1.497820 | 82.52 |
| 27) | −15.1083 | 1.0000 | 1.772500 | 49.61 |
| 28) | −38.2138 | (BF) | | |

[Aspherical Surface Data]

Surface Number: 4

κ = 0.1747
A4 = −5.40210E−06
A6 = 3.09140E−08
A8 = −1.36590E−10
A10 = −3.34770E−13
A12 = −0.37424E−15
A14 = −0.19508E−18
A16 = −0.17694E−19
A18 = −0.21704E−22

Surface Number: 7

κ = −13.1668
A4 = 2.72000E−05
A6 = −5.96150E−08
A8 = −2.51320E−11
A10 = 4.73940E−13
A12 = 0.20073E−14
A14 = −0.18435E−16
A16 = 0.60550E−20
A18 = 0.37962E−21

[Variable Distances]

| | INF | CD1 | CD2 |
|---|---|---|---|
| Mag: | 0.00000 | −0.02500 | −0.1000 |
| d0: | ∞ | 389.4939 | 80.4779 |
| d7: | 6.16247 | 6.48714 | 7.44994 |
| d20: | 3.50000 | 3.14287 | 2.08379 |
| BF: | 38.09977 | 38.13223 | 38.22851 |

[Lens Group Data]

| Group | I | focal length |
|---|---|---|
| G1 | 1 | −11.45313 |
| G2 | 8 | 65.78006 |
| G3 | 21 | 33.23661 |

[Values for Conditional Expressions]

(1): |Raspl|/hasp = 0.608
(9): M2 = 2.746
(10): (−F1)/F0 = 1.112
(12): (−X3)/X2 = 0.100
(13): F3/F2 = 0.505

Figure 18A:
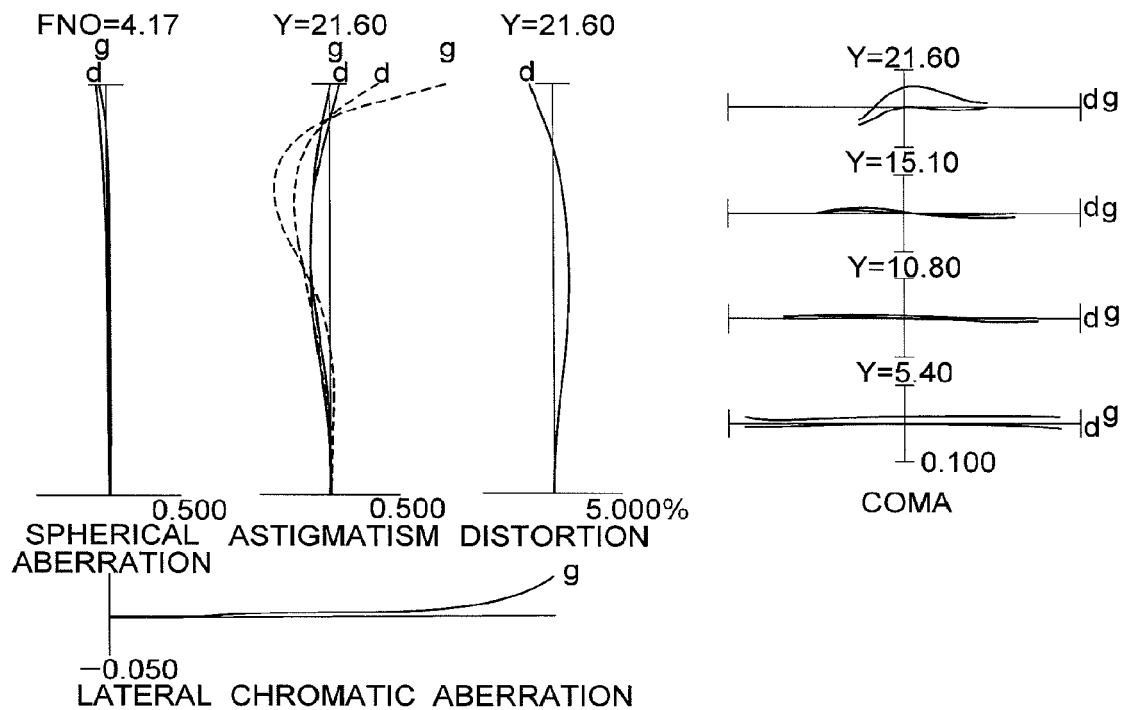
Figure 18B:
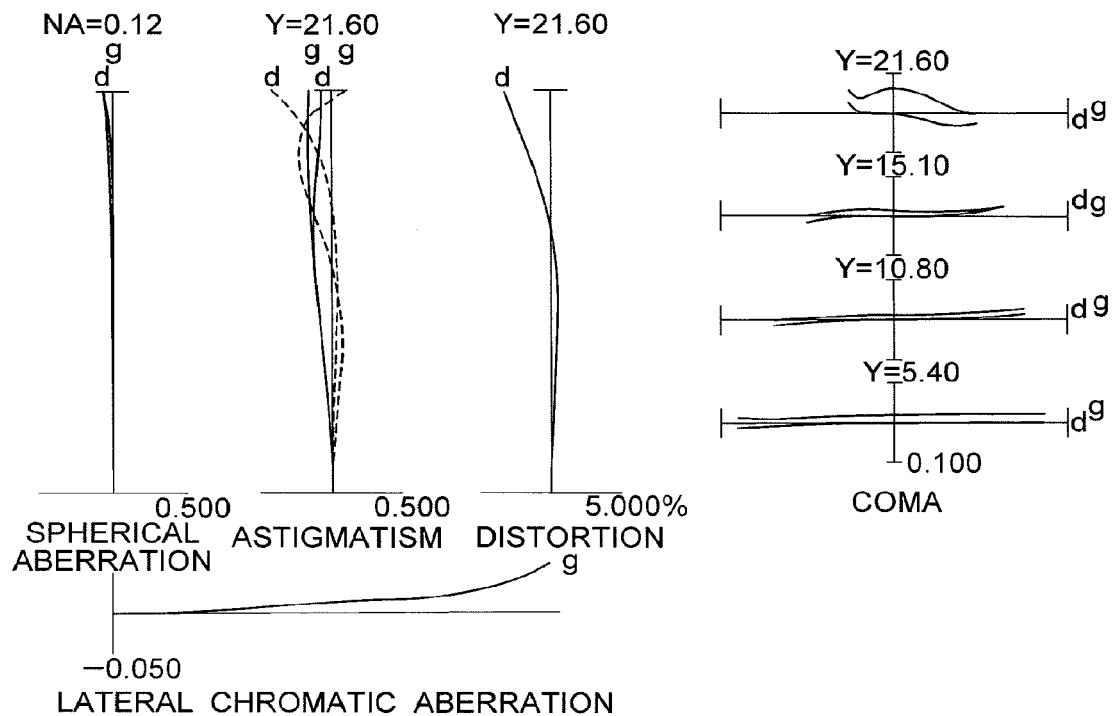

FIGS. 18A and 18B show graphs of various aberrations of the wide-angle lens according to Example 9, in which FIG. 18A is a state upon focusing on infinity, and FIG. 18B is a state upon focusing on a close object (β-0.025).

As is apparent from FIGS. 18A and 18B, the wide-angle lens according to Example 9 shows superb optical performance as a result of good corrections to various aberrations.

Example 10

FIG. 19 is a sectional view showing a lens configuration of a wide-angle lens focusing on infinity according to Example 10 of the third embodiment of the present application.

The wide-angle lens according to Example 10 is composed of, in order from an object side, a first lens group G1 having negative refractive power, a second lens group G2 having positive refractive power, and a third lens group G3 having positive refractive power. The second lens group G2 is moved to an image side and, at the same time, the third lens group is moved to the object side upon focusing from an infinity object to a close object.

The first lens group G1 is composed of, in order from the object side, a negative meniscus lens L11 having a convex surface facing the object side, a negative meniscus lens L12 having a convex surface facing the object side and an aspherical surface having a large aspherical amount formed on the image side, and a negative meniscus lens L13 having a convex surface facing the object side and an aspherical surface formed on the image side. The negative meniscus lens L13 is a composite type aspherical lens composed of a glass lens and a resin material.

The second lens group G2 is composed of, in order from the object side, a cemented negative lens constructed by a double convex positive lens L21 cemented with a double concave negative lens L22 cemented with a double convex positive lens L23, a cemented negative lens constructed by a double convex positive lens L24 cemented with a double concave negative lens L25, a double convex positive lens L26, an aperture stop S, and a cemented negative lens constructed by a double convex positive lens L27 cemented with a double concave negative lens L28.

The third lens group G3 is composed of, in order from the object side, a double convex positive lens L31, a cemented negative lens constructed by a double concave negative lens L32 cemented with a double convex positive lens L33, and a cemented positive lens constructed by a double convex positive lens L34 cemented with a negative meniscus lens L35 having a convex surface facing the image side.

Various values associated with the wide-angle lens according to Example 10 are listed in Table 10.

TABLE 10

[Specifications]

F0 = 10.30
FNO = 4.12
ω = 64.90°
Y = 21.60
TL = 134.12
BF = 38.10
hasp = 16.35

[Lens Data]

| i | r | d | nd | νd |
|---|---|---|---|---|
| 1) | 44.7672 | 4.0000 | 1.816000 | 46.63 |
| 2) | 24.5770 | 6.3000 | | |
| 3) | 28.7072 | 3.5000 | 1.729030 | 54.04 |
| 4)* | 9.8772 | 15.4198 | | |
| 5) | 227.4516 | 2.0000 | 1.497820 | 82.56 |
| 6) | 40.0000 | 0.5000 | 1.553890 | 38.09 |
| 7)* | 60.5653 | (d7) | | |
| 8) | 100.2184 | 10.5567 | 1.717360 | 29.52 |
| 9) | −18.3051 | 1.5000 | 1.816000 | 46.63 |
| 10) | 9.8841 | 10.7268 | 1.620040 | 36.30 |
| 11) | −40.9234 | 0.8000 | | |
| 12) | 209.2887 | 2.5000 | 1.516800 | 64.12 |
| 13) | −10.4796 | 1.0000 | 1.755000 | 52.29 |
| 14) | 293.3894 | 0.1000 | | |
| 15) | 26.0919 | 3.9432 | 1.517420 | 52.32 |
| 16) | −15.0216 | 0.5000 | | |
| 17> | ∞ | 1.5000 | Aperture Stop S | |
| 18) | 102.8124 | 2.5000 | 1.516800 | 64.12 |
| 19) | −11.1953 | 0.8000 | 1.772500 | 49.61 |
| 20) | 151.9214 | (d20) | | |
| 21) | 360.5447 | 3.0000 | 1.516800 | 64.12 |
| 22) | −20.1968 | 0.1000 | | |
| 23) | −82.8925 | 1.0000 | 1.834810 | 42.72 |
| 24) | 22.5220 | 5.5000 | 1.497820 | 82.52 |
| 25) | −23.9026 | 0.1000 | | |
| 26) | 99.3551 | 7.5000 | 1.497820 | 82.52 |
| 27) | −15.0235 | 1.0000 | 1.772500 | 49.61 |
| 28) | −38.2138 | (BF) | | |

[Aspherical Surface Data]

Surface Number: 4

κ = 0.1806
A4 = −6.66750E−06
A6 = 4.71250E−08
A8 = −8.12750E−11
A10 = −2.00840E−13
A12 = −0.86484E−16
A14 = 0.40631E−18
A16 = −0.16090E−19
A18 = −0.21704E−22

Surface Number: 7

κ = −13.5207
A4 = 2.63080E−05
A6 = −4.19140E−08
A8 = 3.00130E−11
A10 = 5.91010E−13
A12 = 0.23634E−14
A14 = −0.22355E−16
A16 = −0.17331E−19
A18 = 0.40068E−21

[Variable Distances]

| | INF | CD1 | CD2 |
|---|---|---|---|
| Mag: | 0.00000 | −0.02500 | −0.1000 |
| d0: | ∞ | 390.2937 | 81.2892 |
| d7: | 6.16246 | 6.42633 | 7.20786 |
| d20: | 3.50000 | 3.10420 | 1.93191 |
| BF: | 38.09954 | 38.23147 | 38.62224 |

[Lens Group Data]

| Group | I | focal length |
|---|---|---|
| G1 | 1 | −13.49375 |
| G2 | 8 | 81.46648 |
| G3 | 21 | 34.59158 |

[Values for Conditional Expressions]

(1): |Raspl|/hasp = 0.604
(9): M2 = 2.820
(10): (−F1)/F0 = 1.310
(12): (−X3)/X2 = 0.500
(13): F3/F2 = 0.425

Figure 20A:
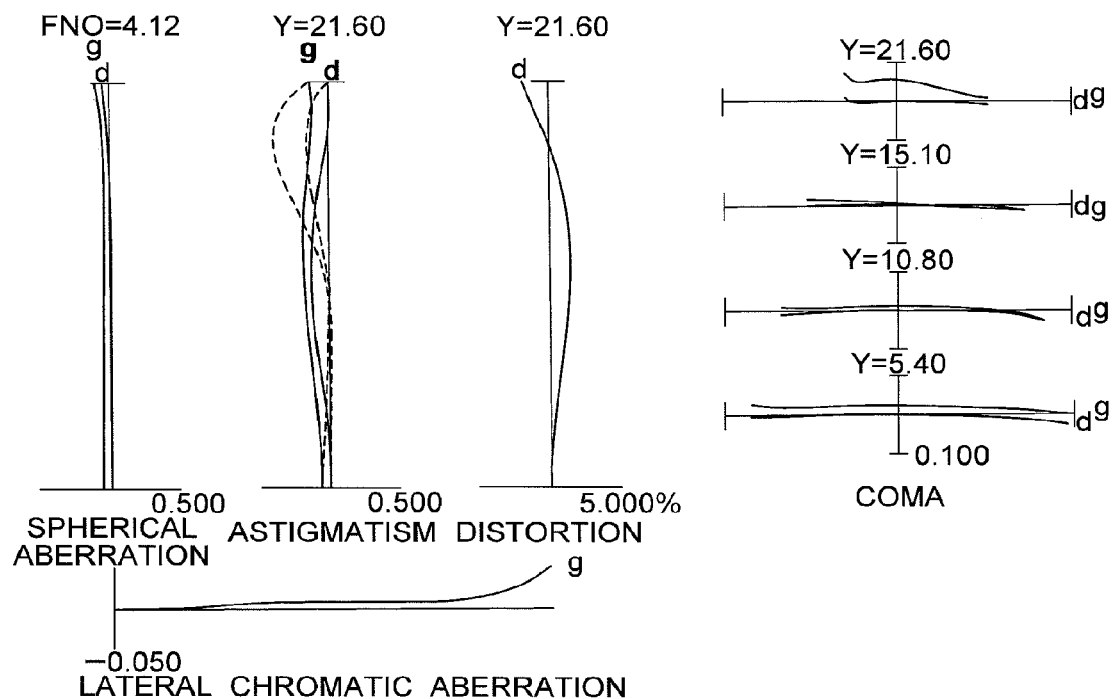
Figure 20B:
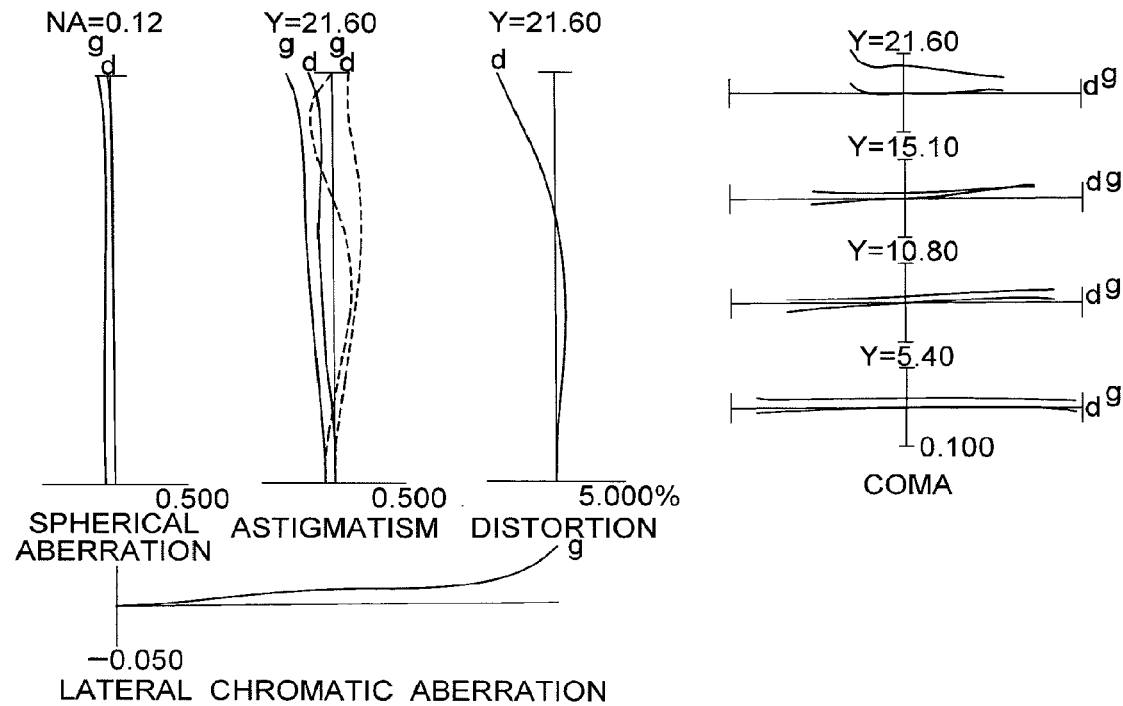
Figure 21:
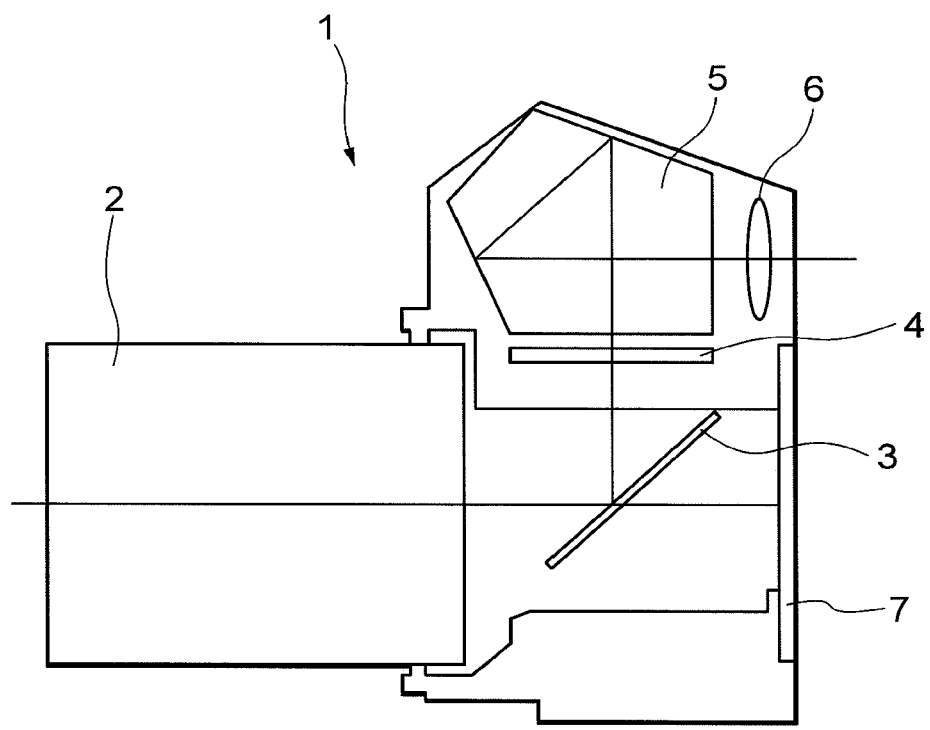
FIG. 21 is a diagram showing a construction of a camera equipped with the wide-angle lens according to Example 1 of the first embodiment of the present application.

FIGS. 20A and 20B show graphs of various aberrations of the wide-angle lens according to Example 10, in which FIG. 20A is a state upon focusing on infinity, and FIG. 20B is a state upon focusing on a close object (β=−0.025).

As is apparent from FIGS. 20A and 20B, the wide-angle lens according to Example 10 shows superb optical performance as a result of good corrections to various aberrations.

As described above, each Example according to each embodiment makes it possible to realize a wide-angle lens having an angle of view 2ω of 129.7 degrees or more, an f-number of about 4, and a small diameter of the front lens, being compact with high optical performance as a result of excellently correcting spherical aberration, curvature of field and coma, and suppressing variation in aberrations upon focusing from an infinity object to a close object.

Incidentally, the following description may suitably be applied within limits that do not deteriorate optical performance.

Although a wide-angle lens with a two-lens-group configuration or a three-lens-group configuration is shown as each Example of the present application, a lens-group configuration according to the present application is not limited to this, other lens-group configurations such as a four-lens-group configuration is possible. Specifically, a lens configuration that a lens or a lens group is added to the most object side or image side of the wide-angle lens according to the present application is possible. Incidentally, a lens group is a portion that includes at least one lens and is separated by air spaces.

In a wide-angle lens according to the present application, in order to carry out focusing from an infinity object to a close object, a portion of a lens group, a lens group, or a plurality of lens groups may be moved along the optical axis as a focusing lens group. Moreover, such a focusing lens group is suitable for auto focusing, and is suitable for being driven by a motor for auto focusing such as an ultrasonic motor. In a wide-angle lens according to the present application, it is particularly preferable that the second lens group is used as the focusing lens group, or the second lens group and the third lens group are used as the focusing lens group.

In a wide-angle lens according to the present application, a lens group or a portion of a lens group may be shifted in a direction including a component perpendicular to the optical axis as a vibration reduction lens group, or tilted (swayed) in a direction including the optical axis for correcting an image blur caused by a camera shake. In a wide-angle lens according to the present application, it is particularly preferable that at least a portion of the third lens group is used as a vibration reduction lens group.

A lens surface of a lens composing a wide-angle lens according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a wide-angle lens according to the present application, although an aperture stop is preferably provided between the front lens group and the rear lens group, or inside or in the vicinity of the second lens group, the function may be substituted by a lens frame without disposing a member as an aperture stop.

An antireflection coating having high transmittance over a broad wavelength range may be applied to each lens surface of a wide-angle lens according to the present application to reduce flare or ghost images, so that high optical performance with high contrast can be attained.

Then, an imaging apparatus equipped with a wide-angle lens according to the present application is explained with reference to FIG. 22. FIG. 22 is a diagram showing a construction of an imaging apparatus (a camera) equipped with a wide-angle lens according to Example 1 of the first embodiment.

As shown in FIG. 22, the camera 1 is a single lens reflex digital camera equipped with the wide-angle lens according to Example 1 of the first embodiment as an imaging lens 2.

In the camera 1, light coming out from an object (not shown) is converged by an imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through an eyepiece 6.

When the photographer presses a shutter-release button (not shown) all the way down, the quick return mirror 3 is retracted from the optical path, the light from the object converged by the imaging lens 2 is formed an image of the object on an imaging device 7. Accordingly, light from the object is captured by the imaging device 7 and the photographed image is stored in a memory (not shown). In this manner, the photographer can take an image of an object by the camera 1.

Here, the wide-angle lens according to Example 1 of the first embodiment installed in the camera 1 as an imaging lens 2 makes it possible to realize a wide-angle lens having fewer amount of curvature of field, astigmatism and coma by the characteristic lens configuration. Accordingly, the camera 1 can realize a thin imaging apparatus capable of taking a wide-angle picture with fewer amount of curvature of field, astigmatism and coma.

Although an example that the wide-angle lens according to Example of the first embodiment is installed as an imaging lens 2 to construct a camera 1 is shown above, it is needles to say that a camera equipped with the wide-angle lens according to any one of Examples 2 to 10 can perform the same effect as the camera 1.

Above-described each example only shows a specific example for the purpose of better understanding of the present invention. Accordingly, it is needless to say that the invention in its broader aspect is not limited to the specific details and representative devices shown and described herein.

What is claimed is:

1. A wide-angle lens comprising, in order from an object side:
    a first lens group having negative refractive power;
    a second lens group having positive refractive power; and
    a third lens group having positive refractive power;
    the second lens group being movable to an image side, thereby carrying out focusing from an infinity object to a close object; and
    wherein the following conditional expression is satisfied:

$$4.50 < F2/F0 < 15.00$$

where F2 denotes a focal length of the second lens group upon focusing on infinity, and F0 denotes a focal length of the wide-angle lens upon focusing on infinity.

2. The wide-angle lens according to claim 1, wherein the following conditional expression is satisfied:

$$1.05 < M2 < 5.00$$

where M2 denotes lateral magnification of the second lens group upon focusing on infinity.

3. The wide-angle lens according to claim 1, wherein the following conditional expression is satisfied:

$$0.20 < (-F1)/F0 < 3.00$$

where F1 denotes a focal length of the first lens group upon focusing on infinity, and F0 denotes a focal length of the wide-angle lens upon focusing on infinity.

4. The wide-angle lens according to claim 1, wherein the following conditional expression is satisfied:

$$1.00 < F3/F0 < 10.00$$

where F3 denotes a focal length of the third lens group upon focusing on infinity, and F0 denotes a focal length of the wide-angle lens upon focusing on infinity.

5. The wide-angle lens according to claim 1, wherein the third lens group is fixed upon focusing from an infinity object to a close object.

6. The wide-angle lens according to claim 1, wherein the first lens group is fixed upon focusing from an infinity object to a close object.

7. The wide-angle lens according to claim 1, wherein, the first lens group includes at least one aspherical negative meniscus lens, and the aspherical negative meniscus lens has a shape such that negative refractive power gets weaker from the center to the periphery.

8. The wide-angle lens according to claim 7, wherein the following conditional expression is satisfied:

$$0.30 < |Rasp|/hasp < 0.90$$

where Rasp denotes a paraxial radius of curvature of an aspherical surface of the aspherical negative meniscus lens having the shape such that negative refractive power gets weaker from the center to the periphery, and hasp denotes a half of an effective diameter (maximum effective radius) of the aspherical negative meniscus lens having the shape such that negative refractive power gets weaker from the center to the periphery.

9. The wide-angle lens according to claim 7, wherein the first lens group includes an aspherical lens other than the aspherical negative meniscus lens.

10. The wide-angle lens according to claim 9, wherein the aspherical lens has larger negative refractive power on the periphery than at the center of the lens.

11. The wide-angle lens according to claim 1, wherein the second lens group includes a cemented lens constructed by a positive lens cemented with a negative lens cemented with a positive lens.

12. The wide-angle lens according to claim 11, wherein the following conditional expression is satisfied:

$$-1.00 < (Rr+Rf)/(Rr-Rf) < 0.00$$

where Rr denotes a radius of curvature of the image side surface of the negative lens in the cemented lens, and Rf denotes a radius of curvature of the object side surface of the negative lens in the cemented lens.

13. The wide-angle lens according to claim 1, wherein the first lens group is composed of negative lenses only.

14. An imaging apparatus equipped with the wide-angle lens according to claim 1.

15. A method for manufacturing a wide-angle lens comprising steps of:
disposing optical members including, in order from an object side, a first lens group having negative refractive power, a second lens group having positive refractive power, and a third lens group having positive refractive power into a lens barrel; and
providing a mechanism for moving the second lens group to the image plane side upon focusing from an infinity object to a close object,
wherein the second lens group satisfies the following conditional expression:

$$4.50 < F2/F0 < 15.00$$

where F2 denotes a focal length of the second lens group upon focusing on infinity, and F0 denotes a focal length of the wide-angle lens upon focusing on infinity.

16. The method according to claim 15,
wherein the first lens group satisfies the following conditional expression:

$$0.20 < (-F1)/F0 < 3.00$$

where F1 denotes a focal length of the first lens group upon focusing on infinity, and F0 denotes a focal length of the wide-angle lens upon focusing on infinity.

17. A wide-angle lens comprising, in order from an object side:
a first lens group having negative refractive power;
a second lens group having positive refractive power; and
a third lens group having positive refractive power;
the second lens group being movable to an image side, thereby carrying out focusing from an infinity object to a close object; and
the following conditional expression being satisfied:

$$1.05 < M2 < 5.00$$

where M2 denotes lateral magnification of the second lens group upon focusing on infinity.

18. A method for manufacturing a wide-angle lens comprising steps of:
disposing optical members including, in order from an object side, a first lens group having negative refractive power, a second lens group having positive refractive power, and a third lens group having positive refractive power into a lens barrel; and
providing a mechanism for moving the second lens group to the image plane side upon focusing from an infinity object to a close object,
wherein the second lens group
satisfies the following conditional expression:

$$1.05 < M2 < 5.00$$

where M2 denotes lateral magnification of the second lens group upon focusing on infinity.

* * * * *